(12) United States Patent
Oda et al.

(10) Patent No.: US 6,716,500 B2
(45) Date of Patent: Apr. 6, 2004

(54) HEAT-RESISTANT RESIN CONTAINER AND METHOD OF PRODUCING THE SAME

(75) Inventors: Yasuhiro Oda, Yokohama (JP);
Masahiko Otsuki, Yokohama (JP);
Tsutomu Iwasaki, Sagamihara (JP);
Masahito Kogure, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 13 days.

(21) Appl. No.: 09/959,955

(22) PCT Filed: Mar. 12, 2001

(86) PCT No.: PCT/JP01/01918

§ 371 (c)(1),
(2), (4) Date: Nov. 13, 2001

(87) PCT Pub. No.: WO01/66335

PCT Pub. Date: Sep. 13, 2001

(65) Prior Publication Data

US 2003/0047565 A1 Mar. 13, 2003

(30) Foreign Application Priority Data

Mar. 10, 2000 (JP) .......................................... 2000-67078
Oct. 3, 2000 (JP) ....................................... 2000-303773

(51) Int. Cl.[7] ............................................. B32B 1/100
(52) U.S. Cl. ................................... 428/35.7; 220/62.22
(58) Field of Search ...................... 220/62.22; 428/36.6, 428/36.8, 36.9, 35.7

(56) References Cited

U.S. PATENT DOCUMENTS

| 4,982,872 | A | * | 1/1991 | Avery ....................... 220/62.13 |
| 5,064,724 | A | * | 11/1991 | Ofstein ........................ 428/501 |
| 5,464,106 | A | * | 11/1995 | Slat et al. ..................... 215/12.1 |
| 5,712,009 | A | * | 1/1998 | Moore et al. ............... 428/35.7 |
| 6,479,115 | B2 | * | 11/2002 | Fehn ........................... 428/36.6 |

* cited by examiner

Primary Examiner—Joseph M. Moy
(74) Attorney, Agent, or Firm—Sughrue Mion, PLLC

(57) ABSTRACT

A container with a flange having excellent heat resistance and impact resistance in the lower part of the barrel portion and having excellent transparency in the wall despite the container is formed by molding an amorphous polyester sheet, and a method of producing the same.

8 Claims, 30 Drawing Sheets

HEAT-RESISTANT RESIN CONTAINER AND METHOD OF PRODUCING THE SAME

TECHNICAL FIELD

The present invention relates to a container with a flange obtained by heat-molding a sheet provided with a thermoplastic polyester layer, and to a method of producing the same. More specifically, the invention relates to a polyester container with a flange having improved impact resistance and heat resistance in the lower part of the barrel thereof and having superior transparency.

BACKGROUND ART

Thermoplastic polyesters such as polyethylene terephthalate and the like have excellent impact resistance, heat resistance and transparency as well as a certain degree of gas barrier property, and have been widely used for producing a variety of kinds of packaging containers.

Such packaging containers can be represented by a container with a flange obtained by molding a stretched or unstretched thermoplastic polyester sheet.

Japanese Unexamined Patent Publication (Kokai) No. 53852/1984 discloses a method of producing a transparent container by monoaxially stretching a thermoplastic resin sheet while maintaining the reduction ratio of the width of the sheet to be not larger than 10% and heat-molding the thus obtained monoaxially oriented sheet (prior art 1).

Japanese Examined Patent Publication (Kokoku) No. 27850/1989 discloses a method of heat-molding a polyester sheet by molding a biaxially stretched polyester sheet having a crystallinity of not larger than 30% and an index of surface orientation of from 0.02 to 0.15 by utilizing the compressed air along a mold heated at a temperature which is not higher than the crystallizing temperature (Tc° C.) of the polyester but is not lower than (Tc−70)° C., heat-treating the obtained molded article by bringing it into contact with the heated mold, fitting a cooling mold to the heating mold, the cooling mold having a shape nearly corresponding to the heating mold, forcibly transferring the molded article toward the cooling mold side from the heated mold side by blowing the compressed air, and cooling the molded article upon contact with the cooling mold (prior art 2).

Japanese Examined Patent Publication (Kokoku) No. 36534/1992 discloses a polyester container having a heat-adhering portion that can be thermally adhered to the closure member, the container being obtained by molding a polyester sheet containing a polyethylene terephthalate as a chief constituent component, the heat-adhering portion having a crystallinity of smaller than 20%, and the bottom portion and(or) the side portion of the container having the crystallinity of not smaller than 20%, the container being useful as an ovenable tray (prior art 3).

Japanese Patent No. 2947486 discloses a method of producing a biaxially stretched thermoplastic product by forming a biaxially stretched intermediate product by blow-molding a sheet-like thermoplastic material in a tube at a stretching temperature while preventing the material from adhering to the top of the side walls, placing the intermediate product on a male mold of a preset size and a texture, heating the intermediate product and the mold at a temperature higher than the temperature for stretching the thermoplastic material so that the intermediate product is thermally shrunk on the surface of the mold, cooling the intermediate product that is thermally shrunk, and taking the thermally shrunk intermediate product out of the mold (prior art 4).

The prior art 1 uses a monoaxially stretched sheet as the sheet for molding. This molding method may be capable of improving the transparency of the container but still leaves room for improvement concerning the heat resistance of the container.

The prior art 2 uses a biaxially stretched sheet as the sheet for molding. This molding method may be capable of improving the heat resistance of the container but is not still satisfactory concerning the impact resistance of the container.

These prior arts 1 and 2 use a sheet that has been stretched in advance as the sheet to be molded and, hence, require a particular stretching step and, hence, an additional cost. It is therefore desired to use an unstretched sheet and to impart, in a step of forming the container, the molecular orientation that is desired from the standpoint of imparting the container properties. It is further desired that the properties such as heat resistance, impact resistance and transparency are imparted in the steps of molding the container without requiring any particular step.

According to the prior art 3, an amorphous polyester sheet that is heated and plasticized is formed into a tray by using a metal mold maintained at a crystallizing temperature in order to heat-crystallize the bottom portion and/or the side portion. However, there is no disclosure concerning molecularly orienting the side portion by stretching, and it is considered that the container that is obtained is still insufficient with respect to impact resistance and transparency.

The prior art 4 is to produce a final container by preparing a biaxially stretched intermediate product by the blow-molding and by heat-shrinking the intermediate product on the male mold. This method, however, requires both heating for heat-shrinking the intermediate product on the male mold and cooling for shaping the heat-shrunk intermediate product and for taking it out. Therefore, this method is not still satisfactory from the standpoint of thermal economy, extended periods of time occupying the molds and low productivity.

DISCLOSURE OF THE INVENTION

It is therefore an object of the present invention to provide a container with a flange exhibiting excellent heat resistance and impact resistance in the lower part of the barrel portion and excellent transparency in the container wall despite it is obtained by molding an amorphous polyester sheet, and a method of producing the same.

Another object of the present invention is to provide a heat-resistant thermoplastic resin container having a novel profile of crystallinities in that the side wall portion of the container comprises oriented crystals, and the outer surface of the side wall has a crystallinity larger than that of the inner surface of the side wall, and a method of producing the same.

A further object of the present invention is to provide a method of producing a thermoplastic resin container, having split functions of effecting the heat-set by a female mold and effecting the cooling by a plug, shortening the time for occupying the mold and enhancing the productivity.

A still further object of the present invention is to provide a sheet-molded container having excellent heat resistance, impact resistance and transparency not only in the side wall of the container but also in the central portion on the bottom of the container despite the container is obtained by molding an unoriented or amorphous thermoplastic polyester sheet, and a method of producing the same.

According to the present invention, there is provided an impact resistant container obtained by heat-molding a sheet provided with a thermoplastic polyester layer comprising chiefly an ethylene terephthalate unit, and having a flange portion, a barrel portion and a closed bottom portion, the wall of the lower part of the barrel portion being oriented and crystallized so as to possess a crystallinity of not smaller than 15% as measured by the density method, and the wall of the barrel portion being oriented to satisfy the following formulas (1), (2) and (3), $$Iu(-110)/Iu(010) \leq 1.02 \tag{1}$$

$$IL(-110)/IL(010) \leq 0.89 \tag{2}$$

and $$(Iu(-110)/Iu(010))-(IL(-110)/IL(010)) \geq 0.13 \tag{3}$$

wherein Iu(−110) is a diffraction intensity of the surface having an index of a plane of (−110) in the upper part of the wall of the barrel portion of when an X-ray is incident on the wall surface of the container perpendicularly thereto and when the axial direction of the container is regarded to be a perpendicular of the optical coordinate, Iu(010) is a diffraction intensity of the surface having an index of a plane of (010) in the upper part of the wall of the barrel portion of when an X-ray is incident on the wall surface of the container perpendicularly thereto and when the axial direction of the container is regarded to be a perpendicular of the optical coordinate, IL(−110) is a diffraction intensity of the surface having an index of a plane of (−110) in the lower part of the wall of the barrel portion of when an X-ray is incident on the wall surface of the container perpendicularly thereto and when the axial direction of the container is regarded to be a perpendicular of the optical coordinate, and IL(010) is a diffraction intensity of the surface having an index of a plane of (010) in the upper part of the wall of the barrel portion of when an X-ray is incident on the wall surface of the container perpendicularly thereto and when the axial direction of the container is regarded to be a perpendicular of the optical coordinate, as measured by the X-ray diffraction by using a curved PSPC microdiffractometer.

In the container of the present invention, the ratio (H/R) of the height (H) of the barrel portion to the inner diameter (R) at the top of the barrel portion is desirably in a range of from 0.8 to 2.0 for fulfilling the object of the invention. Further, the flange portion may have a crystallinity of smaller than 10% as measured by the density method, or the flange portion may have a crystallinity of not smaller than 20% as measured by the density method.

According to the present invention, there is further provided a method of producing an impact resistant container by heating a sheet provided with an amorphous thermoplastic polyester layer comprising chiefly an ethylene terephthalate unit at a sheet temperature (Ts) that satisfies the following formula (4), $$Tg < Ts < Tg+50° C. \tag{4}$$

wherein Tg is a glass transition point of the thermoplastic polyester, and molding and heat-setting the sheet by using a plug having a bottom area of not smaller than 70% of the bottom area of the container and a plug temperature (Tp) that satisfies the following formula (5), $$Tg-30° C. < Tp \leq Tg+30° C. \tag{5}$$

wherein Tg is the glass transition point of the thermoplastic polyester, in one step or in two steps in a metal mold with a plug-assisted compressed air or vacuum.

In the production method of the present invention, it is desired that the metal mold has a temperature (Tm) that satisfies the following formula (6), $$Tg \leq Tm \tag{6}$$

wherein Tg is a glass transition point of the thermoplastic polyester.

Further, the plug may be an ordinary plug or a plug having a stepped shoulder for forming a flange.

According to the present invention, further, there is provided a heat-resistant resin container obtained by molding a thermoplastic polyester sheet, at least the side wall of the container being oriented and crystallized due to stretching, and the side wall of the container having a crystallinity which is larger in the outer surface thereof than in the inner surface thereof.

In the heat-resistant resin container of the present invention, it is desired that:

1. The container has a flange portion, a side wall portion and a bottom portion, and the ratio (H/D) of the height (H) of the container to the diameter (D) of the container is not smaller than 0.5;
2. The flange portion of the container is cloudy and the side wall is transparent when it contains no pigment; and
3. A change in the volume of the container is not larger than 1.0% after it is heat-treated in an oven at such a temperature that the side wall portion thereof is maintained at 90° C. for 3 minutes.

According to the present invention, further, there is provided a method of producing a heat-resistant resin container by molding a thermoplastic resin sheet into the shape of a female mold heated at a temperature higher than the crystallization temperature of the resin by the compressed air, followed by heat-setting and, then, reducing the pressure in the molded article so that the molded article shrinks into the shape of a plug having the shape of a final container to impart the shape thereto, followed by cooling.

In the method of producing the heat-resistant resin container of the present invention, it is desired that:

1. A primary molded article obtained by stretching the thermoplastic resin sheet by using a plug is molded with the compressed air;
2. The thermoplastic resin sheet is an amorphous sheet of a thermoplastic polyester;
3. The plug has a surface area wider by more than three times than the area to be molded of the thermoplastic resin sheet; and
4. The temperature of the plug is not lower than the glass transition point of the thermoplastic resin but is lower than the temperature of the female mold.

The method of producing the heat-resistant resin container of the present invention can be put into practice even by a one-step molding method or by a two-step molding method.

In the two-step molding method, it is desired that the thermoplastic resin sheet is stretched and molded by using a plug for stretch-molding prior to applying the compressed air, and the obtained primary molded article is supported by a shape-imparting plug in a separate step to effect the molding with the compressed air and the shrinking. In this case, further, it is desired that the temperature of the shape-imparting plug is not higher than the glass transition point of the thermoplastic resin.

According to the present invention, further, there is provided a method of producing a heat-resistant container by preparing an intermediate article by heat-shrinking a pre-molded article obtained by solid-phase-molding the sheet provided with an amorphous thermoplastic polyester layer, molding the intermediate product with the compressed air in a female metal mold for final molding heated at a temperature higher than the crystallization start temperature of said polyester, heat-setting the molded article, reducing the pressure inside the molded article so that the molded article shrinks along the outer surface of the plug having the shape of the final container to impart the shape thereto, followed by cooling.

In the embodiment of the present invention, it is desired that the sheet is solid-phase-molded by pressing the sheet by using a plug for pre-molding, the sheet being clamped by a clamping metal mold and a female mold for pre-molding, and by supplying the pressurized gas to between the sheet and the plug. In molding the sheet in this case, it is desired that the sheet temperature is maintained to lie between the glass transition point (Tg) of the thermoplastic polyester +15° C. and the glass transition point +40° C., that the plug is maintained at a temperature between the glass transition point −30° C. and the glass transition point +20° C., and that the female mold for pre-molding is maintained at a temperature between the glass transition point of the thermoplastic polyester +10° C. and the glass transition point +50° C.

In the present invention, further, it is desired that the pre-molded article is supported by a plug for intermediate molding and is inserted in the female mold for intermediate molding, and the molded article is caused to shrink along the outer surface of the plug to impart the shape thereto followed by cooling. In this case, it is desired that the female mold for intermediate molding is maintained at a temperature in a range of not lower than the crystallization start temperature, that the plug for intermediate molding is maintained at a temperature lower than the temperature of the female mold for intermediate molding and in a range of from 80 to 110° C., and that the surface area of the pre-molded article is from 1.1 to 1.5 times as large as the surface area of the intermediate article.

According to the present invention, further, it is desired that the female mold for final molding is maintained at a temperature of not lower than the crystallization start temperature of the thermoplastic polyester, and that the plug for the final container is maintained at a temperature in a range of from the glass transition point of the thermoplastic polyester −20° C. to the glass transition point +20° C.

According to the present invention, there is further provided a container having excellent heat resistance and impact resistance obtained by stretching and molding a thermoplastic polyester, the thermoplastic polyester in the bottom portion of the container having a crystallinity of not smaller than 15%, and the center in the bottom portion of the container being substantially transparent and having a distinguished diffraction peak in the surface of an index of a plane (010) in the X-ray diffraction.

In the container of the present invention, it is desired that:

1. The oriented crystallization tendency (U) as defined by the following formula (I), $$U = H(010)/H(-110) \tag{I}$$

wherein H(010) is a diffraction intensity of the surface having an index of a plane (010) in the X-ray diffraction, and H(−110) is a diffraction intensity of the surface having an index of a plane (−110) in the X-ray diffraction, is not smaller than 1.3 at the center in the bottom portion;

2. The sheet having the thermoplastic polyester layer is stretched and molded in the solid phase; and
3. The crystallinity of the thermoplastic polyester in the side wall of the container is not smaller than 15%.

BEST MODE FOR CARRYING OUT THE INVENTION

First Embodiment

A container according to a first embodiment of the present invention is obtained by heat-molding a sheet provided with a thermoplastic polyester layer comprising chiefly an ethylene terephthalate unit, and having a flange portion, a barrel portion and a closed bottom portion, the wall of the lower part of the barrel portion being oriented and crystallized so as to possess a crystallinity of not smaller than 15% as measured by the density method, and the wall of the barrel portion being oriented to satisfy the above-mentioned formulas (1), (2) and (3) as measured by X-ray diffraction based upon the transmission method.

Figure 1:
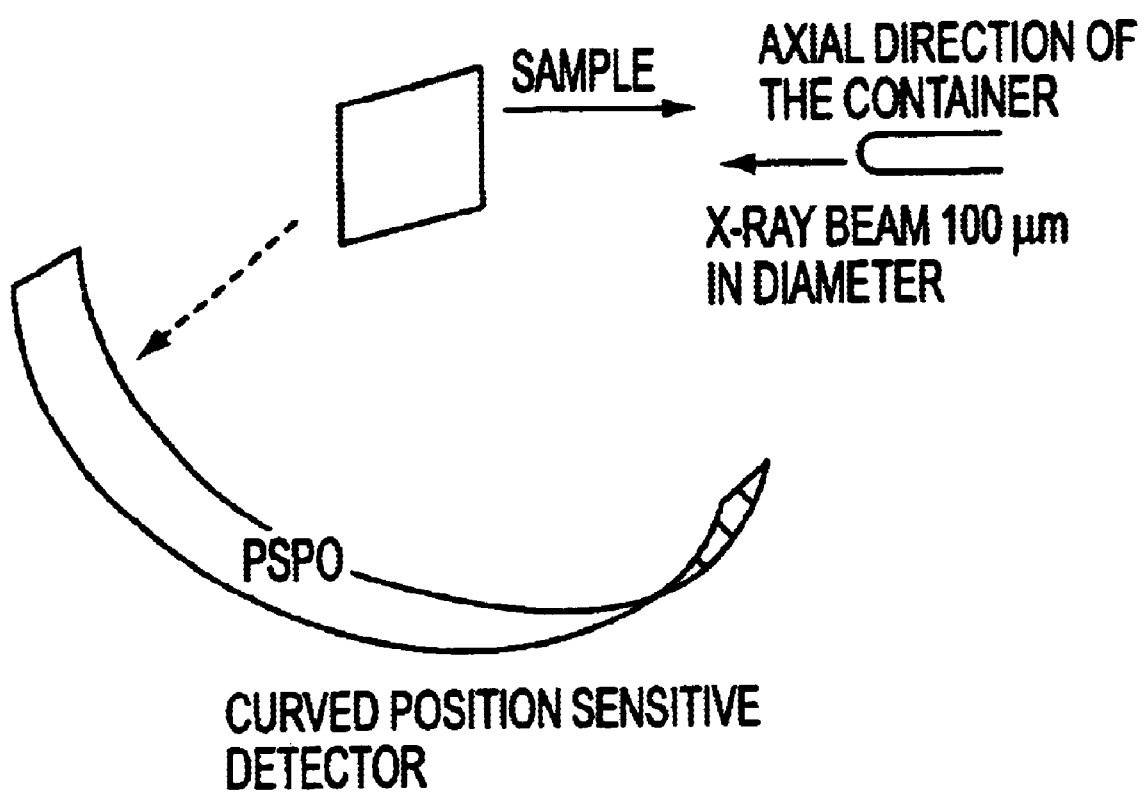
FIG. 1 is a diagram illustrating the principle of X-ray diffraction by using a curved PSPC microdifractometer.

Referring to FIG. 1 illustrating the X-ray diffraction method used in this invention, the samples to be measured are cut out from the lower part (sample is cut about a center which is 10 mm above the bottom) and from the upper part (sample is cut about a center which is 15 mm below the flange) of the barrel portion of the heat-molded container, and are mounted in a sample holder of a curved PSPC (position sensitive proportional counter) microdiffractometer (PSPC-MDG) in a manner that the X-ray is perpendicularly incident on the container wall surface and that the axial direction of the container is in agreement with the optically vertical direction of the device. The X-ray is converged by a collimator into a fine beam, caused to be incident on the surface of the sample perpendicularly thereto, and the position (2θ) of the diffracted line and the intensity thereof are recorded on the PSPC.

Figure 2:
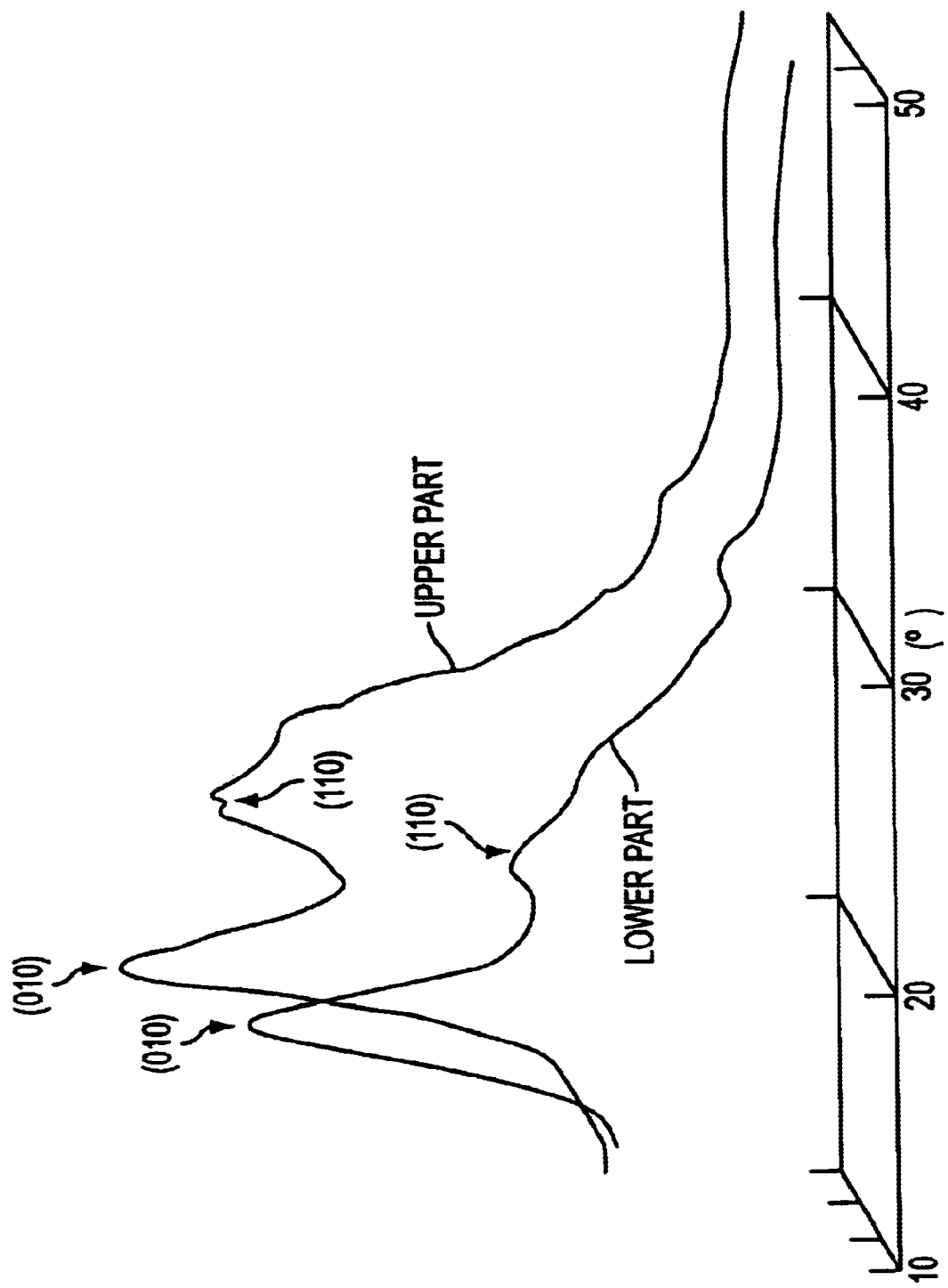
FIG. 2 is a diagram of X-ray diffraction of a barrel portion of a container according to the present invention.

FIG. 2 shows an X-ray diffraction image of the upper part and the lower part of the barrel portion of the container of the present invention measured as described above.

Figure 3:
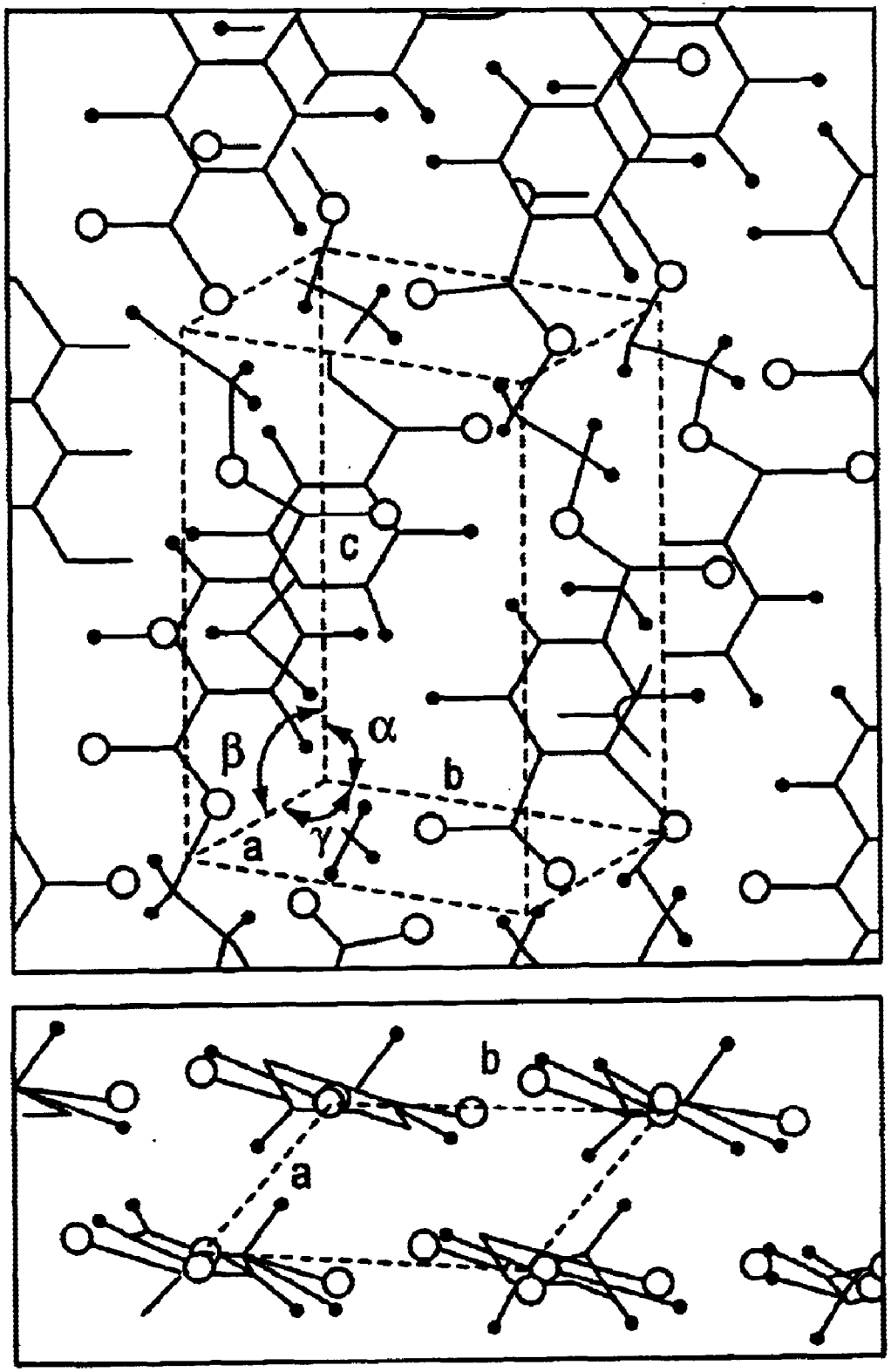
FIG. 3 is a diagram illustrating the crystal lattice of a polyethylene terephthalate.

In general, it has been known that the crystalline structure of the polyethylene terephthalate is of the triclinic system having the following lattice constants; i.e., $a=4.56$ angstroms
$b=5.94$ angstroms
$c=10.75$ angstroms
$\alpha=98.5°$
$\beta=118°$
$\lambda=112°$ Referring to FIG. 3 illustrating the atomic arrangement of crystal unit lattice of a polyethylene terephthalate, the molecular chains of the polyethylene terephthalate are extending in the direction of c-axis and are positioned at the ridgelines in the direction of c-axis, and a plane including a benzene ring is nearly along the surface of an index of a plane (100).

In the measurement of the above-mentioned PSPC-MDG in connection with the crystalline polyethylene terephthalate (PET), diffraction peaks appear conspicuously on the surfaces having, generally, indexes of planes (010), (−110), (100) and (105). Relationships between the planes (hkl) of the crystal unit lattices and the diffraction angle 2θ are as tabulated below,

| (h, k, l) | 2θ |
|---|---|
| (010) | 16° to 18° |
| (−110) | 22° to 24° |
| (100) | 26° to 27° |
| (105) | 42° to 45° |

Figure 4:
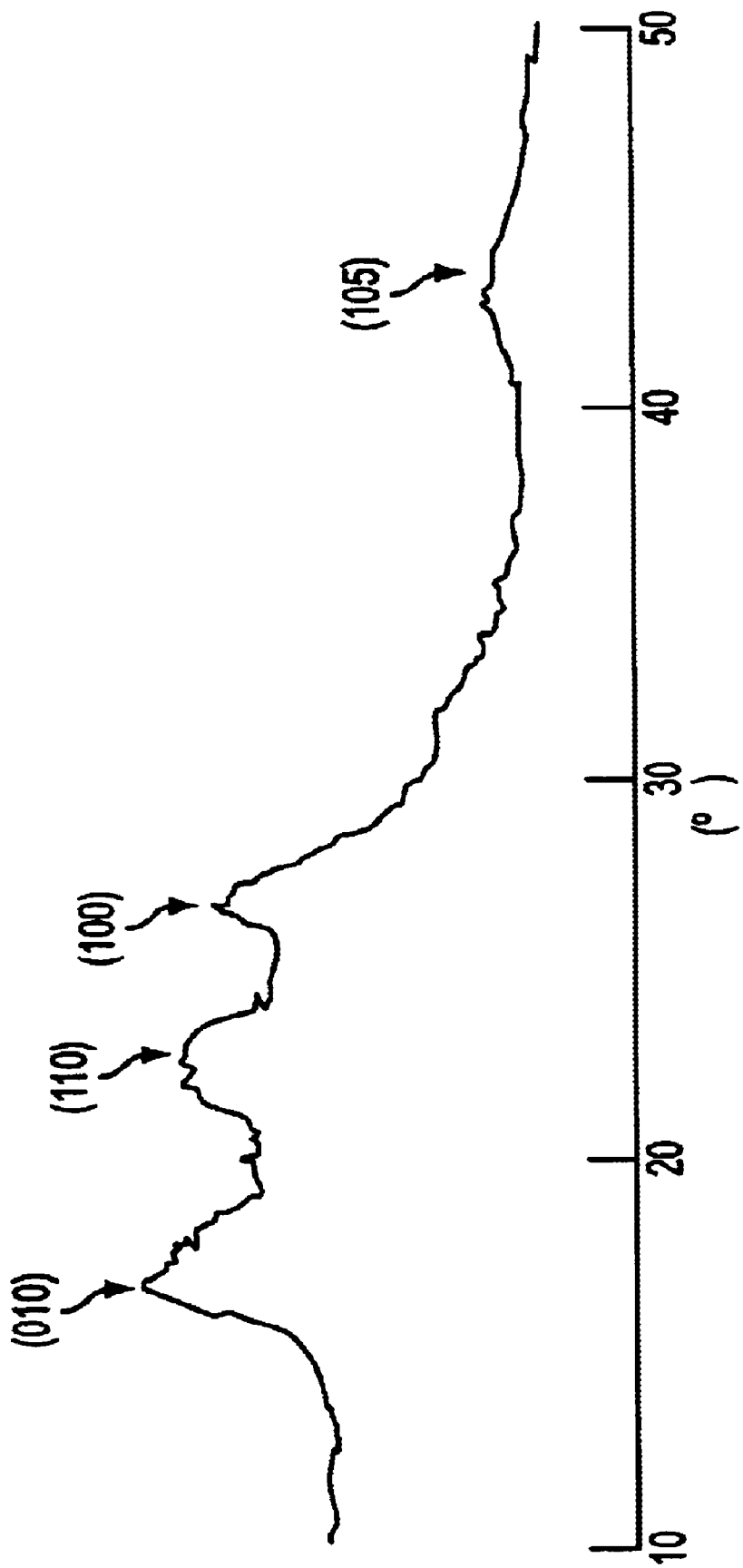
FIG. 4 is a diagram of X-ray diffraction of a crystalline polyethylene terephthalate.

FIG. 4 is a diagram of X-ray diffraction image of a barrel portion of a crystalline polyethylene terephthalate container by using the PSPC-MDG, and in which are clearly appearing diffraction peaks of the surfaces having the above-mentioned indexes of planes (010), (−110), (100) and (105).

When the X-ray diffraction image of the barrel portion of the PET container of the present invention shown in FIG. 2 is compared with the X-ray diffraction image of the crystalline PET shown in FIG. 4, diffraction peaks are conspicuously appearing on the surfaces having indexes of planes (010) and (−110) in the case of the barrel portion of the container of the present invention, whereas diffraction peaks are disappearing on the surface having the index of a plane (100).

Further, when the X-ray diffraction image of the upper part of the barrel portion of the container in FIG. 2 is compared with the X-ray diffraction image of the lower part of the barrel portion of the container, it is obvious that the diffraction peak intensity of the surface having the index of a plane (−110) is decreasing in the lower part of the barrel portion compared to the upper part of the barrel portion while the diffraction peak intensity of the index of a plane (010) is increasing.

In the PET crystals, it was pointed out already that the plane including the benzene ring is nearly in line with the surface having the index of a plane (100). Here, however, the surface having the index of a plane (010) is at right angles with the benzene plane, X-axis and Y-axis.

In the barrel portion of the container of the present invention, the X-ray diffraction image shown in FIG. 2 is conspicuous, i.e., the diffraction peaks are conspicuous on the surfaces of the indexes of planes (010) and (−110), whereas the diffraction peaks are extinguishing in the X-ray diffraction image of the surface of the index of a plane (100), from which it is reasonable to consider that, in the barrel portion of the container, the benzene plane is arranged in parallel with the wall surface of the barrel portion of the container.

That is, in the X-ray diffraction method, if the benzene plane is nearly in parallel with the surface of the sample sheet, the diffraction on the plane (100) is not measured but the diffraction is measured on the plane (010) which is nearly perpendicular thereto. A large diffraction peak intensity on the plane (010) means that the benzene plane of a unit of ethylene terephthalate is in parallel with the surface of the sheet. Conversely, a large diffraction peak intensity on the plane (100) means that the benzene plane of a unit of ethylene terephthalate is inclined with respect to the film surface and is not in parallel therewith.

The ratio Iu(−110)/Iu(010) and the ratio IL(−110)/IL(010) in the above-mentioned formulas (1), (2) and (3) represent, in a standardized manner, the degrees of parallelism between the benzene plane of PET and the wall surface of the barrel portion at the upper and lower parts of the barrel portion of the container. The ratios become small when the degree of parallelism is large and becomes large when the degree of parallelism is small.

In biaxially stretching the polyethylene terephthalate containing a plane a phenylene group in the molecular chains thereof, however, it has been known that the plane of the phenylene group is arranged in parallel with the film surface (see, for example, Journal of the Academy of Fibers, Vol. 33, No. 10, 1977).

The container of the present invention, therefore, is biaxially oriented despite it is formed by heat-molding the polyethylene terephthalate sheet, and the degree of the biaxial orientation is increasing in the lower part of the barrel portion, which is quite an unexpected fact.

In the present invention it is important that the ratio Iu(−110)/Iu(010) and the ratio IL(−110)/IL(010) lie in the ranges satisfying the above-mentioned formulas (1), (2) and (3) from the standpoint of accomplishing the impact resistance, heat resistance and transparency. If all of them are not satisfied, both the impact resistance and the heat resistance become inferior as demonstrated in Comparative Examples 1 to 5 appearing later.

In the present invention, it is desired that the ratio Iu(−110)/Iu(010) is not larger than 1.02 and, most desirably, not larger than 1.0. It is further desired that the ratio IL(−110)/IL(010) is not larger than 0.89 and, most desirably, not larger than 0.7.

It is further desired that the difference between the ratio Iu(−110)/Iu(010) and the ratio IL(−110)/IL(010) is not smaller than 0.13 and, particularly, not smaller than 0.20.

In the container of the present invention, it is desired that the wall at the lower part of the barrel portion has a crystallinity of not smaller than 15% and, particularly, not smaller than 17% as measured by the density method.

In this specification, the crystallinity stands for the density method crystallinity (Xcv) expressed by the following formula, $$Xc = \frac{\rho c \times (\rho - \rho a)}{\rho \times (\rho c - \rho a)} \times 100$$

wherein $\rho$ is a density (g/cm$^3$, 25° C.) of the sample measured by using a density-gradient tube, $\rho a$ is a density of a perfectly amorphous substance and is, generally, 1.335 g/cm$^3$ in the case of the PET, $\rho c$ is a density of a perfect crystal and is, generally, 1.455 g/cm$^3$ in the case of the PET, and Xcv is a crystallinity (%).

When the crystallinity is not larger than 15%, the container exhibits a decreased heat resistance and cannot be used for hot-packaging the content.

In the container with a flange of the present invention, the flange portion may have any crystallinity. In one embodiment, the flange portion may have a crystallinity of smaller than 10% as measured by the density method. The flange portion having such a low crystallinity exhibits excellent heat-adhesiveness to the closure member. In another embodiment, the flange portion is so oriented and crystallized as to possess a crystallinity of not smaller than 20% as measured by the density method. The flange portion having such a high degree of crystallinity exhibits excellent mechanical properties and thermal stability.

A container according to the first embodiment of the present invention is obtained by heating a sheet provided with an amorphous thermoplastic polyester layer comprising chiefly an ethylene terephthalate unit at a sheet temperature (Ts) that satisfies the following formula (4), $$Tg < Ts < Tg + 50° \text{ C.} \qquad (4)$$

wherein Tg is a glass transition point of the thermoplastic polyester, and molding the sheet by using a plug having a bottom area of not smaller than 70% of the bottom area of the container and a plug temperature (Tp) that satisfies the following formula (5), $$Tg - 30° \text{ C.} < Tp \leq Tg + 30° \text{ C.} \qquad (5)$$

wherein Tg is the glass transition point of the thermoplastic polyester, in one step or two steps in a metal mold with a plug-assisted compressed air or vacuum, followed by heat-setting.

In the container of the present invention, the lower part of the barrel portion has preferentially been oriented biaxially as pointed out already. To form the container having such a profile of orientation, it was learned that the sheet temperature (Ts) and the plug temperature (Tp) must be maintained in suitable ranges in executing the molding with the plug-assisted compressed air or vacuum and, besides, the plug must have a proper shape.

That is, in effecting the molding with the plug-assisted compressed air or vacuum, the sheet is stretched onto the plug in the axial direction of the container and, hence, the wall of the barrel portion is chiefly monoaxially oriented. It is, however, important that the lower part of the barrel portion of the container of the present invention is biaxially oriented. This can be effectively done by pulling the sheet that is molded while supporting it on the plug and, particularly, by pulling the polyester of a portion of a small diameter on the bottom of the plug up to a barrel portion of the plug having a large diameter.

For this purpose, the sheet must be heated at a sheet temperature (Ts) that satisfies the above-mentioned formula (4), and the plug temperature (Tp), too, must satisfy the above-mentioned formula (5).

When the sheet temperature (Ts) exceeds the range of the formula (4) (see Comparative Example 1 appearing later), it becomes difficult to accomplish the orientation profile structure defined by the invention, and the container exhibits inferior impact resistance and inferior heat resistance.

When the sheet temperature (Ts) becomes lower than the range of the formula (4), the polyester is not plasticized to a sufficient degree and cannot be stretch-molded into a container.

Further, when the plug temperature (Tp) exceeds the range of the formula (5)(see Comparative Example 2 appearing later), it becomes difficult to accomplish the orientation profile structure defined by the invention, and the container exhibits inferior impact resistance and inferior heat resistance.

When the plug temperature (Tp) becomes lower than the range of the formula (5), the polyester sheet remains cold and cannot be stretch-molded into the container.

In the present invention, it is important to use the plug having a bottom area which is not smaller than 70% and, preferably, not smaller than 80% of the bottom area of the container in molding the sheet with the plug-assisted compressed air or vacuum, from the standpoint of imparting the orientation profile to the barrel portion.

When the bottom area of the plug becomes smaller than 70%, it becomes difficult to accomplish the orientation profile structure defined by the present invention, either, and the container exhibits inferior impact resistance and inferior heat resistance as demonstrated in Comparative Example 3 appearing later.

This is presumably due to that when the plug has a large bottom area, the polyester that is stretched up to the barrel portion of the plug remains in a sufficiently large amount in the bottom of the plug contributing to increasing the biaxial orientation due to the stretching in the axial direction and in the circumferential direction.

In the present invention, the molding with the plug-assisted compressed air or in vacuum and the heat-setting can be conducted in one step or in two steps.

In the one-step method, a metal mold is heated at a heat-setting temperature, the plug is advanced in the metal mold to draw the sheet, and the sheet that is drawn with the compressed air or in vacuum is inflated and is brought into contact with the metal mold to heat-set the barrel portion.

A two-step method, on the other hand, uses a metal mold that is cooled and a metal mold that is heated at a heat-setting temperature, wherein the plug is advanced in the metal mold that is cooled to draw the sheet, the sheet that is drawn with the compressed air or in vacuum is inflated to prepare a pre-molded article which is then put into the metal mold that is heated and is further inflated with the compressed air or in vacuum, and is brought into contact with the metal mold to heat-set the barrel portion.

In the present invention, it is desired that the metal mold used for the heat-setting has a metal mold temperature (Tm) that satisfies the above-mentioned formula (6).

Figure 5:
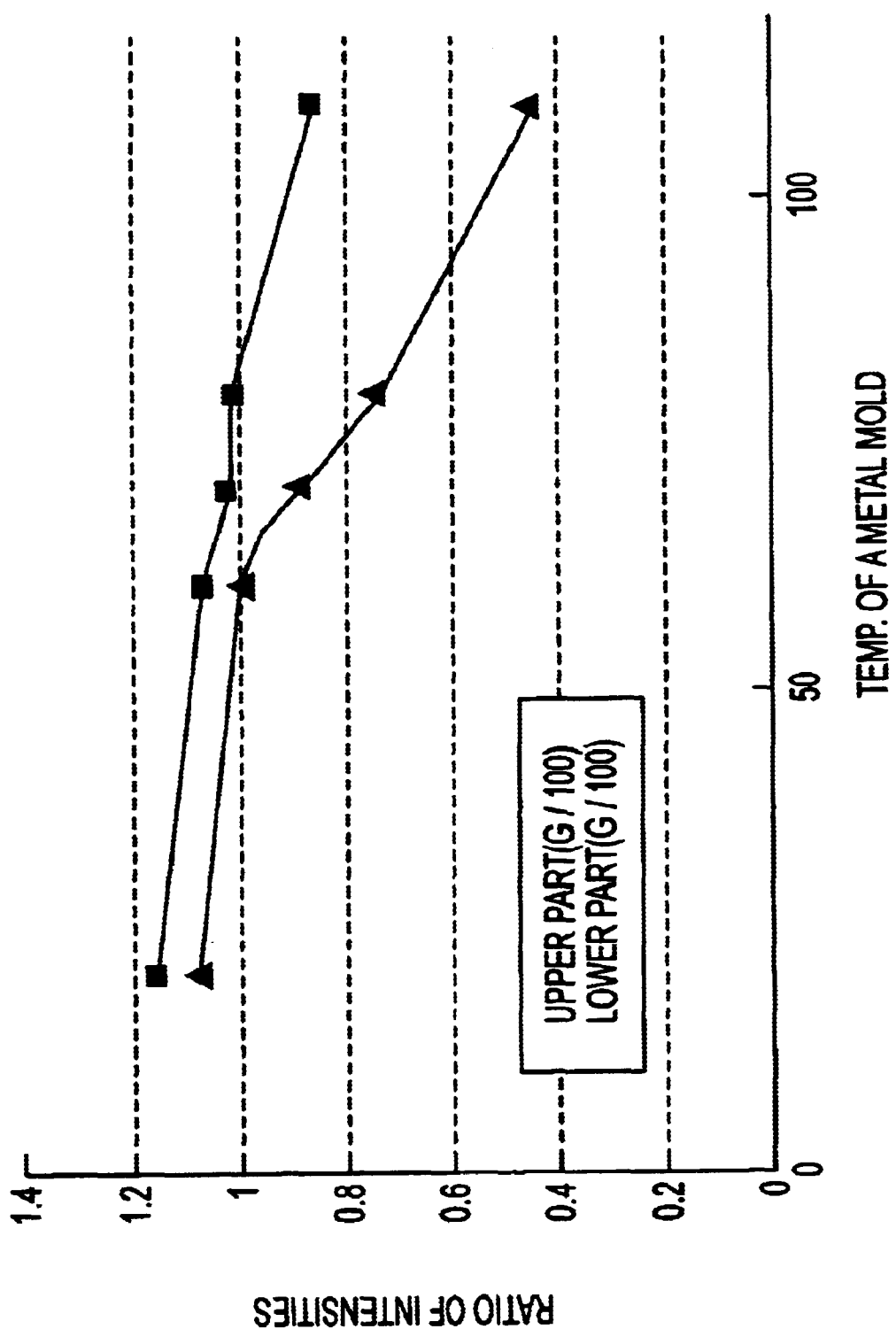
FIG. 5 is a graph illustrating a relationship between the temperature of a metal mold and the ratio of peak intensities.

FIG. 5 illustrates a relationship between the metal mold temperature (Tm) and the ratio of peak intensities (I(−110)/I(010)), from which it is learned that confining the metal mold temperature (Tm) in the range of the formula (6) is still effective in placing the profile of orientation within the range of the invention.

In the present invention, the container with a flange which is amorphous or lowly crystalline can be produced by the plug-assisted molding by holding a portion that becomes a flange by a clamp. On the other hand, the container with a flange which is oriented and crystallized can be produced by using a plug having a shoulder portion for forming flange, stretching even a portion that becomes a flange in a majority portion of the step of advancing the plug, and tightening the portion that becomes the flange between the shoulder portion and the metal mold in the last period of the step of advancing the plug.

Figure 6:
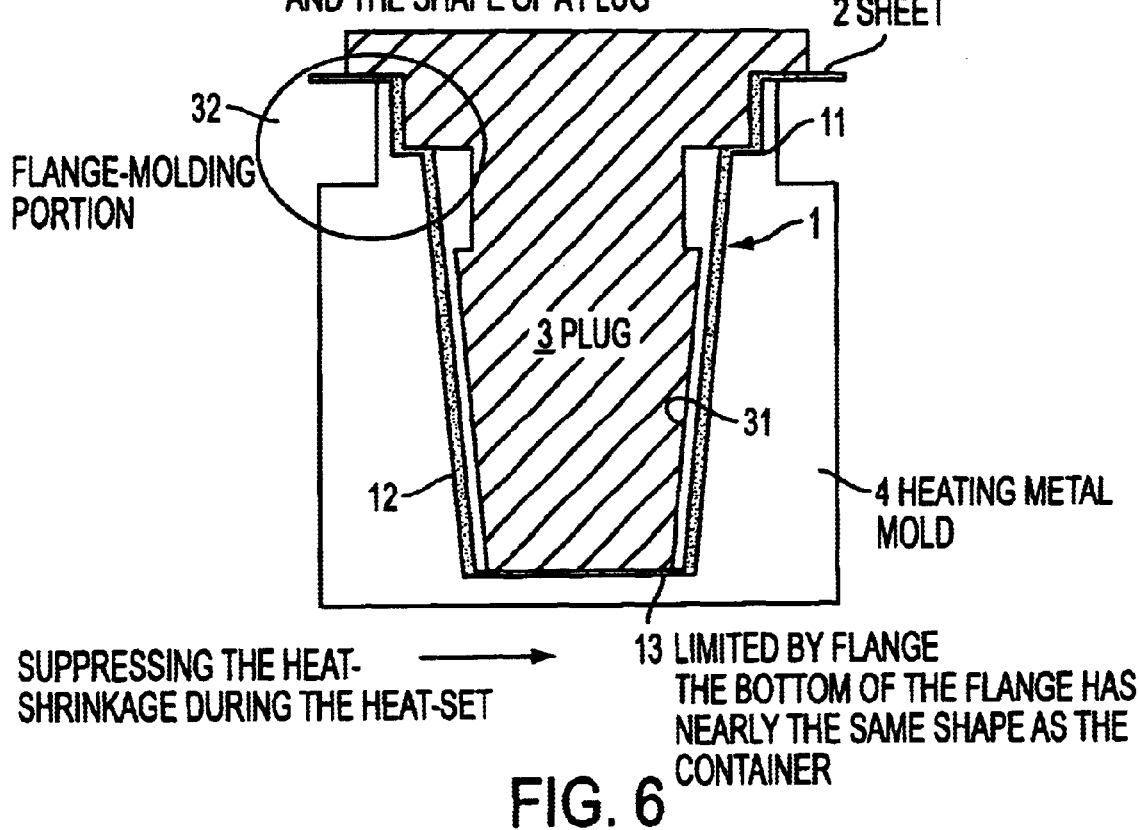
FIG. 6 is a sectional view illustrating a container of the present invention together with a plug and a metal mold that are used.

Referring to FIG. 6 which illustrates the container of the present invention together with the plug and the metal mold, the container 1 is produced by drawing the polyester sheet 2 by using the plug 3, inflating the polyester sheet 2 by the compressed air or vacuum in the metal mold, and bringing the wall of the container into contact with the metal mold so as to be heat-set.

The container 1 includes a flange portion 11, a barrel portion 12 and a closed bottom portion 13, the barrel portion 12 having crystallinity and orienion properties as described above.

It is desired that the container has a ratio (H/R) of the height (H) of the barrel portion 12 to the diameter (R) thereof of, generally, not smaller than 0.8 and, particularly, in a range of from 1.0 to 2.0.

In molding the sheet, the plastic sheet is heated at the above-mentioned sheet temperature (Ts). The plastic sheet is heated by using infrared rays or far infrared rays, by using a hot air furnace or by the conduction of heat.

The plug and the metal mold are maintained at the above-mentioned plug temperature (Tp) and at the metal mold temperature (Tm). These temperatures are controlled by turning on/off the heaters incorporated in the plug and in the metal mold, or by passing a heat medium through the plug and the metal mold to control the temperature.

It was pointed out already that the plug used for the present invention should have a bottom area of not smaller than 70% of the bottom area of the container. It is, however, desired that the end of the barrel portion of the plug, i.e., a portion that is continuous to the bottom portion is forming a tapered portion 31 of which the diameter gradually increases toward the upper side as shown in FIG. 6. That is, upon forming such a tapered portion 31, it is allowed to easily draw the polyester on the bottom portion of the plug onto the barrel portion, to produce the container 1 having a good orientation profile.

It is desired that the tapered angle (α) of the tapered portion 31 is from 0.5 to 10° and, particularly, from 2 to 6° and that the tapered portion 31 is formed at a ratio of from 0.3 to 0.9 times of the height of the plug.

In the embodiment shown in FIG. 6, further, the plug 3 has a flange-molding portion 32 so as to form a flange portion 11 that is oriented and crystallized.

The pressure applied to the sheet that is being molded may be the compressed air from the plug side or may be the vacuum from the metal mold side, or may be a combination thereof. In general, the pressure having a magnitude of from 2 to 10 kg/cm$^2$ is applied from the side of the inner surface of the sheet.

Second Embodiment

According to the method of producing a heat-resistant resin container of the present invention, a thermoplastic resin sheet is molded, by the compressed air, into the shape of a female mold that is heated to be higher than the crystallization temperature of the resin and is heat-set and, then, the pressure in the metal mold is decreased permitting the molded article to shrink to the shape of the plug which is of the shape of a final container, thereby to impart the shape and cool.

The plug used in the present invention has the shape and size in agreement with the shape and size of inner surfaces of the final container, whereas the female mold has the shape and size larger than the shape and size of outer surfaces of the final container. The plug and the female mold are arranged in concentric in such a manner that they bite each other and separate away from each other. Further, a clearance (in the radial direction and in the axial direction) is formed between the outer surface of the plug and the inner surface of the female mold to permit the inflation of the thermoplastic resin being molded by the compressed air from the inner side and to permit the shrinkage thereof due to a decrease in the pressure from the inner side.

The plug used in the present invention works to stretch-mold the resin sheet into a molded article (primary molded article) which is in agreement with the outer surface of the plug and to shrink-mold the resin sheet into a final molded article (tertiary molded article). In the one-step molding method, the primary molded article and the tertiary molded article have nearly the same shapes and sizes. In the two-step molding method, the primary molded article and the tertiary molded article may have the same or different shapes and sizes. On the other hand, the female mold used in the invention is to mold the primary molded article into a secondary molded article of a size larger than the primary molded article.

In the present invention, a feature resides in that the female mold is heated to heat-set the secondary molded article that is molded by the compressed air, the plug is cooled to impart the shape to the tertiary molded article that has shrunk due to a reduction in the pressure and to remove it out, and the functions are separately effected, i.e., the female mold effects the heating and the plug effects the cooling.

According to the production method of the present invention, therefore, the female mold is only heated while the plug is only cooled, and the molded article needs stay in the metal mold for a very shortened period of time contributing to improving the productivity as compared to when the plug and the metal mold are heated and cooled alternately.

The primary molded article obtained by the stretch-molding being assisted by the plug is further smoothly molded into the secondary molded article by using the compressed air from the inside of the primary molded article (i.e., from the inside of the plug). Moreover, the secondary molded article that is heat-set, is smoothly shrink-molded into a final container (tertiary molded article) by reducing the pressure from inside the secondary molded article (i.e., from inside the plug). Thus, the molding operation by using the female mold and the molding operation by using the plug are very smoothly carried out in cooperation without at all wasting the time.

According to the present invention, the molding operation can be put into practice by either the one-step method or the two-step method without departing from the above-mentioned spirit and scope of the invention. The one-step molding method is conducted through the following steps by using a pair of plugs in combination with the female mold; i.e., ①  stretch-molding into a primary molded article by using the plug;

②  molding the primary molded article into a secondary molded article using the compressed air;

③  heat-setting the secondary molded article by using the female mold;

④  shrink-molding the heat-set secondary molded article into a tertiary molded article by reducing the pressure; and ⑤  cooling the tertiary molded article by using the plug.

The two-step molding method is the same as the one-step molding method with respect to that the above-mentioned basic steps ① to ⑤ are executed in the order as described above. The two-step molding method, however, is different using plural pairs of plugs and plural female molds in combination, executing the steps ① and ② by using one pair of plugs and one female mold, and executing the steps ③, ④ and ⑤ by using another pair of plugs and another female mold. In other respects, these methods are in common.

In molding the container, the thermoplastic resin sheet must have been heated at a temperature at which the stretch-molding can be effected. The sheet temperature (Ts) differs depending upon the kind of the resin but is, usually, not lower than a glass transition temperature (Tg) of the resin but is not higher than the crystallization temperature of the resin. In the case of the sheet provided with an amorphous thermoplastic polyester layer, it is desired that the sheet temperature (Ts) satisfies the following formula (7), $$Tg<Ts<Tg+50° \text{ C}. \tag{7}$$

(particularly, Tg+20° C.<Ts<Tg+30° C.)

wherein Tg is a glass transition point of the thermoplastic polyester.

When the temperature is not higher than Tg, the stretching becomes locally excessive in executing the primary molding, and favorable thickness profile is not obtained. When the temperature is not lower than Tg+50° C., on the other hand, the sheet is not oriented to a sufficient degree, and the container lacks the strength and is whitened, too.

In the present invention, the plug is for stretch-molding molding the resin sheet and, hence, must have a surface area over at least a predetermined range. It is usually desired that the plug has a surface area which is not smaller than 3 times and, particularly, from 5 to 10 times as great as the to-be-molded area of the thermoplastic resin sheet.

The to-be-molded area of the thermoplastic resin sheet stands for the area of the sheet on the inside of a portion that is held as a flange in molding the sheet.

When the surface area of the plug is smaller than the above-mentioned range, it becomes difficult to impart molecular orientation to the molded container to a sufficient degree. Namely, the container exhibits insufficient mechanical strength, decreased heat resistance and, besides, the walls thereof are whitened during the heat-setting.

The surface temperature Tp of the plug differs depending upon the plug of the first step and the plug of the second step in the one-step method and the two-step method.

(One-step Molding Method)

$$Tg<Tp<Th \tag{8}$$

wherein Tg is a glass transition point of the thermoplastic polyester, and Th is a heat-setting temperature by using the female mold described later.

When the plug temperature is lower than the above range, the stretching becomes locally excessive in executing the primary molding, and it is not allowed to obtain the primary molded article having a good thickness profile.

When the plug temperature exceeds the above range, on the other hand, the plug exhibits a decreased effect for cooling and imparting the shape.

(Second Step in the Two-step Molding Method).

$$Tg<Tp<Tc \qquad (9)$$

wherein Tg is a glass transition point of the thermoplastic polyester, and Tc is a crystallization start temperature of the thermoplastic polyester.

When the plug temperature is lower than the above range, the stretching becomes locally excessive in executing the primary molding, and it is not allowed to obtain the primary molded article having a good thickness profile.

When the plug temperature exceeds the above range, on the other hand, the sheet is partly whitened in the initial stage of the stretch-molding and it is not allowed to obtain the primary molded article having a transparent and favorable surface.

(First Step in the Two-step Molding Method).

$$Tg-30° C.<Tp<Th \qquad (10)$$

wherein Tg is a glass transition point of the thermoplastic polyester, and Th is a heat-setting temperature by using the female mold described later.

When the plug temperature is lower than the above range, the female mold exhibits a decreased effect for heat-setting, and an extended period of molding time is required for accomplishing a predetermined heat-setting.

When the plug temperature exceeds the above range, on the other hand, the plug exhibits a decreased effect for cooling and imparting the shape.

The female mold has a cavity of a size larger than the plug in either the radial direction or the axial direction. Due to the difference in the size (clearance), the secondary molded article is biaxially oriented as it is being molded with the compressed air. The clearance gives an important meaning in the lower part of the barrel portion of the container, in preventing the bottom portion from being whitened, in the rate of molding and in imparting resistance against deformation by heating.

It is desired that the clearance CL between the plug and the female mold is 0.3 mm$\leq$CL$\leq$1.0 mm and, particularly, 0.5 mm$\leq$CL$\leq$0.75 mm. The CL which is not larger than 0.3 mm lowers the cooling efficiency, rate of molding, heating efficiency and resistance against deformation by heating. On the other hand, the CL which is not smaller than 1.0 mm deteriorates the shape-imparting performance.

The heat-setting temperature (Th) by the female mold is higher than the resin sheet temperature (Ts) as a matter of course and is, generally, from 120 to 220° C. and, particularly, from 150 to 200° C. When the heat-setting temperature is lower than the above range, the heat resistance is not imparted to a sufficient degree. When the heat-setting temperature exceeds the above range, on the other hand, the resin of the flange portion is thermally deteriorated resulting in a drop in the mechanical strength of the resin.

The heat-resistant resin container of the second embodiment of the present invention is obtained by molding the thermoplastic polyester sheet, at least the side wall of the container being oriented and crystallized by stretching, and the crystallinity in the outer surface of the side wall being greater than the crystallinity in the inner surface thereof.

The heat-resistant resin container of the present invention has a feature in that the crystallinity (Co) in the outer surface of the side wall of the container is greater than the crystallinity (Ci) in the inner surface thereof due to that the outer surface of the secondary molded article is heat-set upon coming in contact with the inner surface of the female mold.

The container of the present invention, therefore, includes the outer surface layer having excellent heat resistance and rigidity, and the inner surface layer having flexibility and impact resistance, which are being distributed in the direction of thickness, creating a structure having excellent heat resistance and impact resistance in combination. In the flange portion, further, the surface to be heat-sealed has a low crystallinity offering an advantage of excellent heat-sealability.

It is desired that the crystallinity (Co) in the outer surface is not smaller than 20% and, particularly, from 25 to 50%, and that the difference (Co–Ci) between the crystallinity (Co) in the outer surface and the crystallinity (Ci) in the inner surface is not smaller than 10% in the flange portion, and is not smaller than 1% in other portions, from the standpoint of attaining the above-mentioned effect.

The heat-resistant resin container of the present invention has the flange portion, the side wall portion and the bottom portion. Here, it is desired that the ratio (H/D) of the height (H) of the container to the diameter (D) of the container is not smaller than 0.5 and, particularly, in a range of from 1.2 to 2.3, from the standpoint of moldability, imparting molecular orientation and appearance.

In the present invention, the female mold that is used is heated at the heat-setting temperature, and the wall of the flange portion is less subject to be molecularly oriented. In general, therefore, the container is obtained having a flange portion that is cloudy. On the other hand, the side wall of the container is effectively and molecularly oriented suppressing lamella crystallization and is, hence, transparent when there is contained no pigment exhibiting excellent appearance.

The container of the present invention has excellent heat resistance suppressing a change in the volume to be not larger than 1.0% even after the container is heat-treated in an oven at such a temperature that the side wall of the container is heated at 90° C. for 3 minutes.

The molding operation according to the second embodiment of the present invention will now be described with reference to FIGS. 8 to 18 of the accompanying drawings.

(Constitution of the Device)

Figure 8:
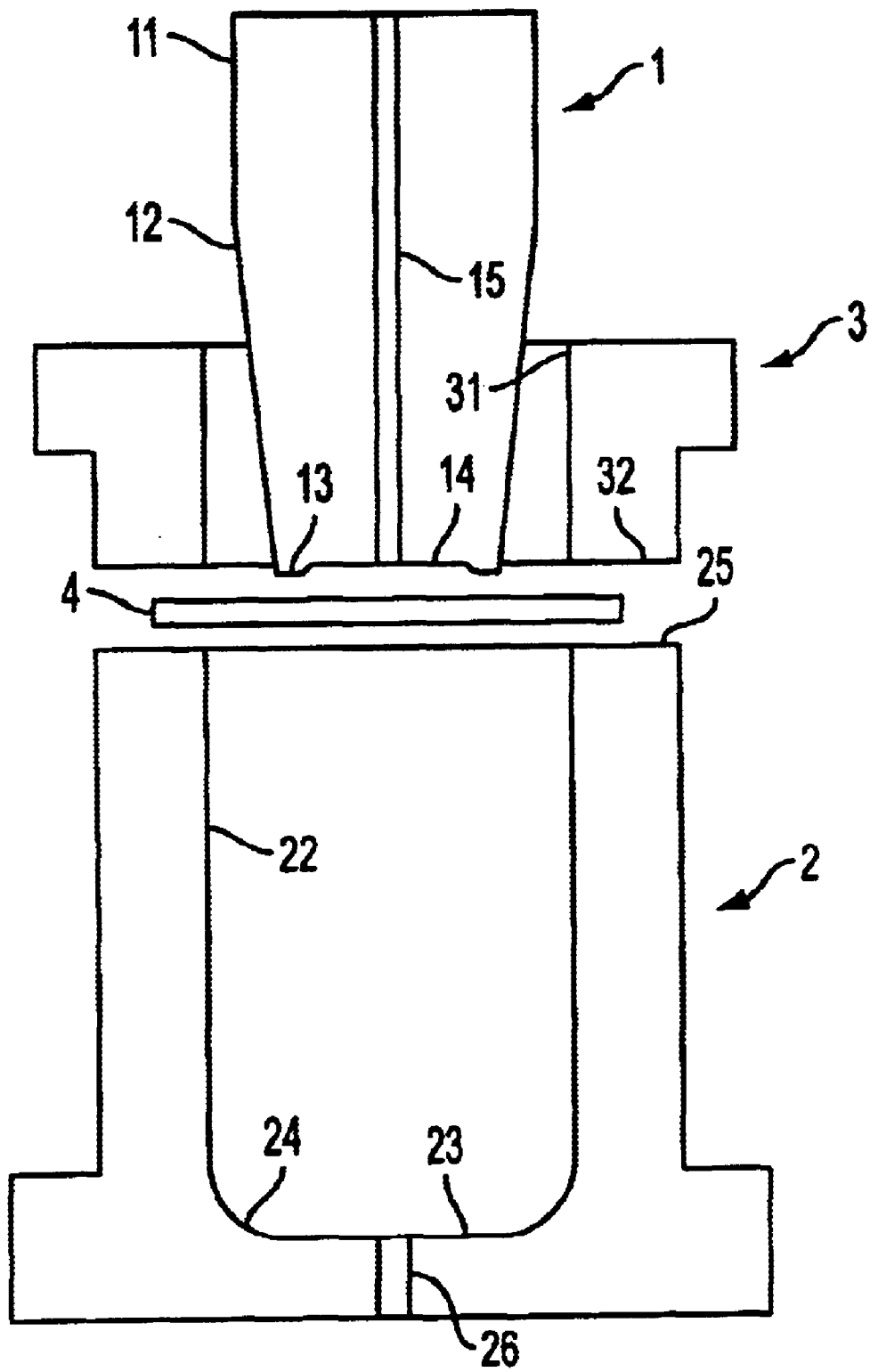
FIG. 8 is a side sectional view illustrating a step of supplying a thermoplastic resin sheet in a one-step molding method.

The device used for the production method of the invention roughly comprises, as shown in FIG. 8, a plug 1, a female mold 2 and a clamping metal mold 3.

The plug 1 works to stretch-mold the resin sheet 4 into an article (primary molded article) that comes in agreement with the outer surface of the plug, and to shrink-mold it to a final article (tertiary molded article). Here, the primary molded article and the tertiary molded article are nearly in agreement in shape and in size.

If described in further detail, the plug 1 includes a short cylindrical portion 11 that serves as a stack portion of the container in an upper part on the outer surface thereof, and a tapered portion 12 connected to the lower side of the cylindrical portion and having a diameter contracting downward. An annular rim 13 is formed along the periphery in the bottom of the plug 1, the annular rim 13 protruding downward in an arcuate shape by a small distance in cross section. A bottom panel 14 is positioned in the annular rim 13 and is protruding upward by a small distance from the lower end of the rim. A gas passage 15 is formed in the axial direction of the plug 1 for introducing the compressed air and for reducing the pressure.

The female mold 2 used in the present invention works to mold the primary molded article formed by using the plug 1 into a secondary molded article of a size larger than the primary molded article by using the compressed air, and to heat-set the secondary molded article that is formed.

If described in further detail, the female mold 2 has in the upper part thereof a holding surface 25 for holding the peripheral edge of the resin sheet in cooperation with the clamping metal mold 3. Further, a gas passage 26 is formed in the central portion of the female mold for discharging or supplying the gas.

The clamping metal mold 3 is to clamp the peripheral edge of the resin sheet in cooperation with the holding surface of the female mold 2, and comprises a short hollow cylinder. That is, the clamping metal mold 3 has an inner surface 31 of a diameter nearly the same as the cylindrical inner surface of the female mold, and has a holding surface 32 at the lower end thereof for holding the peripheral edge of the disk-like resin sheet.

The plug 1, the female mold 2 and the clamping metal mold 3 are arranged in concentric, the plug 1 and the female mold 2 being allowed to move relative to each other in the axial direction (up and down in the drawing) so as to be in mesh with each other and to separate away from each other, and the clamping metal mold 3 being similarly allowed to move in the axial direction.

(Step of Supplying the Thermoplastic Resin Sheet)

In FIG. 8, either the plug 1 or the female mold 2 is at an ascended position and the other one is at a descended position, and the resin sheet 4 heated at a stretching temperature is supplied into between the female mold 2 and the clamping metal mold 3.

(Step of Clamping/Pre-stretching the Thermoplastic Resin Sheet)

Figure 9:
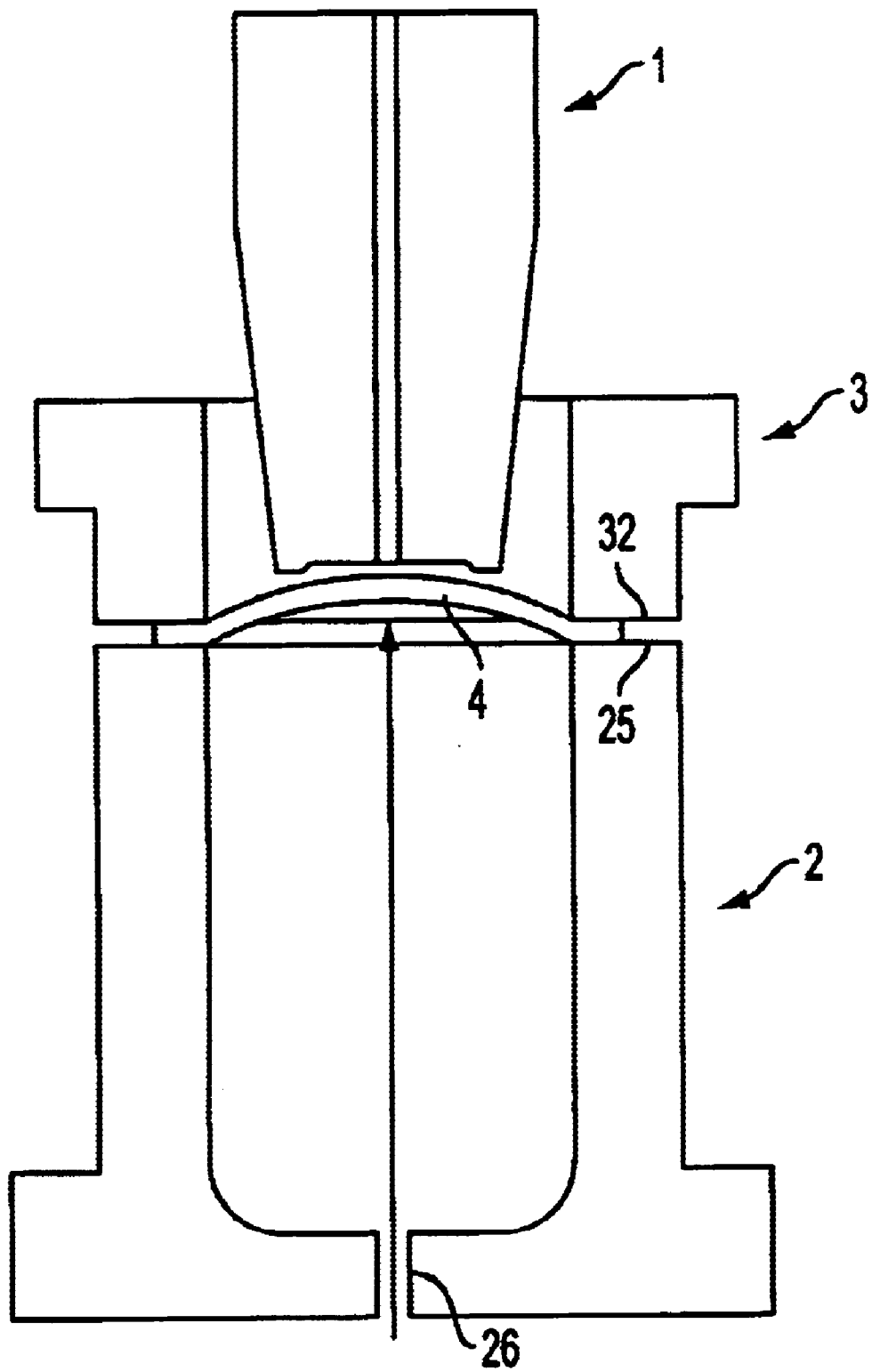
FIG. 9 is a side sectional view illustrating a step of clamping and pre-stretching the thermoplastic resin sheet in the one-step molding method.

Then, the clamping metal mold 3 is lowered to hold the peripheral edge of the resin sheet 4 between the holding surface 25 of the female mold 2 and the holding surface 32 of the clamping metal mold 3 as shown in FIG. 9.

The resin sheet 4 that is clamped is, then, inflation-deformed in a direction opposite to the direction in which the plug 1 is pushed by using the compressed air, in order to stretch and orient the stacking portion at the upper part of the side wall of the container. In this embodiment, therefore, the compressed air is supplied through the gas passage 26 of the female mold 2 to inflation-deform the resin sheet 4 upward like a dome. Therefore, a slightly inner portion of the resin sheet that is clamped is effectively and molecularly oriented to establish a structure which is thermally and mechanically strong.

(Step of Stretch-molding into the Primary Molded Article)

Figure 10:
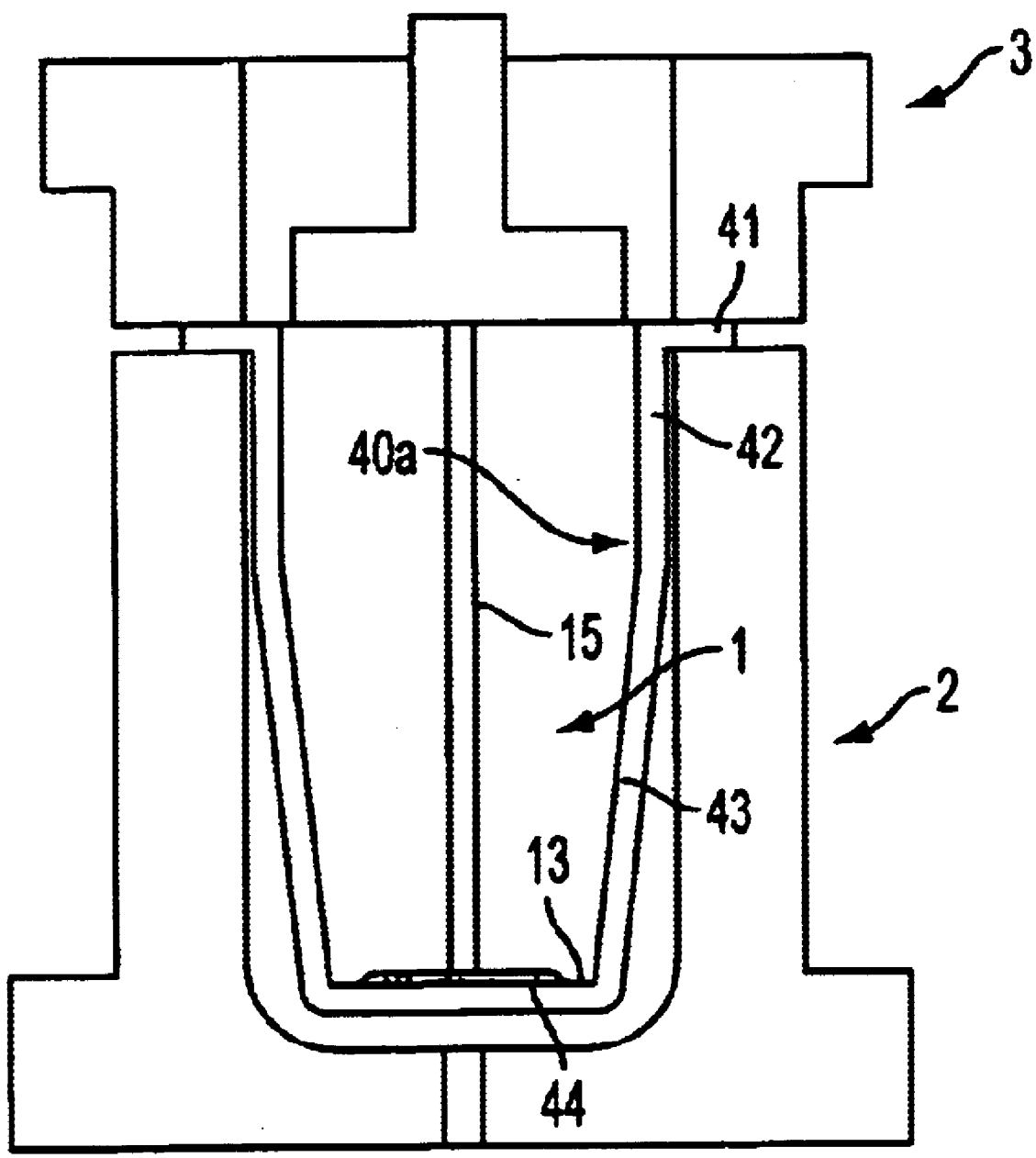
FIG. 10 is a side sectional view illustrating a step of stretching the thermoplastic resin sheet in the one-step molding method.

The plug 1 is pushed into the resin sheet 4 that is clamped. Referring to FIG. 10, the resin sheet is stretched in a shape in line with the outer surface of the plug 1 except a bottom wall portion 44, and is molded into a primary molded article 40a. That is, a flange portion 41 is formed between the holding surface 25 of the female mold 2 and the holding surface 32 of the clamping metal mold 3, a stacking portion 42 is formed on the outer surface side of the cylindrical portion 11 of the plug 1, and a tapered portion 43 is formed on the outer surface side of the tapered portion 12 of the plug 1. Further, a bottom portion 44 is formed so as to be supported by an annular rim portion 13 of the plug 1.

(Step of Molding into the Secondary Molded Article with the Compressed Air and of Heat-setting)

Figure 11:
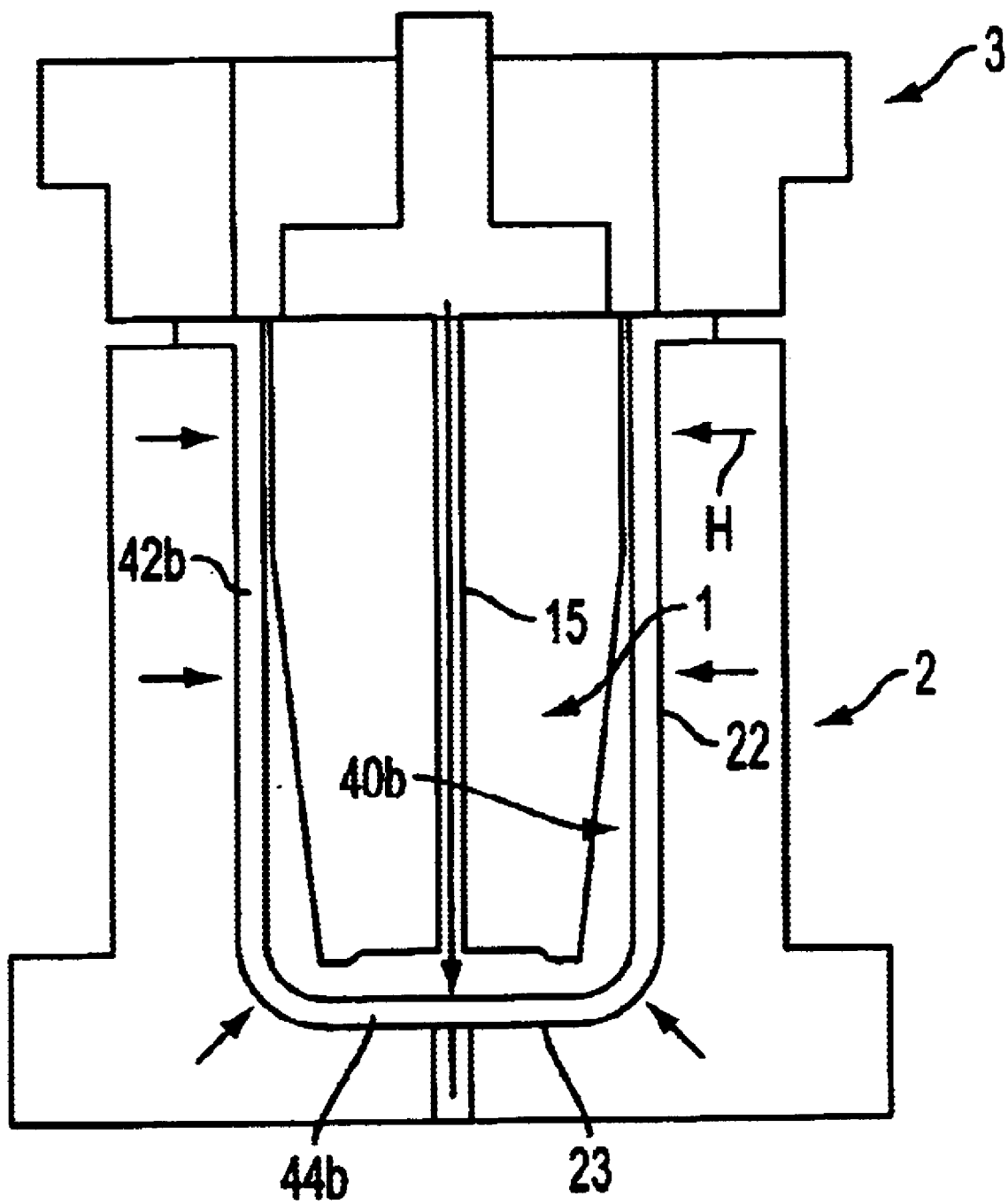
FIG. 11 is a side sectional view illustrating a step of compressed air-molding and heat-setting into a secondary mold in the one-step molding method.

The compressed air is supplied into the interior of the primary molded article 40a in FIG. 10 through the gas passage 15 in the plug 1 and/or a gap between the plug 1 and the inside of the flange portion of the secondary molded article 40b. Referring to FIG. 11, the primary molded article is formed into a secondary molded article 40b comprising a side wall portion 42b along the cylindrical inner surface 22 of the female mold 2 and a bottom wall portion 44b along the inner bottom surface 23 of the female mold 2.

The inner surface of the female mold 2 has been heated at a temperature for heat-setting the resin and, besides, the secondary molded article 40b is pressed onto the inner surface of the female mold 2 due to the compressed air from the interior. As shown in FIG. 11, therefore, the secondary molded article 40b is heat-set due to heat H conducted from the female mold 2, whereby the resin is crystallized and distortion in the mold is relaxed.

(Step of Shrinking into the Tertiary Mold, Imparting the Shape and Cooling)

Figure 12:
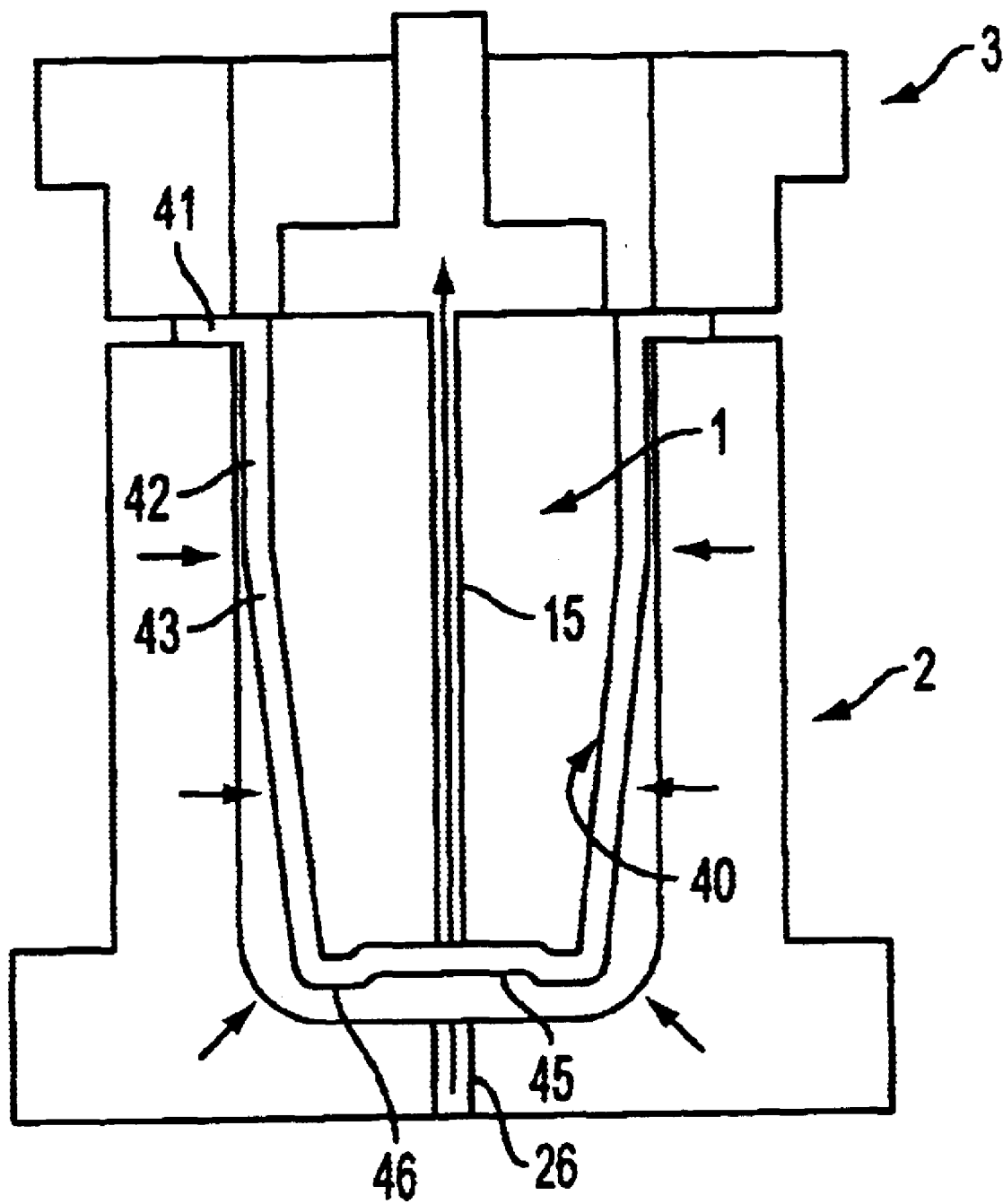
FIG. 12 is a side sectional view illustrating a step of shrinking, shaping and cooling a tertiary molded article in the one-step molding method.

As the secondary molded article 40b is progressively heat-set and as the compressed air is no longer supplied from the interior, the secondary molded article 40b starts shrinking as shown in FIG. 12.

Then, the pressure is reduced through the gas passage 15 of the plug 1 and/or through the above-mentioned gap. As required, the compressed air is supplied through the gas passage 26 of the female mold 2, whereby the secondary molded article 40b that is heat-set is correctly shaped following the outer surface of the plug 1 as shown in FIG. 12, and is cooled down into a state in which it can be taken out.

The thus obtained finally molded article (tertiary molded article) 40 includes a flange portion 41, a cylindrical stacking portion 42 continuous to the inner periphery of the flange portion, a tapered portion 43 contracting downward to be continuous to the lower end of the stacking portion, a rim portion (grounding portion) 46 protruding downward to be continuous to the lower end of the tapered portion, and a panel-like bottom portion 45 positioned over the rim portion maintaining a small distance.

(Step of Parting the Tertiary Molded Article)

Figure 13:
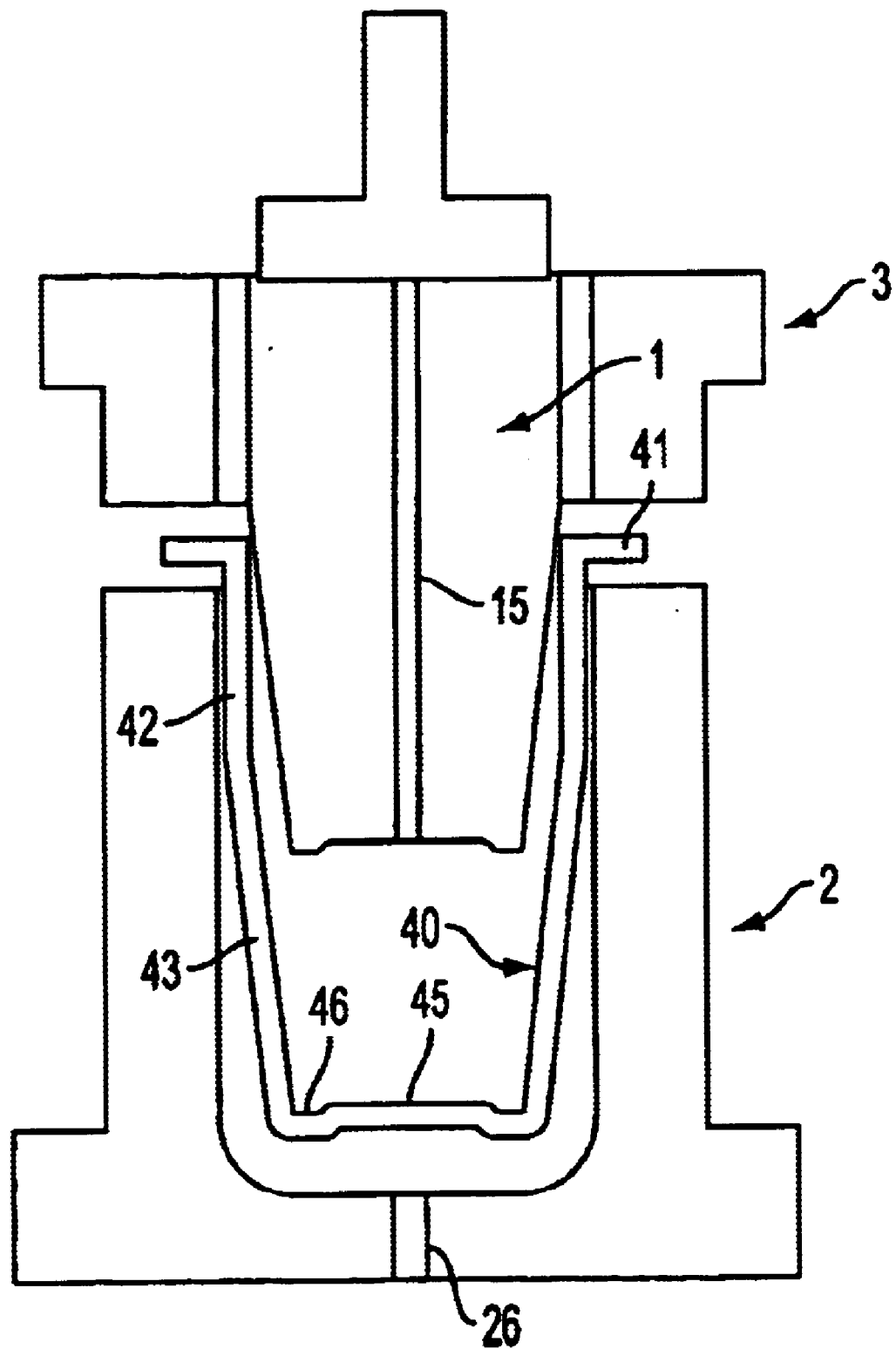
FIG. 13 is a side sectional view illustrating a step of parting the tertiary molded article in the one-step molding method.

Finally, referring to FIG. 13, the plug 1 and the clamping metal mold 3 ascend, and the tertiary molded article 40 is taken out from the female mold 2. To accomplish good parting, the air can be blown onto the molded article 40 through the gas passages 15 and 26.

(Two-step Molding Method)

The two-step molding method is carried out by using a first pair of plugs 1a, a female mold 2a, a clamping metal mold 3a, a second pair of plugs 1b, a female mold 2b and a clamping metal mold 3b. These devices, however, are basically constituted in the same manner as those used in the one-step molding method. The temperature of the female mold 2a in the first step is adjusted to be not higher than the glass transition point Tg of the resin, and the female mold 2b in the second step is heated at the heat-setting temperature.

Figure 14:
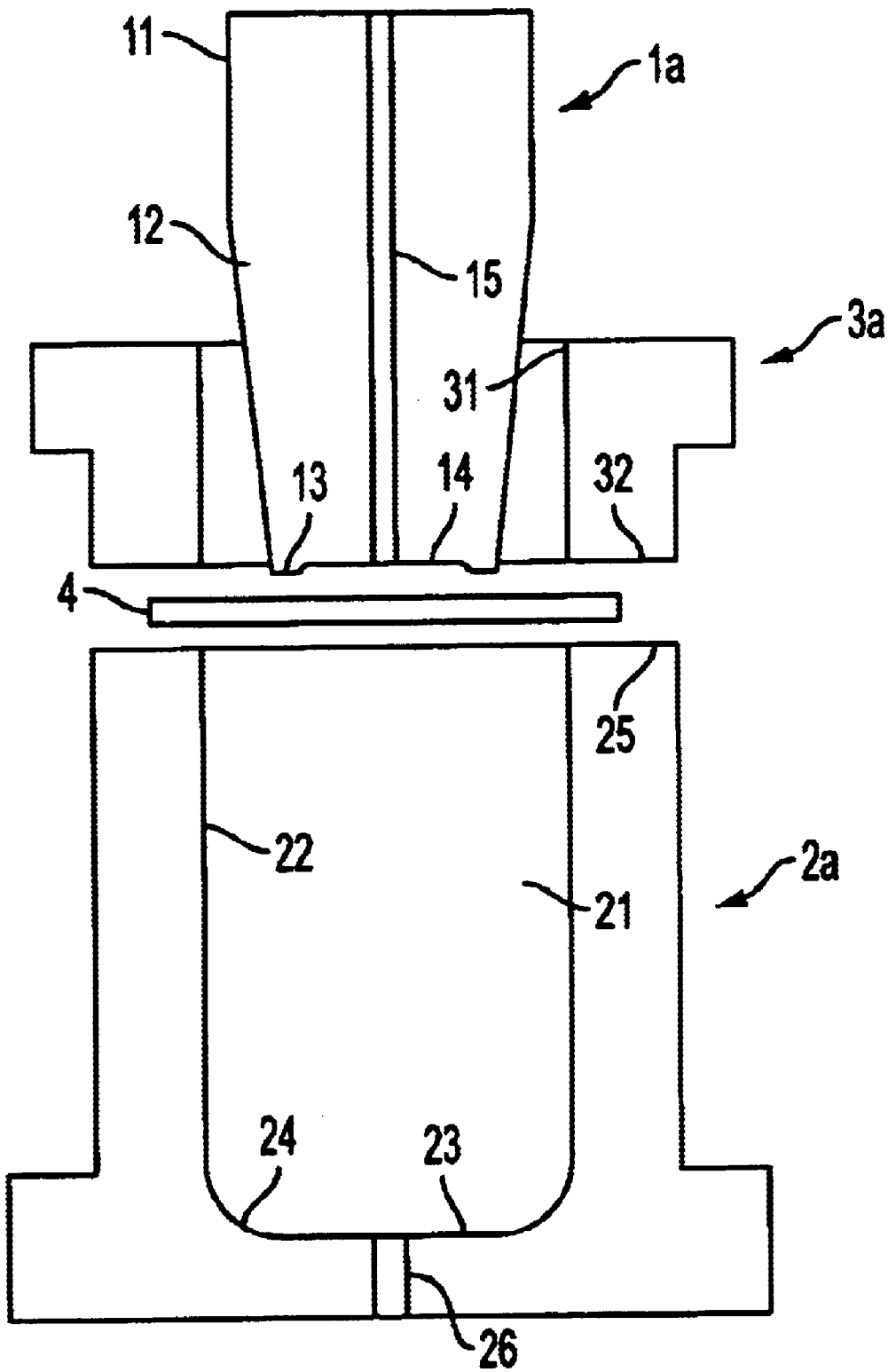
FIG. 14 is a side sectional view illustrating a step of supplying the thermoplastic resin sheet in a first step in a two-step molding method.
Figure 15:
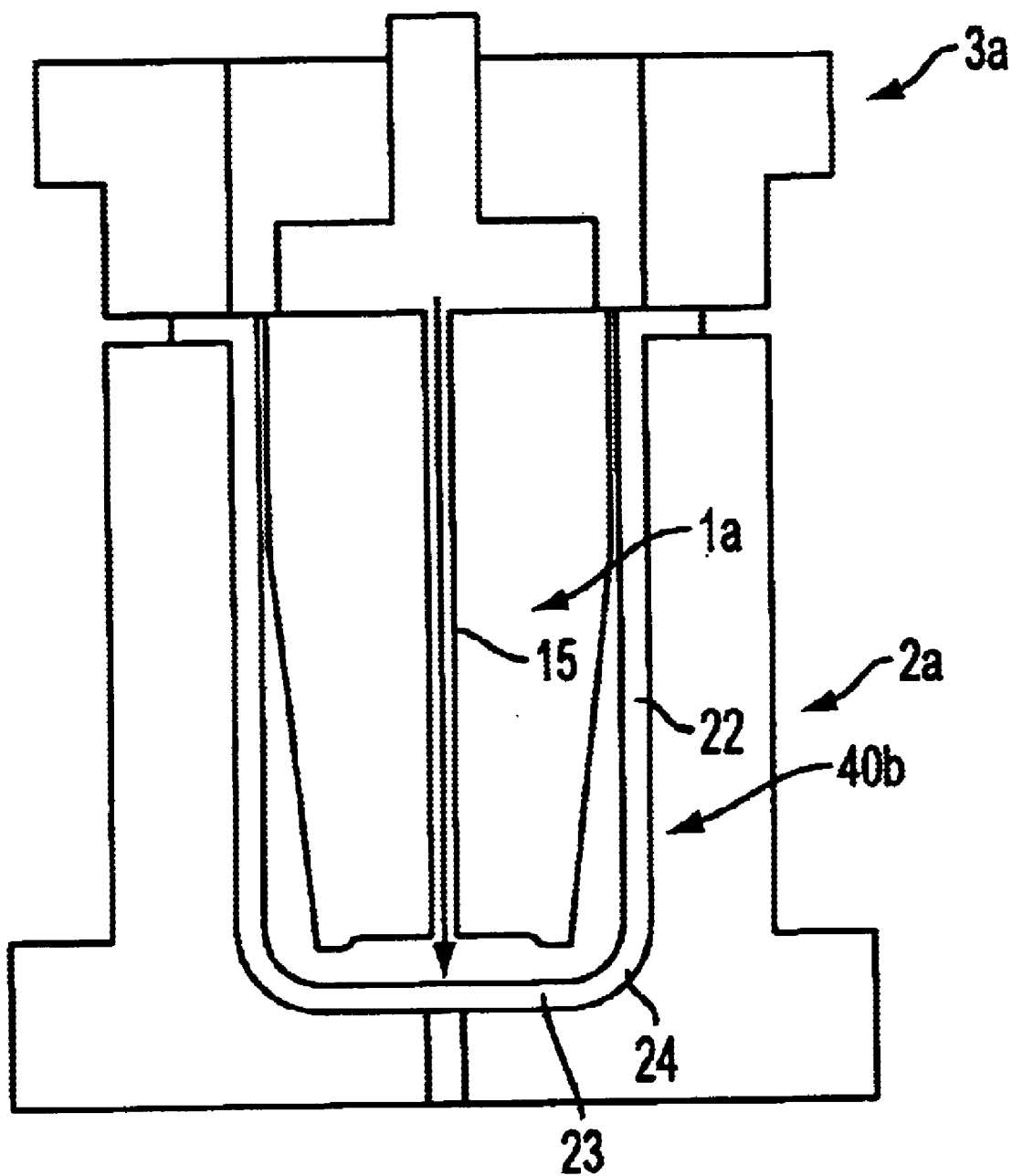
FIG. 15 is a side sectional view illustrating a step of compressed air-molding the primary molded article into the secondary molded article in the first step in the two-step molding method.

The step of supplying the thermoplastic resin sheet in FIG. 14 is the same as that of FIG. 8, the step of clamping and pre-stretching the thermoplastic resin sheet is the same as that of FIG. 9, the step of stretching the thermoplastic resin sheet is the same as that of FIG. 10, and the step of molding the primary molded article into the secondary molded article by using the compressed air in FIG. 15 is the same as that of FIG. 11. Here, however, the temperature on inner surface of the female mold 2a is adjusted to be not higher than the glass transition point Tg, and the primary molded article 40a is shaped to acquire the shape of the inner surface of the female mold 2a to obtain the secondary molded article 40b. The plug may have the shape the same as the finally molded article or different therefrom.

Figure 16:
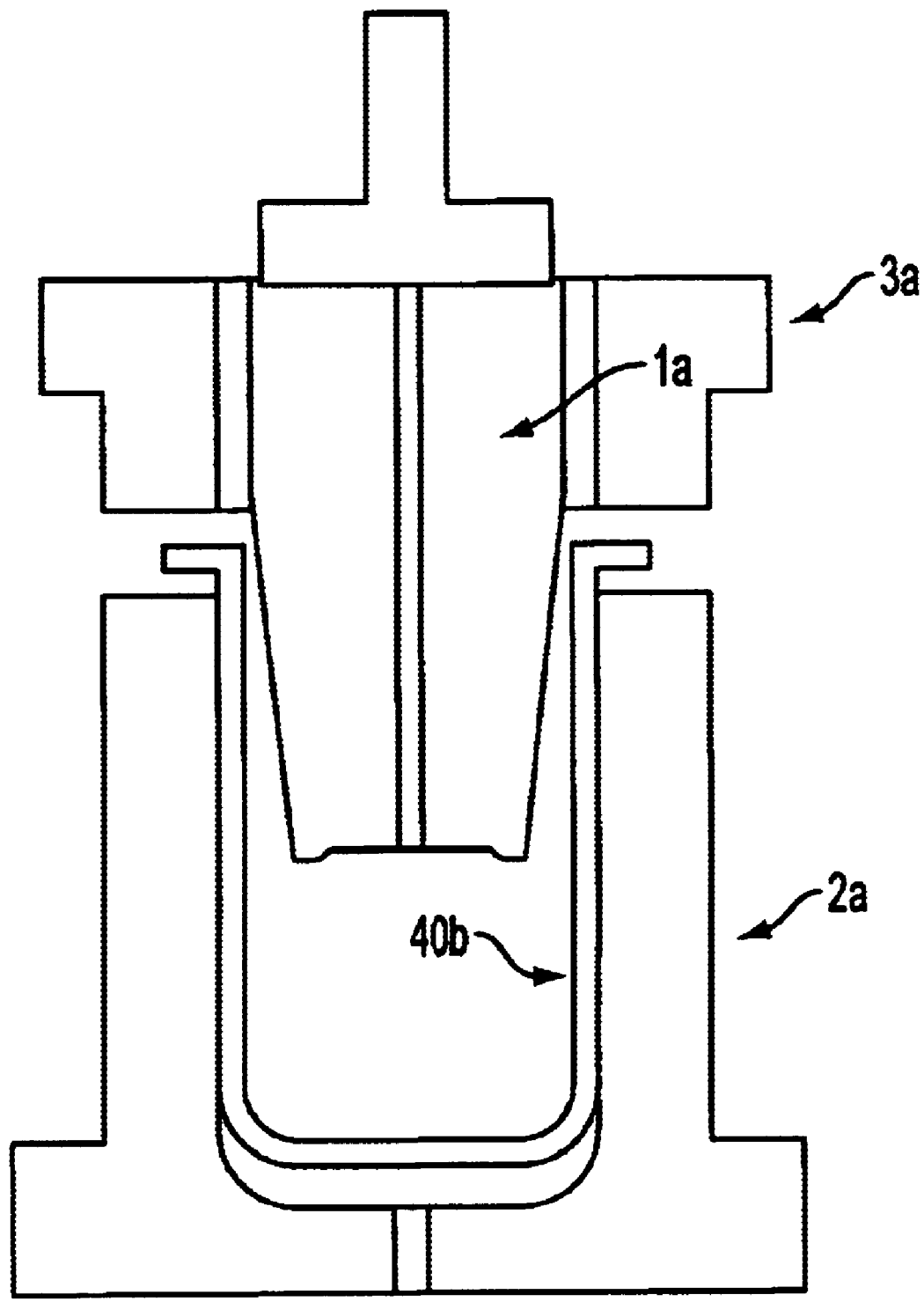
FIG. 16 is a side sectional view illustrating a step of parting the secondary molded article in the first step in the two-step molding method.

In the step of parting the secondary molded article in FIG. 16, the female mold 2a descends, the plug 1a and the clamping metal mold 3a ascend, and the secondary molded article 40b that has not been heat-set is taken out from the female mold 2a.

Figure 17:
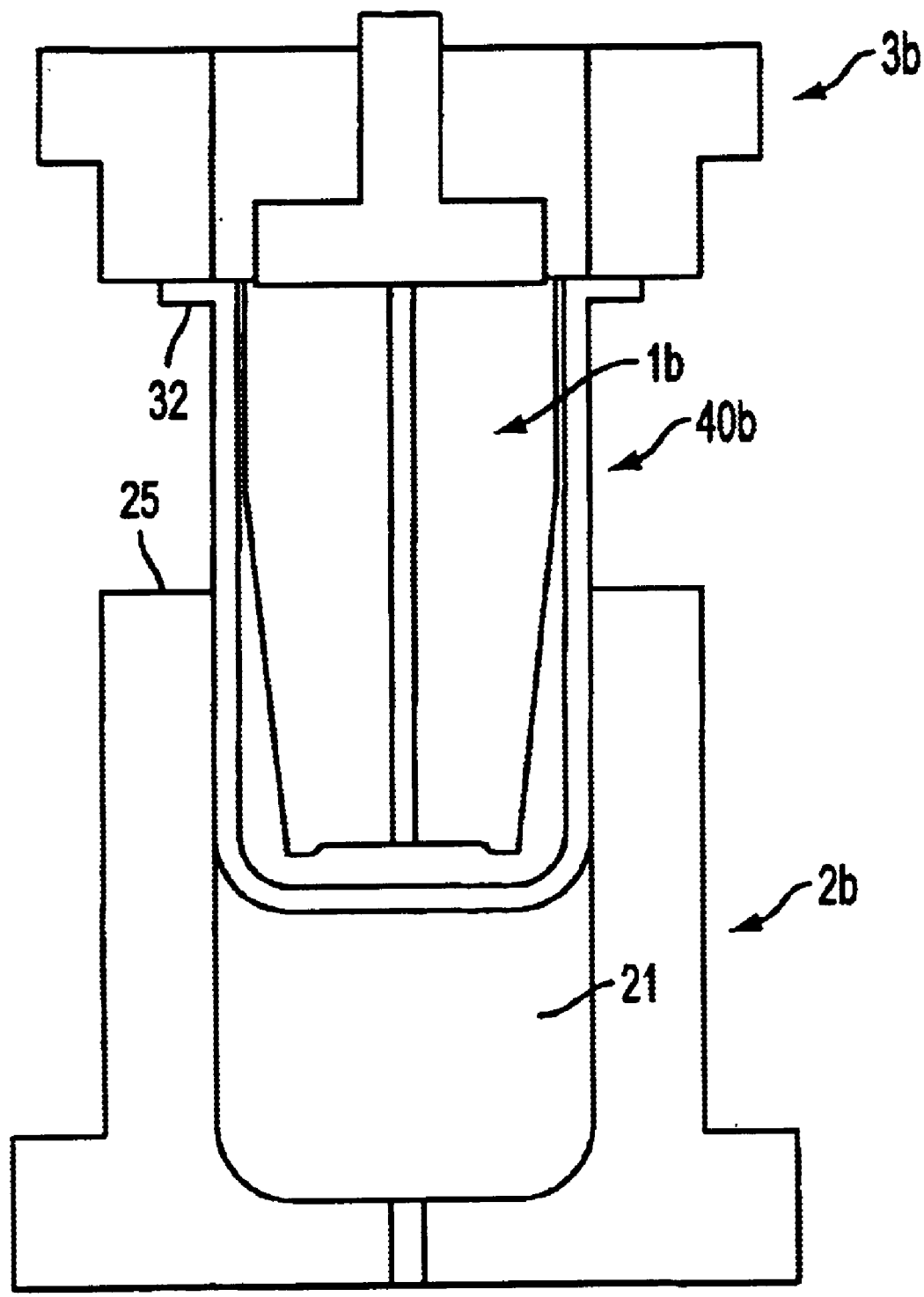
FIG. 17 is a side sectional view illustrating a step of inserting the secondary molded article in the metal mold in the second step in the two-step molding method.

In the step of inserting the secondary molded article into the metal mold in FIG. 17, the secondary molded article 40b is held by the plug 1b and the clamping metal mold 3b, and is inserted in the cavity 21 of the female mold 2b. The flange portion 41 of the secondary molded article 40b inserted in the cavity 21 of the female mold 2b is held by the holding surface 25 of the female mold 2b and by the holding surface 32 of the clamping metal mold 3b.

Figure 18:
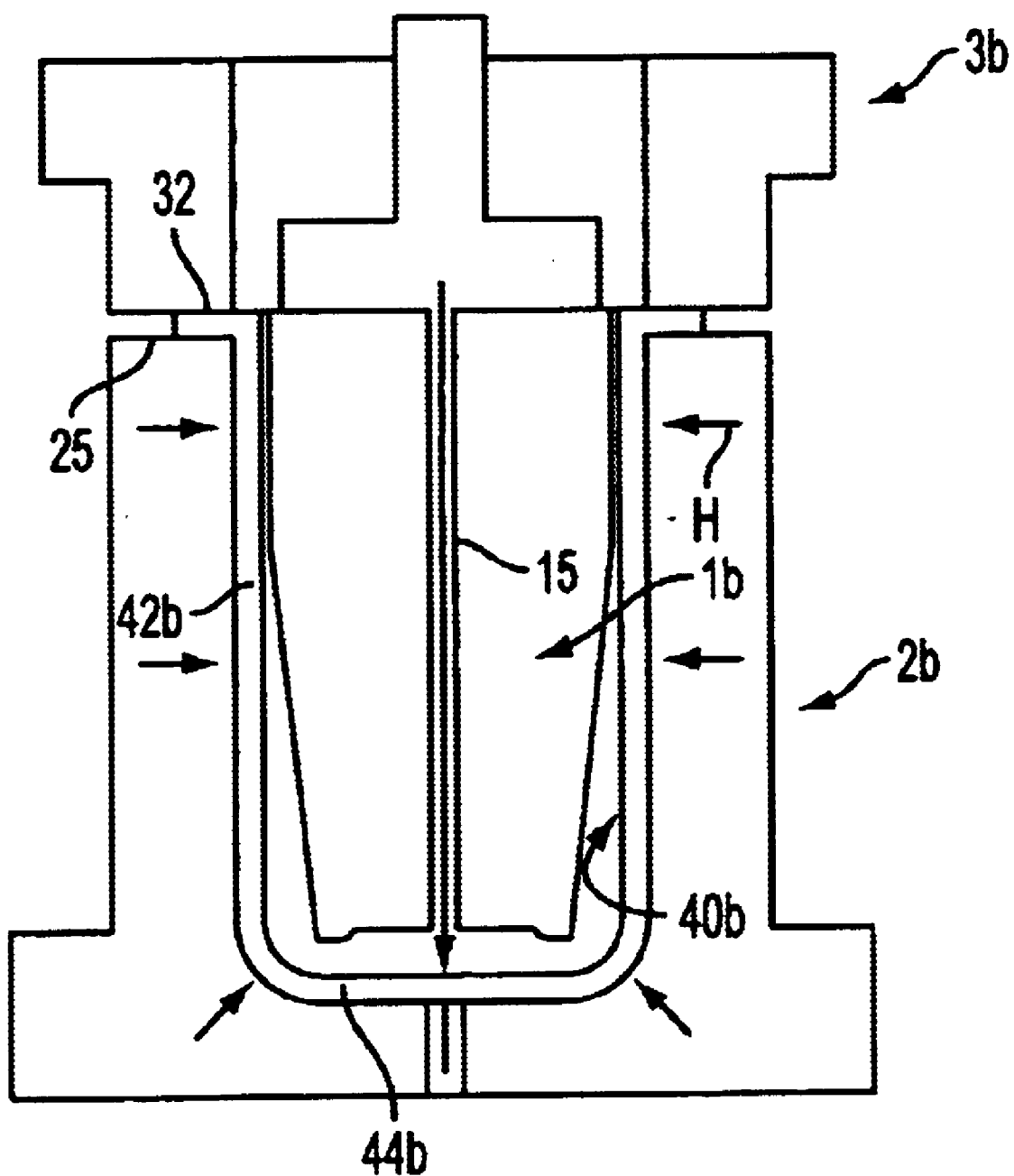
FIG. 18 is a side sectional view illustrating a step of compressed air-molding and heat-setting the secondary molded article in the second step in the two-step molding method.

In the step of molding the secondary molded article with the compressed air and heat-setting the secondary molded article in FIG. 18, the wall of the secondary molded article 40b is pressed onto the inner surface of the female mold 2b that has been heated at a heat-setting temperature by utilizing the compressed air introduced through the gas passage 15 of the plug 1b and/or the gap between the plug 1 and the inner side of the flange portion of the secondary molded article 40b.

The step of heat-setting the secondary molded article is the same as the one shown in FIG. 11, the step of shrinking the secondary molded article into the tertiary molded article, imparting the shape to it and cooling it is the same as the one shown in FIG. 12, and the step of parting the tertiary molded article is the same as the one shown in FIG. 13. Therefore, these steps with reference to these drawings are not described here.

Third Embodiment

In this embodiment of the invention, the heat-resistant container is produced in three steps; i.e., forming a pre-molded article, forming an intermediate article and forming a final container. Here, a distinguished feature resides in that the intermediate article is formed and the final container is formed both by heating (heat-setting) the solid-phase-molded article, heat-shrinking the molded article, and cooling and shaping the heat-shrunk article.

That is, by conducting the solid-phase molding in one step, the wall of the final container is molecularly oriented (surface oriented) to a conspicuous degree not only in the barrel portion but also in the center of the bottom portion. Upon conducting the heat-setting in the second step following the solid-phase molding, further, the orientation and crystallization are promoted. Moreover, by effecting the heat-shrinking following the heat-setting, the distortion is effectively relaxed.

In the heat-resistant container of the present invention, therefore, deformation due to heat is effectively prevented at the time of heat-sterilization such as sterilization by boiling even in the bottom portion which is an important portion for imparting the self-standing performance to the container or for imparting self-standing stability. Besides, the barrel portion of the container exhibits excellent impact resistance withstanding the impacts of when it falls down. Even in the bottom portion which can be least oriented, no spherulite is formed, exhibiting not only excellent impact resistance but also very good appearance such as transparency.

Upon effecting the heat-shrinking between the heat-setting and the cooling/shaping, further, good heat efficiency is accomplished since the functions are separated between the heating portion and the cooling portion as compared to when the heating and cooling are effected in the same portion and, besides, the time for occupying the mold can be shortened. Therefore, the method of the present invention accomplishes such advantages as decreasing the energy cost and improving the productivity.

(1) Molding into the Pre-molded Article.

In the present invention, the pre-molded article is desirably obtained by molding the sheet in solid phase, i.e., by pressing the sheet using the plug for pre-molding, the sheet being clamped by the clamping metal mold and by the female mold for pre-molding, and by supplying the compressed gas into between the sheet and the plug.

In molding the sheet in this case, it is desired that the sheet is maintained at a temperature of from the glass transition point (Tg) of the thermoplastic polyester +15° C. to the glass transition point +40° C. The range of from the glass transition point +15° C. to the glass transition point +40° C. is the one where the PET resin is most efficiently oriented and crystallized. When the sheet temperature is lower than the above range, the resin is over-stretched at the time of molding and is whitened. When the sheet temperature is higher than the above range, on the other hand, the resin is not oriented or crystallized to a sufficient degree and tends to become whitened in a subsequent step of heat-setting due to heat crystallization.

In forming the pre-molded article, further, it is desired to maintain the plug at a temperature of from the glass transition point of the thermoplastic polyester −30° C. to the glass transition point +20° C. When the plug temperature lies outside this temperature range, the resin temperature at the contact portion undergoes a change due to the contact with the plug during the stretch-molding, and the stretching is not evenly effected.

It is further desired to maintain the female mold for pre-molding at a temperature of from the glass transition point of the thermoplastic polyester +10° C. to the glass transition point +50° C. In order to efficiently promote the orientation and crystallization in the bottom portion of the pre-molded article, the female metal mold must be maintained at a temperature of from the glass transition point +10° C. of the thermoplastic polyester to the glass transition point +50° C.

The plug used for stretch-molding the resin sheet into the pre-molded article must have a surface area which lies at least within a predetermined range. It is, generally, desired that the plug has a surface area which is not smaller than 3 times and, particularly, from 5 to 10 times as large as the area to be molded of the thermoplastic resin sheet.

The area to be molded of the thermoplastic resin sheet stands for the area of the sheet on the inside of a portion that is held as a flange in molding the sheet.

When the surface area of the plug is smaller than the above range, it becomes difficult to molecularly orient the molded container to a sufficient degree; i.e., the container exhibits insufficient mechanical strength, decreased heat resistance, and is whitened on the walls during the heat-setting.

(2) Molding into an Intermediate Article.

It is desired that an intermediate article is molded from the pre-molded article by inserting the pre-molded article in the female mold for intermediate molding of which the temperature is adjusted while supporting the pre-molded article by the plug for intermediate molding, by shrinking the molded article along the outer surface of the plug, and shaping and cooling the molded article.

It is desired that the female mold for intermediate forming is maintained at a temperature of not lower than the crystallization start temperature of the thermoplastic polyester. The molded article efficiently heat-shrinks when the temperature of the female mold is high. When the temperature is set to be lower than this range, however, the molded article cannot be shrunk along the outer surface of the plug.

It is desired that the temperature of the plug for intermediate molding is not higher than the temperature of the female mold for intermediate molding and is maintained in a range of from 80 to 110° C. The temperature of the plug must be set in a region lower than the temperature of the female mold. When the temperature is lower than the above range, the molded article is not efficiently heated by the conduction of heat, and the time for heat-shrinking becomes long. When the temperature is higher than this range, on the other hand, the molded article is not cooled to a sufficient degree and undergoes deformation due to shrinkage after the step of parting.

In the present invention, it is desired that the surface area of the pre-molded article is from 1.1 times to 1.5 times as large as the surface area of the intermediate product from the standpoint of removing distortion and moldability. That is, when the surface area is smaller than the above range, the distortion is not removed to a sufficient degree due to heat shrinking. When the area is larger than the above range, on the other hand, wrinkles develop on the surface of the intermediate product due to the lack of shrinking, and the intermediate article is not favorably shaped.

(3) Molding into a Final Container.

In the method of the present invention, it is desired that the female mold for final molding is maintained at a temperature of not lower than the crystallization start temperature of the thermoplastic polyester. The female mold must be maintained at a temperature not lower than the crystallization start temperature from the standpoint of promoting the crystallization. Due to the heat-setting at this temperature, the orientation and crystallization proceed to a sufficient degree, and the final container exhibits improved heat resistance.

It is further desired that the plug for the final container is maintained at a temperature in a range of from the glass transition point of the thermoplastic polyester −20° C. to the glass transition point +20° C. When the temperature is lower than this range, the step of heat-setting is not efficiently effected by the conduction of heat. When the temperature is higher than this range, the cooling is not effected to a sufficient degree, and the molded article undergoes deformation due to shrinkage after the step of parting.

In the present invention, it is desired that the surface area of the female mold for final molding is from 1.01 times to 1.10 times as large as the surface area of the plug for the final container from the standpoint of removing distortion and moldability. That is, when the ratio of the surface areas is smaller than the above range, the distortion is not removed to a sufficient degree due to heat shrinking. When the ratio of the surface areas is larger than the above range, on the other hand, wrinkles develop on the surface of the final container, and the final container is not favorably shaped.

The molding operation according to a third embodiment of the present invention will now be described with reference to FIGS. 20 to 30 of the accompanying drawings.

(Constitution of the Devices)

The devices used in the production method of the present invention are the same as shown in FIGS. 8 to 19. The device used in the one-step molding roughly includes a plug 11, a female mold 12 and a clamping metal mold 13 as shown in FIG. 20.

Figure 23:
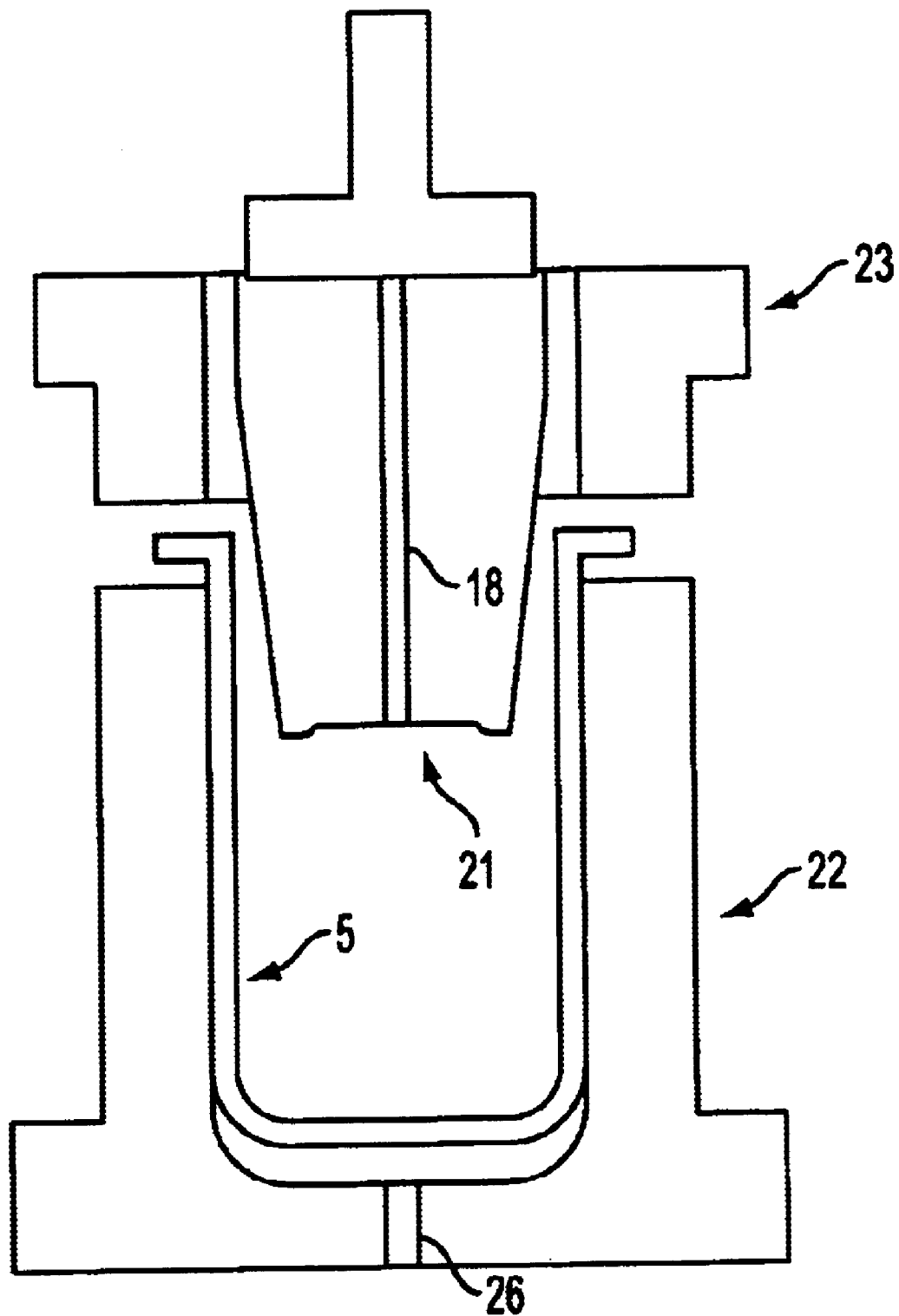
FIG. 23 is a side sectional view illustrating a step of inserting the article in the metal mold in the second molding step (for molding an intermediate article)

Further, the device used in the two-step molding includes a plug 21, a female mold 22 and a clamping metal mold 23 as shown in FIG. 23.

Figure 27:
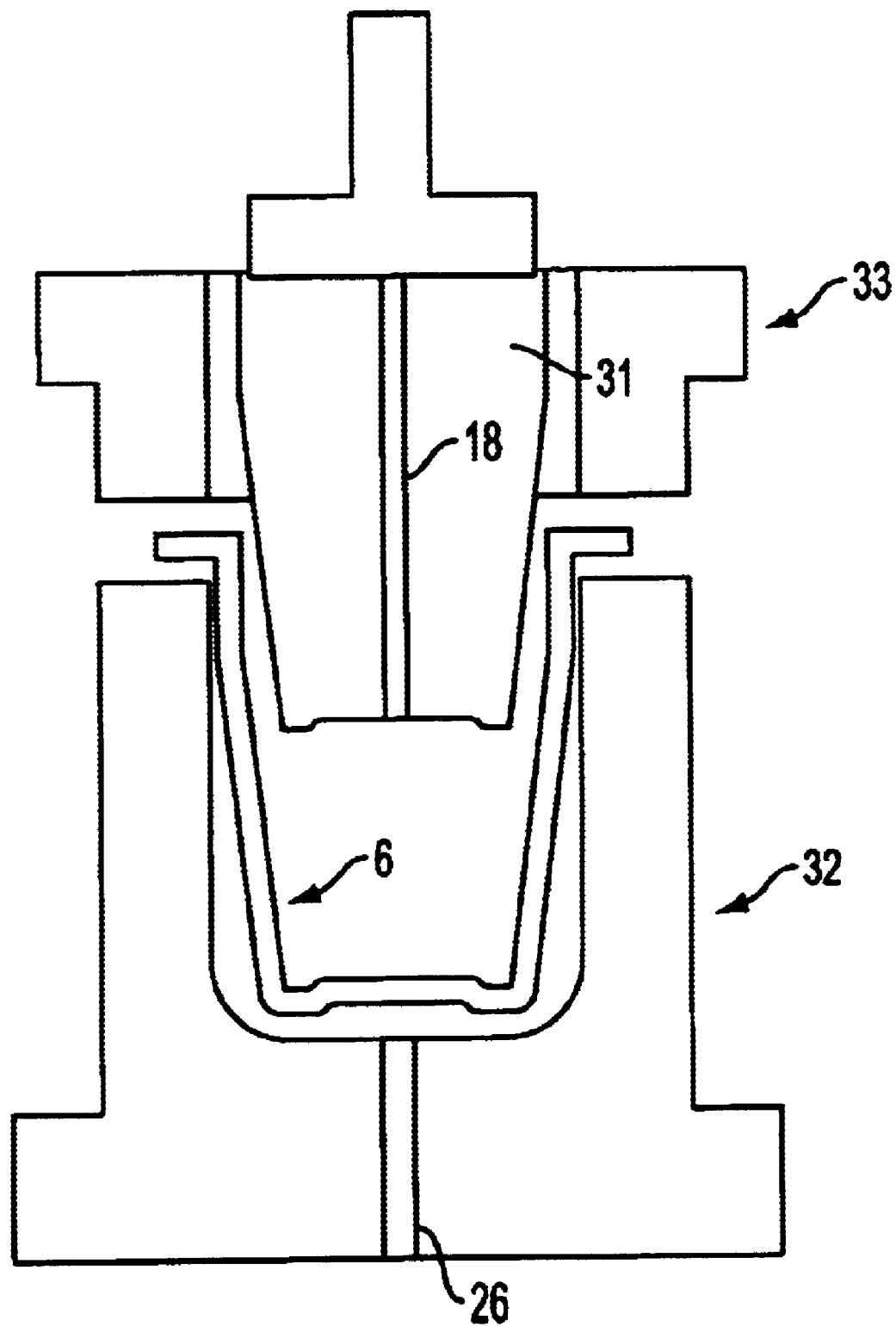
FIG. 27 is a side sectional view illustrating a step of inserting the article in the metal mold in a third molding step (into a finally molded article)

Further, the device used in the three-step molding includes a plug 31, a female mold 32 and a clamping metal mold 33 as shown in FIG. 27.

The plug 11 for the one-step molding assists the stretch-molding of the polyester sheet 4 into the pre-molded article 5, the plug 21 for the two-step molding has an outer shape for shrinking and shaping the pre-molded article 6 into an intermediate particle 6, and the plug 31 for the three-step molding has an outer shape for shrinking and shaping the intermediate article 6 into a finally molded article 7.

More specifically, the plug 11, plug 21 and plug 31, in common, have a short cylindrical portion 14 that serves as a stacking portion of the container at an upper part of the outer surface, and a tapered portion 15 connected to the lower side of the cylindrical portion and having a diameter that is contracting downward. An annular rim 16 is formed along the periphery on the bottom of the plugs 11, 21, 31, protruding downward in a nearly arcuate shape by a small distance in cross section. A bottom panel portion 17 is positioned inside the annular rim 16 protruding upward by a small distance from the lower end of the rim. A gas passage 18 is formed in the axial direction of the plugs 11, 21, 31 for introducing the compressed air and for reducing the pressure.

The female mold 12 for the one-step molding used in the present invention is for defining the shape of the pre-molded article 5 molded by using the compressed air, the female mold 22 for the two-step molding is for heating the pre-molded article 5 and for shrinking it into the intermediate article 6, and the female mold 32 for the three-step molding is for heat-setting the intermediate article 6 by heating it and for shrinking it into the final molded article 7.

If described in further detail, the female mold 12, female mold 22 and female mold 32, in common, have, at their upper parts thereof, a holding surface 25 for holding the peripheral edge of the resin sheet, of the pre-molded article or of the intermediate article in corporation with pairs of clamping molds 13, clamping molds 23 and clamping molds 33. Further, a gas passage 26 is formed in the central portions of the female molds for discharging and supplying the gas.

The clamping metal molds 13, 23 and 33 work to clamp the peripheral edge of the resin sheet, of the pre-molded article or of the intermediate article in cooperation with the holding surfaces of the female molds, and comprise short hollow cylinders. That is, the clamp metal molds 13, 23 and 33 have an inner surface 34 of a diameter nearly the same as that of the cylindrical inner surface of the female mold, and have, at the lower ends thereof, a holding surface 35 for holding the peripheral edge of the disk-like resin sheet.

The plug 11 (21, 31), female mold 12 (22, 32) and the clamping metal mold 13 (23, 33) are arranged in concentric, the plug 11 (21, 31) and the female mold 12 (22, 32) being provided to move relative to each other in the axial direction (up and down in the drawing) so as to come in mesh with each other and to separate away from each other, and the clamping metal mold 13 (23, 33) being similarly provided to move in the axial direction.

(First Molding Step)

Step of Clamping the Sheet.

In FIG. 20, either the plug 11 or the female mold 12 is at the ascended position and the other one is at the descended position, and the resin sheet 4 heated at a stretching temperature is supplied to between the female mold 12 and the clamping metal mold 13.

The polyethylene terephthalate sheet 4 heated at a molding temperature of 105° C. is clamped by the clamping metal mold 13 and by the female mold 12, and is molded.

The polyethylene terephthalate used in this embodiment has an inherent viscosity (IV) of 0.8, a glass transition point (Tg) of 70° C. and a sheet thickness of 1.2 mm.

Step of Stretching/Shaping.

Figure 21:
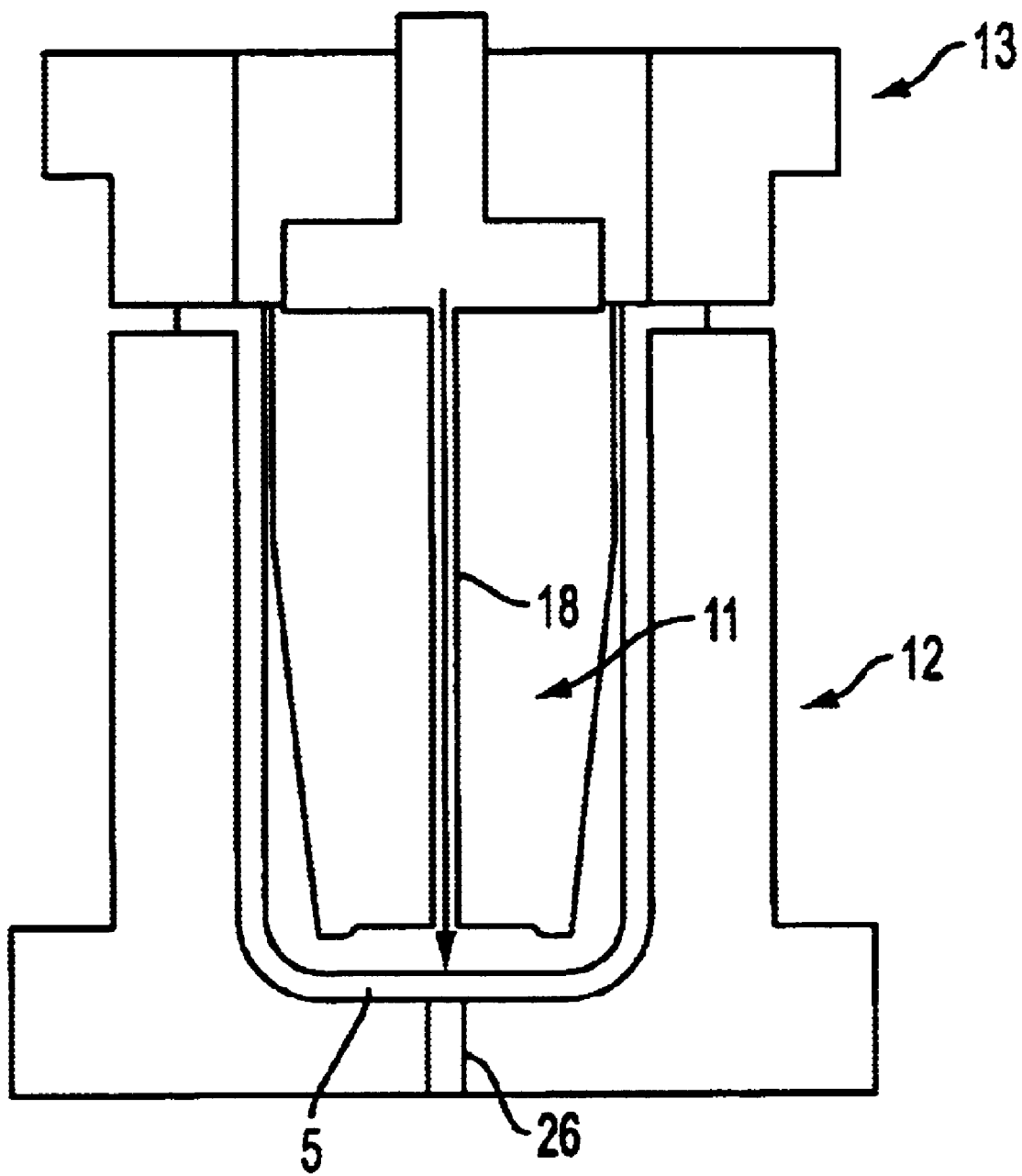
FIG. 21 is a side sectional view illustrating a step of stretching and shaping the sheet in the first molding step.

Referring to FIG. 21, the sheet 4 is stretched, oriented and crystallized as the plug 11 of which the temperature is adjusted descends. Immediately thereafter, the compressed air (0.6 MPa) is introduced through the gas passage 18 in the plug and through a gap between the plug and the molded article and, as required, vacuum is introduced through the gas passage 26 of the female mold, whereby the molded article is pressed onto the female mold 12 adjusted at 100° C. and is shaped to be in conformity with the shape of the inner walls of the female mold.

Pre-molded Article.

The plug 11 is ascended, and the clamping metal mold 13 and the female mold 12 are opened to take out the pre-molded article 5 that has been oriented and crystallized.

Figure 22:
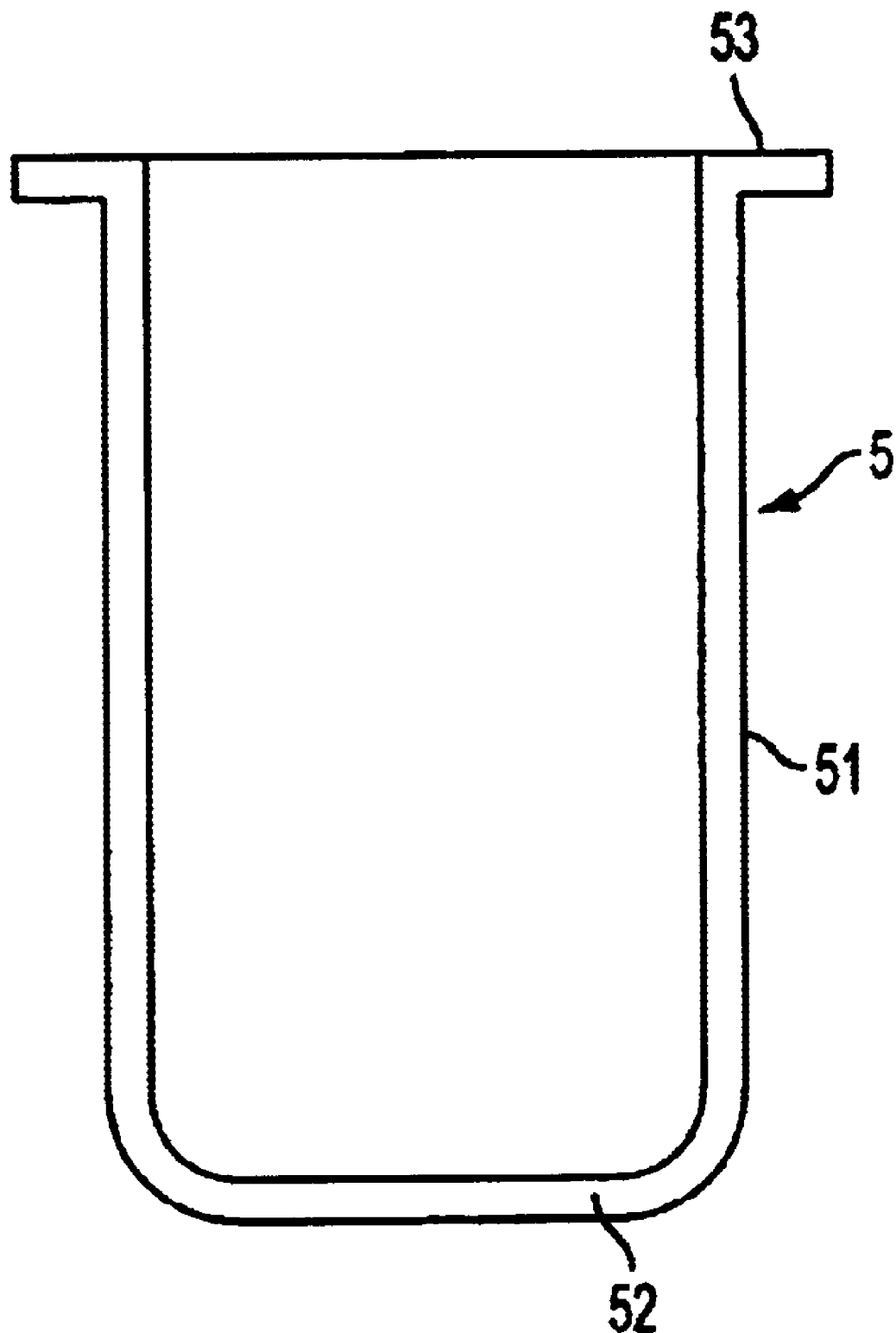
FIG. 22 is a side sectional view illustrating the pre-molded article molded in the first molding step.

Referring to FIG. 22, the pre-molded article 5 includes a cylindrical barrel portion 51, a closed bottom portion 52 continuous to the lower end of the barrel portion and a flange portion 53 continuous to the upper end of the barrel portion.

(Second Molding Step)

An intermediate article 6 is formed from the pre-molded article 5 formed in the first molding step.

Step of Insertion in the Metal Mold.

In FIG. 23, the pre-molded article 5 is supported by the plug 21 and is inserted in the female mold 22.

Step of Heat-shrinking.

Figure 24:
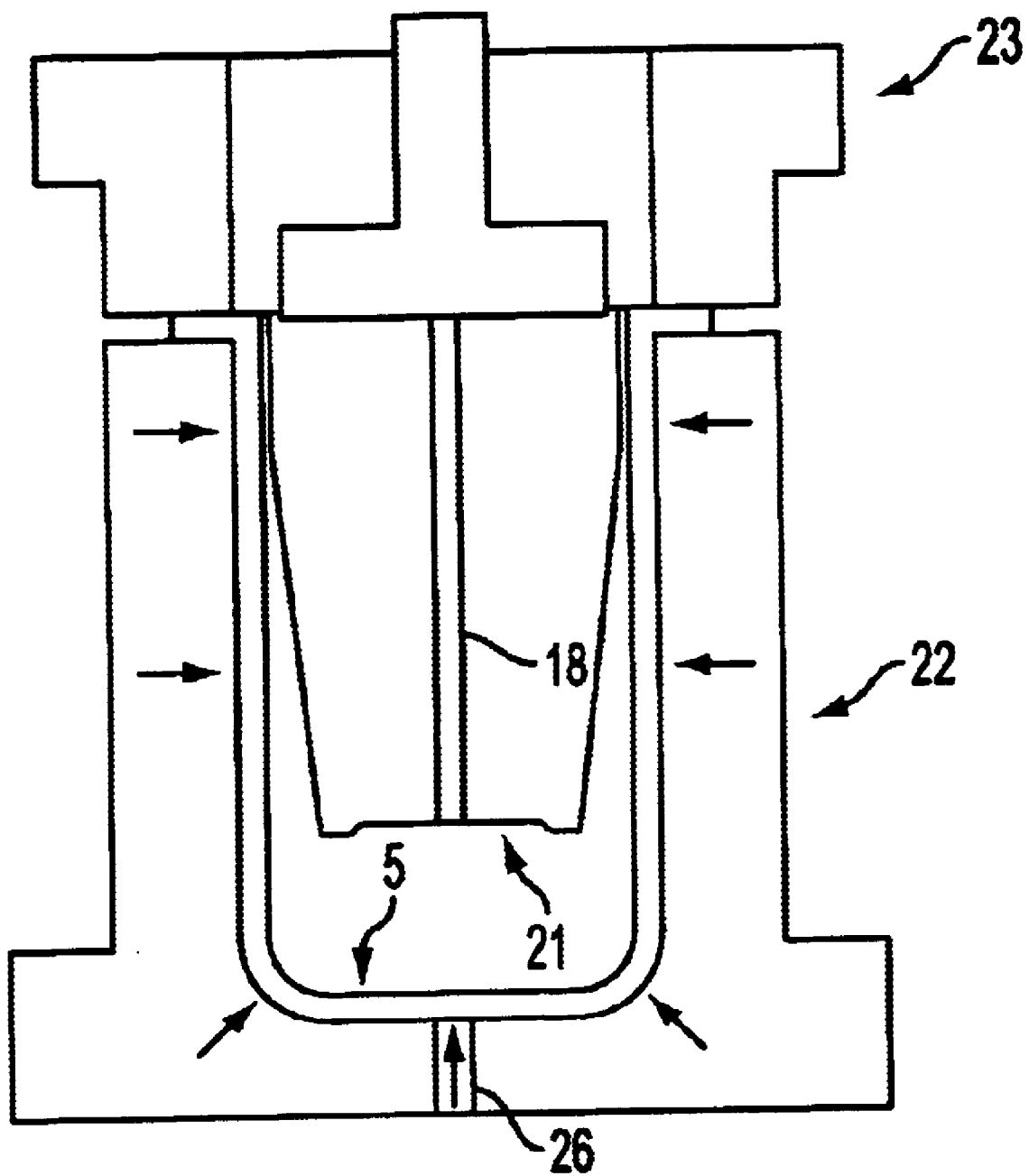
FIG. 24 is a side sectional view illustrating a step of heat-shrinking in the second molding step.

In FIG. 24, the pre-molded article 5 heat-shrinks due to the conduction of heat from the inner wall of the female mold 22 heated at 180° C.

Step of Cooling/Shaping.

Figure 25:
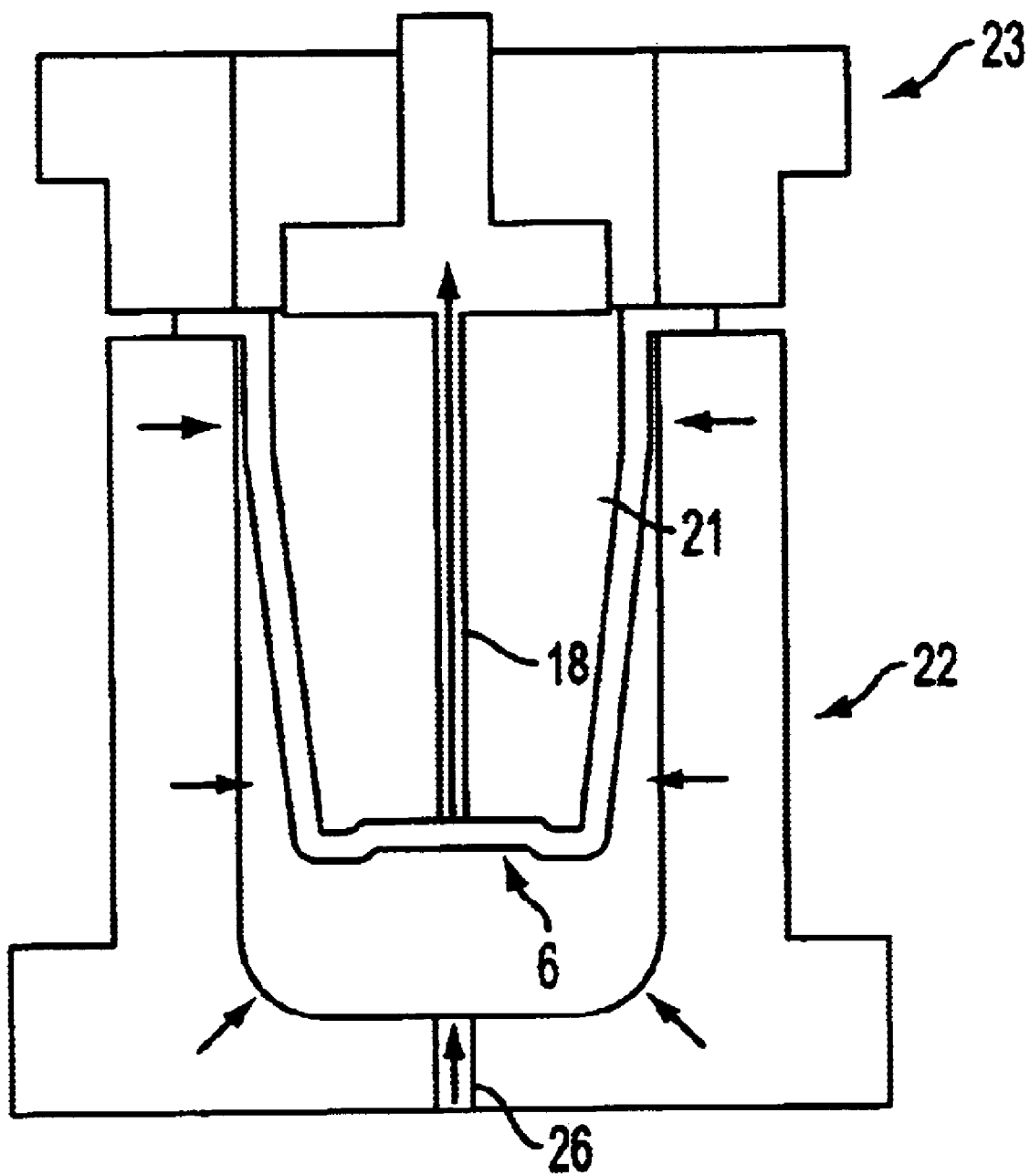
FIG. 25 is a side sectional view illustrating a step of cooling and shaping in the second molding step.

Referring to FIG. 25, the pre-molded article 5, then, shrinks up to the outer surface of the plug 21 and, nearly at the same time, cooled and shaped by the outer surface of the plug 21 heated at 110° C. due to vacuum through the gas passage 18 of the plug and through the gap between the plug and the molded article and, further as required, due to the compressed air through the gas passage 26 of the female mold 22.

Intermediate Article.

The clamping metal mold 23 and the female mold 22 are opened and the plug 21 is ascended to take out the intermediate product 6 that is shrunk. Here, as required, the air is blown from the outer side to cool the intermediate article so that it is quickly parted.

Figure 26:
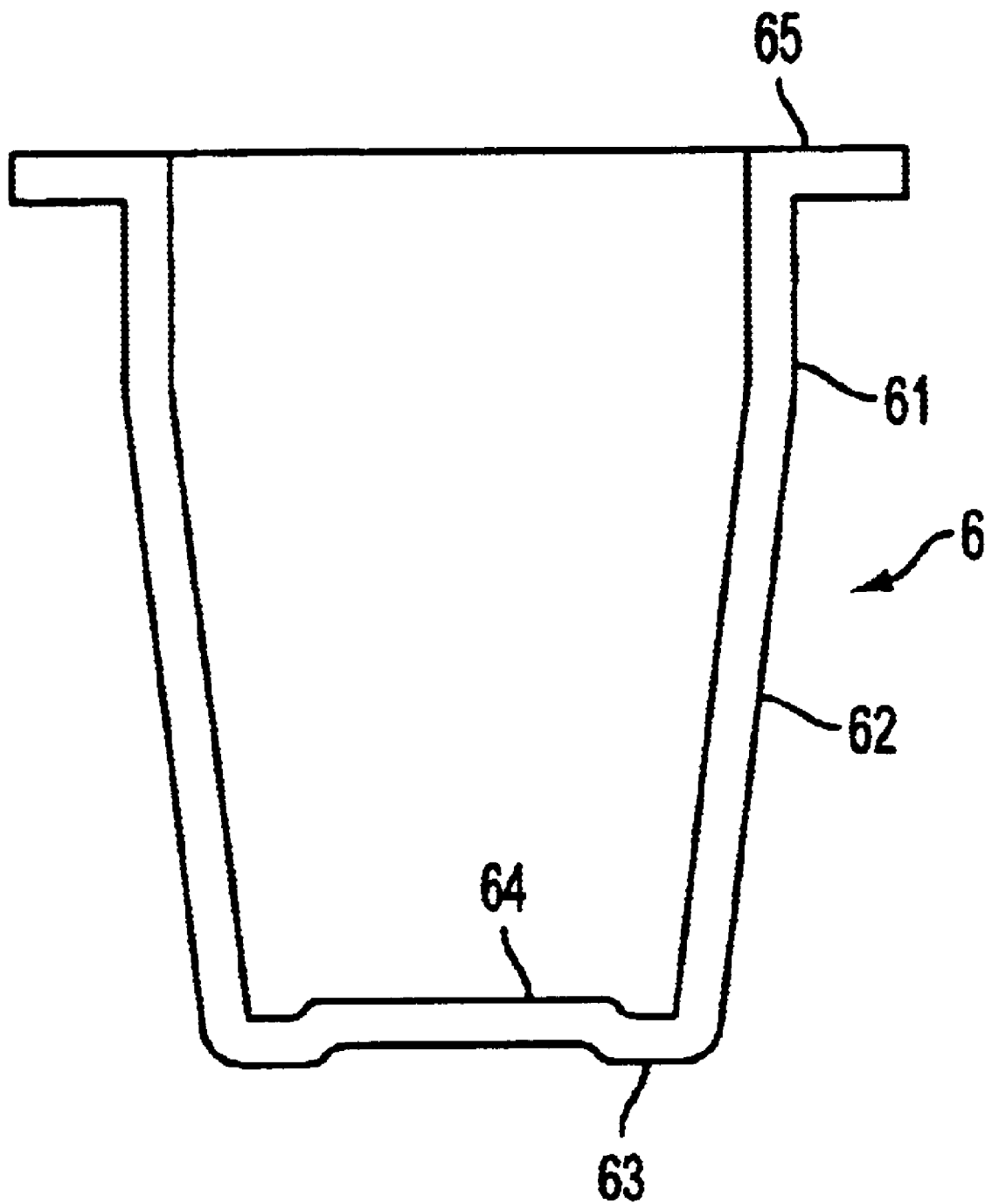
FIG. 26 is a side sectional view illustrating an intermediate article molded in the second molding step.

As shown in FIG. 26, the intermediate product 6 that is formed includes a short cylindrical stacking portion 61 and a tapered portion 62 having a diameter contracting downward. The lower end of the tapered portion is closed by a bottom panel portion 64 through an annular rim 63 that protrudes downward. Further, a flange portion 65 is formed at the upper end of the stacking portion 61.

(Third Molding Step)

A finally molded article 7 is formed from the intermediate article 6 formed in the second molding step.

Step of Insertion in the Metal Mold.

In FIG. 27, the intermediate article 6 is supported by the plug 31 and is inserted in the female mold 32.

Step of Heat-setting.

Figure 28:
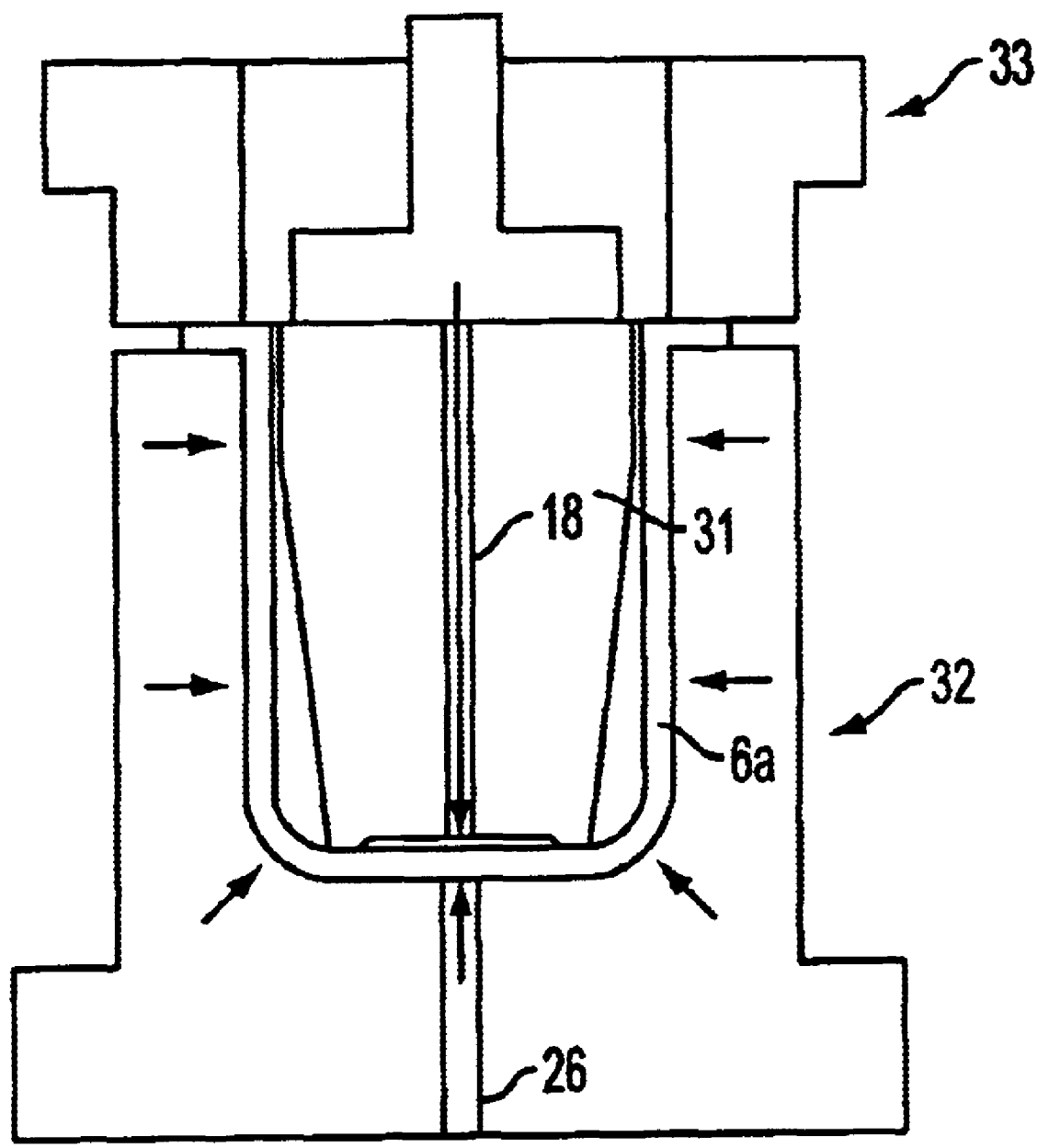
FIG. 28 is a side sectional view illustrating a step of heat-setting in the third molding step.

In FIG. 28, the compressed air (0.6 MPa) is introduced through the air vent 18 of the plug and through the gap between the plug and the molded article and, as required, vacuum is introduced through the vent 26 of the female mold in order to heat-set the molded article 6a while pressing it onto the surface of the female mold 32 heated at 200° C.

Step of Shrinking/Shaping.

Figure 29:
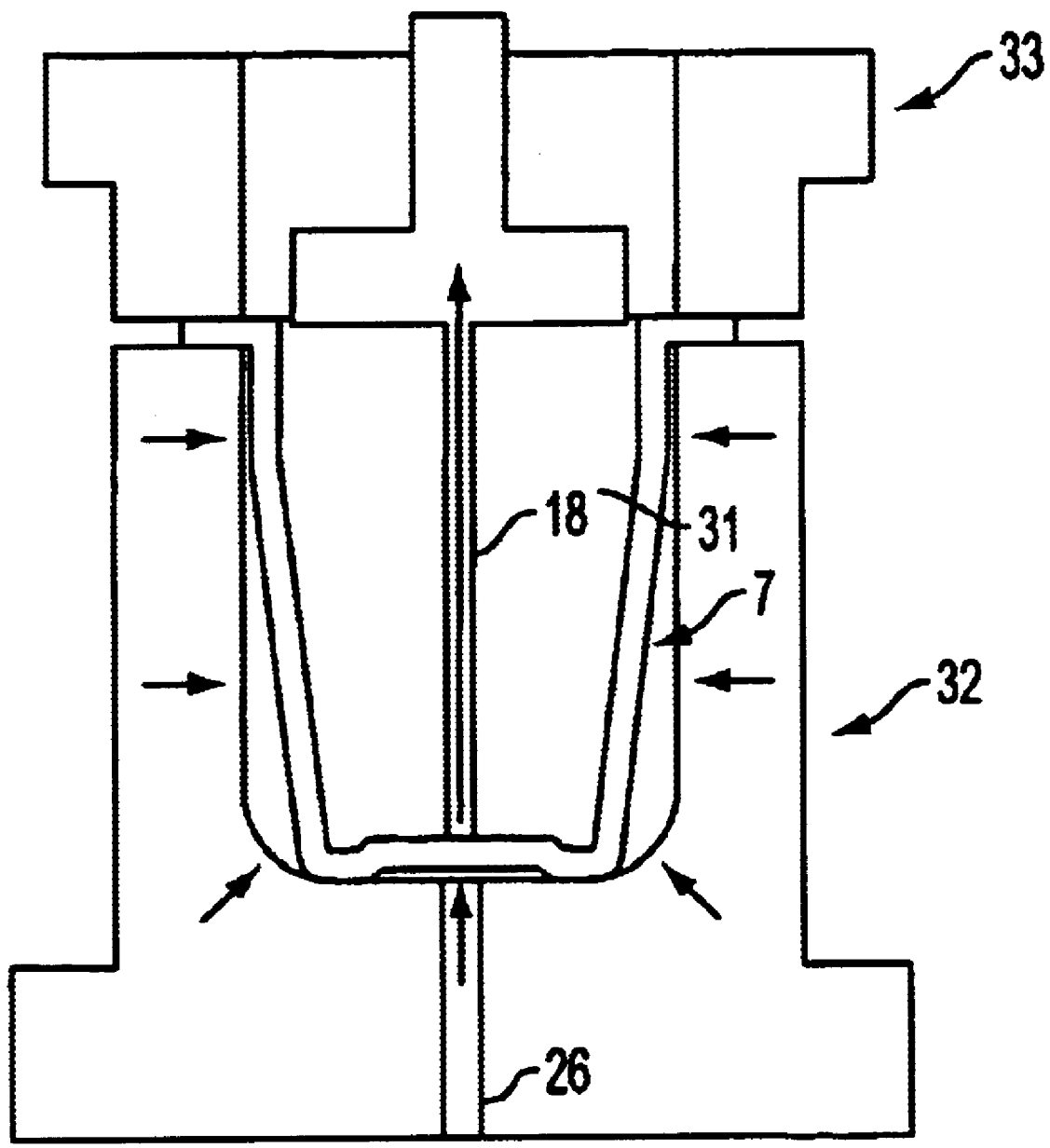
FIG. 29 is a side sectional view illustrating a step of shrinking and shaping in the third molding step.

Referring next to FIG. 29, the molded article starts heat-shrinking due to the transfer of heat from the female mold 32. Further, vacuum is introduced through the gas passage 18 of the plug 31 and through the gap between the plug and the molded article and further, as required, the compressed air is introduced through the gas passage 26 of the female mold 32, so that the molded article shrinks up to the outer surface of the plug 31 and that the molded article is cooled and shaped into the finally molded article 7 due to the contact with the plug 31 heated at 90° C.

Step of Parting.

Figure 30:
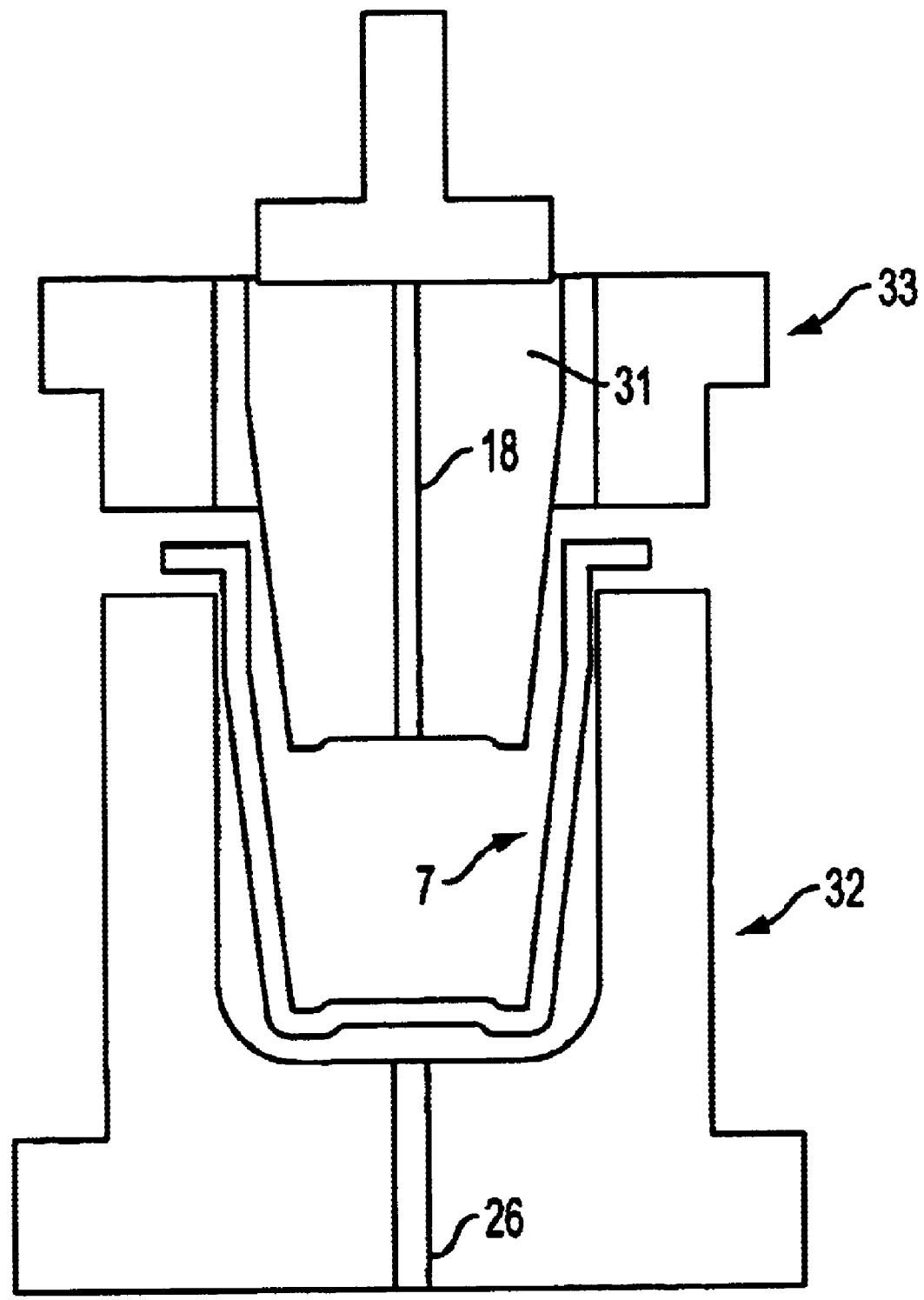
FIG. 30 is a side sectional view illustrating a step of parting the finally molded article formed in the third molding step.

Finally, the female mold 32 and the clamping metal mold 33 are opened as shown in FIG. 30, and the plug 31 is ascended to take out the finally molded article 7.

Fourth Embodiment

A preferred container of the present invention is obtained by heat-molding a sheet having a thermoplastic polyester layer comprising chiefly an ethylene terephthalate unit, and includes a flange portion, a barrel portion and closed bottom portion, and has a feature in that the thermoplastic polyester in the bottom portion of the container has a crystallinity of not smaller than 15% and the bottom portion of the container is substantially transparent and exhibits a distinguished diffraction peak on the surface of an index of a plane (010) in the X-ray diffraction.

Though the container of this type of the invention is obtained by heat-molding the thermoplastic polyester sheet, the thermoplastic polyester in the bottom portion of the container exhibits a crystallinity of not smaller than 15% and, hence, excellent heat resistance. Besides, the bottom portion of the container exhibits astonishing properties in combination, i.e., a distinguished diffraction peak on the surface of an index of a plane (010) in the X-ray diffraction, and substantial transparency.

In obtaining the container by molding the sheet, it is relatively easy to molecularly orient the barrel portion by stretching. It is, however, relatively difficult to molecularly orient the bottom portion by stretching. It is, however, important to impart the required properties to the bottom portion of the container even though it is the one obtained by molding the sheet from the practical point of view. For example, the bottom portion of the container that has not been molecularly oriented to a sufficient degree is liable to be cracked due to impacts such as of when it is caused to fall down. Further, the bottom portion of the container having insufficient heat resistance is deformed during the sterilization by heating depriving the container of the self-standing performance and standing stability.

When the sheet-molded container is heat-treated such as heat-set in order to impart heat resistance thereto, the bottom portion is whitened to a conspicuous degree arousing such a problem that a purchaser may doubt the content has been degenerated (e.g., dregs have been precipitated).

According to the embodiment of the present invention, the surface is oriented even at the center of the bottom portion of the container so as to exhibit a distinguished diffraction peak on the surface having an index of a plane (010) by the X-ray diffraction and, besides, the bottom portion is crystallized to possess a crystallinity of not smaller than 15%. Thus, there are obtained excellent impact resistance and heat resistance effectively preventing the center of the bottom portion from being whitened and maintaining transparency even at the center of the bottom portion.

Figure 31:
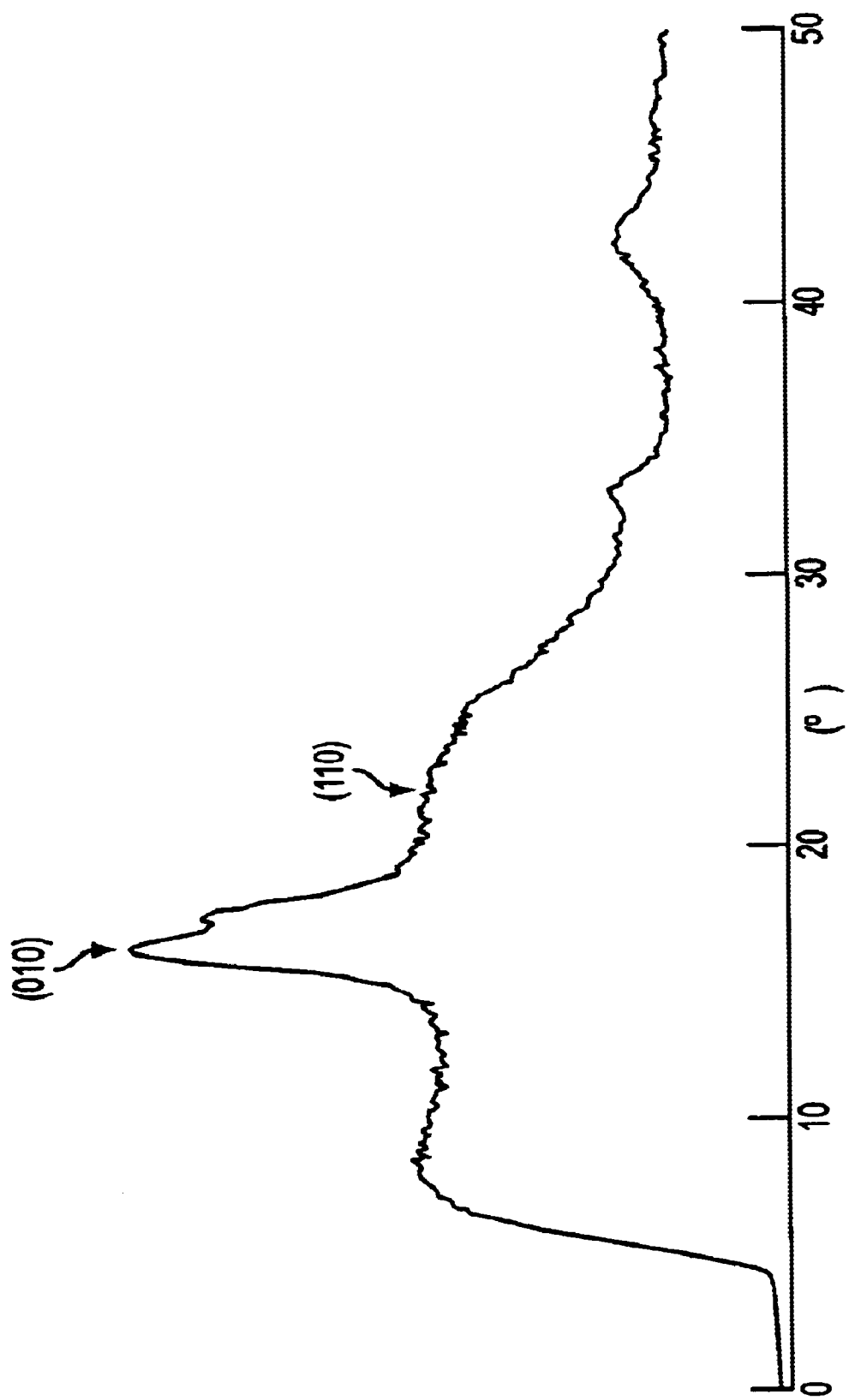
FIG. 31 is a view illustrating an X-ray diffraction image at the center of bottom of the container according to another embodiment of the present invention.

FIG. 31 shows an X-ray diffraction image at the center of the bottom portion of the container of the present invention measured as described above.

From a comparison of the X-ray diffraction image of the bottom portion of the PET container of the invention shown in FIG. 31 with the X-ray diffraction image of the crystalline PET shown in FIG. 4, it is obvious that the diffraction peak is conspicuously exhibited on the surface of an index of a plane (010) in the bottom portion of the container of the invention while the diffraction peak is disappearing from the surface of an index of a plane (100).

In the bottom portion of the container of the present invention, the X-ray diffraction image is distinctly exhibited as shown in FIG. 31, i.e., the diffraction peak is distinctly exhibited on the surface of the index of a plane (010) while the diffraction peak is disappearing from the surface of the index of a plane (100), from which it is reasonable to consider that a benzene plane has been arranged in parallel with the wall surface in the bottom portion of the container.

That is, in the X-ray diffraction method, if the benzene plane is nearly in parallel with the surface of the sample sheet, the diffraction is not measured on the plane (100) but the diffraction is measured on the plane (010) nearly at right angles thereto. Thus, a large diffraction peak intensity on the plane (010) means that the benzene plane of a unit of ethylene terephthalate is in parallel with the surface of the sheet. Conversely, a large diffraction peak intensity on the plane (100) means that the benzene plane of a unit of ethylene terephthalate is inclined relative to the film surface and is not in parallel therewith.

It is thus obvious that the surface has been oriented to a conspicuous degree on the wall even at the center of the bottom portion of the container of the present invention.

The wall has a crystallinity of not smaller than 15% at the center in the bottom portion of the container of the present invention.

In the container of the present invention, even the center of the bottom portion has been crystallized. However, the crystals are not those (spherulite) of the type but are the crystals that are oriented offering such advantages as excellent heat resistance and impact resistance as well as excellent transparency.

The wall at the center of the bottom portion of the container of the present invention exhibits a haze value of, generally, not larger than 20% and, particularly, not larger than 10% as measured by using a hazeometer manufactured by Suga Shikenki Co.

In the container of the present invention, the wall at the center of the bottom portion has been crystallized due to the surface orientation as described already. The crystallinity due to the orientation can be evaluated in terms of the oriented crystallization tendency (U) represented by the above-mentioned formula (I).

That is, as described already, the diffraction peak intensity on the surface of an index of a plane (010) by PSPC-MDG is related to the degree of orientation of the surface of the wall. The oriented crystallization tendency (U) represented by the above-mentioned formula (I) is to represent the diffraction peak intensity H (010) which is standardized with the diffraction peak intensity on the surface of an index of a plane (-110). The larger this value, the larger the degree of crystallization due to orientation.

In the present invention, it is desired that the oriented crystallization tendency (U) is not smaller than 1.3 at the center of the bottom portion from the standpoint of impact resistance, heat resistance and transparency.

It is desired that the container of the present invention is obtained by solid-phase-molding the sheet which contains a thermoplastic polyester and, more particularly, by solid-phase-molding the sheet through at least two steps of stretching and a step of heat-shrinking.

More concretely, the container of the invention is preferably produced by the method shown in FIGS. 20 to 30 and described by way of the third embodiment.

Polyester

The polyester sheet may be the one of a single polyester layer or a multi-layer sheet comprising a polyester layer and other resin layers.

In the present invention, the polyester constituting a sheet of at least one layer is a polyester of which the thermoplastic polyester is derived from a carboxylic acid component comprising chiefly an aromatic dicarboxylic acid and from an alcohol component comprising chiefly an aliphatic diol and, particularly, is a polyester in which not less than 50 mol % of the carboxylic acid component comprises a terephthalic acid component and of which not less than 50 mol % of the alcohol component comprises an ethylene glycol component.

The polyester may be a homopolyester, a copolymerized polyester, or a blend of two or more kinds thereof provided the above-mentioned conditions are satisfied.

Examples of the carboxylic acid component other than the terephthalic acid component, include isophthalic acid, naphthalenedicarboxylic acid, P-β-oxyethoxybenzoic acid, biphenyl-4,4'-dicarboxylic acid, diphenoxyethane-4,4'-dicarboxylic acid, 5-sodiumsulfoisophthalic acid, hexahydoterephthalic acid, adipic acid, sebacic acid, trimellitic acid and pyromellitic acid.

As the alcohol component other than ethylene glycol, on the other hand, there can be exemplified 1,4-butanediol, propylene glycol, neopentyl glycol, 1,6-hexylene glycol, diethylene glycol, triethylene glycol, cyclohexane dimethanol, ethylene oxide adduct of bisphenol A, glycerol, trimethylolpropane, pentaerythritol, dipentaerythritol and sorbitan.

Though not necessarily limited thereto only, preferred examples of the thermoplastic polyester include polyethylene terephthalate which is most desirable, as well as polyethylene/butylene terephthalate, polyethylene terephthalate/2,6-naphthalate, polyethylene terephthalate/isophthalate, and the above compounds and polybutylene terephthalate, polybutylene terephthalate/isophthalate, polyethylene-2,6-naphthalate, polybutylene terephthalate/adipate, polyethylene-2,6-naphthalate/isophthalate, polybutylene terephthalate/adipate, and a blend of two or more kinds thereof.

The polyester should have a molecular weight in a range of forming a film, and should have an inherent viscosity [IV] of not smaller than 0.5 and, particularly, in a range of from 0.6 to 1.5 as measured by using a phenol/tetrachloroethane mixed solvent as a solvent, from the standpoint of moldability, mechanical properties and heat resistance.

The polyester may contain at least one kind of reforming resin component such as ethylene polymer, thermoplastic elastomer, polyarylate or polycarbonate. It is desired that the reforming resin component is used in an amount of up to 50 parts by weight and, particularly preferably, in an amount of from 5 to 35 parts by weight per 100 parts by weight of the polyester.

As the ethylene polymer, there can be exemplified low-, medium- or high-density polyethylene, linear low-density polyethylene, linear ultra-low-density polyethylene, ethylene-propylene copolymer, ethylene-butene-1 copolymer, ethylene-propylene-butene-1 copolymer, ethylene-vinyl acetate copolymer, ionically crosslinked olefin copolymer (ionomer) and ethylene-acrylic acid ester copolymer.

Among them, ionomer is preferred. As the base polymer of the ionomer, there can be used an ethylene-(meth)acrylic acid copolymer or an ethylene-(meth)acrylic acid ester-(meth)acrylic acid copolymer. As the kind of ions, there can be used Na, K or Zn.

As the thermoplastic elastomer, there can be used styrene-butadiene-styrene block copolymer, styrene-isoprene-styrene block copolymer, hydrogenated styrene-butadiene-styrene block copolymer and hydrogenated styrene-isoprene-styrene block copolymer.

The polyarylate can be defined as a polyester derived from a dihydric phenol and a dibasic acid. As the dihydric phenol, there can be used bisphenols, such as 2,2'-bis(4-hydroxyphenyl)propane (bisphenol A), 2,2'-bis(4-hydroxyphenyl)butane (bisphenol B), 1,1'-bis(4-hydroxyphenyl)ethane, bis(4-hydroxyphenyl)methane (bisphenol F), 4-hydroxyphenyl ether and p-(4-hydroxy) phenol. Among them, bisphenol A and bisphenol B are preferred. As the dibasic acid, there can be used terephthalic acid, isophthanol acid, 2,2-(4-carboxyphenyl)propane, 4,4'-dicarboxydiphenyl ether, and 4,4'-dicarboxybenzophenone.

The polyarylate may be a homopolymer derived from the above monomeric component or may be a copolymer. Or, the polyarylate may be a copolymer of an aliphatic glycol with an ester unit derived from a dibasic acid within a range of not spoiling the essentials thereof. These polyacrylates are available as U-series or AX-series of U-polymers of Unitika Co., as Ardel D-100 of UCC Co., as APE of Bayer Co., as Durel of Hoechst Co., as Arylon of Du Pont Co. and as NAP resin of Kanegafuchi Kagaku Co.

The polycarbonate is a carbonic acid ester resin derived from bicyclic dihydric phenols and phosgene, and features a high glass transition point and heat resistance.

As the polycarbonate, there can be used those derived from bisphenols such as 2,2'-bis(4-hydroxyphenyl)propane (bisphenol A), 2,2'-bis(4-hydroxyphenyl)butane (bisphenol B), 1,1'-bis(4-hydroxyphenyl)ethane, bis(4-hydroxyphenyl) methane (bisphenol F), 1,1-bis(4-hydroxyphenyl) cyclohexane, 1,1-bis(4-hydroxyphenyl)cyclopentane, 1,1-bis(4-hydroxyphenyl)-1-phenylmethane, 1,1-bis(4-hydroxyphenyl)-1-phenylethane and 1,2-bis(4-hydroxyphenyl)ethane.

The sheet used in the present invention may be blended with known blending agents used for the plastics, such as antioxidant, heat stabilizer, ultraviolet-ray absorbing agent, antistatic agent, filler, coloring agent, etc. To make the molded container opaque, the sheet may be blended with fillers such as calcium carbonate, calcium silicate, alumina, silica, various clays, calcined gypsum, talk or magnesia, inorganic pigments such as titanium white, yellow iron oxide, red iron oxide, ultramarine or chromium oxide, or organic pigments.

From the standpoint of strength and moldability of the container, it is desired that the plastic sheet used in the present invention has a thickness of, usually, from 0.5 to 5 mm and, particularly, from 1 to 3 mm though it may vary depending upon the size of the container and the like.

The container of the present invention may comprise the above single polyester layer or may comprise a laminated layer thereof with layers of other resins such as gas-barrier resin, recycled polyester resin, oxygen-absorbing resin, etc.

The layers of other resins may be to form a two-layer constitution serving as an inner layer or an outer layer, or to form a three-layer constitution serving as an intermediate layer.

As the gas-barrier resin, there can be used any one that has been known, such as ethylene-vinyl alcohol copolymer (EVOH), nylon resin (Ny), gas-barrier polyester resin (BPR) or cyclic olefin copolymer.

As the gas-barrier resin layer, there can be used an ethylene-vinyl alcohol copolymer containing a vinyl alcohol in an amount of from 40 to 85 mol % and, particularly, from 50 to 80 mol %.

There is no particular limitation on the molecular weight of the ethylene-vinyl alcohol copolymer provided it is large enough for forming a film. Generally, however, it is desired that the ethylene-vinyl alcohol copolymer has an inherent viscosity (I.V.) in a range of from 0.07 to 0.17 dl/g as measured in a mixed solvent of 85% by weight of phenol and 15% by weight of water at a temperature of 30° C.

Other examples of the gas-barrier resin include nylon resin such as nylon 6, nylon 6,6, nylon 6/nylon 6,6 copolymer and polyamide containing a xylylene group.

As the ω-aminocarboxylic acid component constituting the nylon resin, there can be exemplified ε-caprolactam, aminoheptanoic acid and aminooctanoic acid. As the diamine component, there can be exemplified aliphatic diamines such as hexamethylene diamine, alicyclic diamine such as piperazine, as well as m-xylylene diamine and/or p-xylylenediamine. As the dibasic acid component, there can be exemplified aliphatic dicarboxylic acids such as adipic acid, sebacic acid and suberic acid. As the aromatic dicarboxylic acid, there can be exemplified terephthalic acid and isophthalic acid.

In particular, there can be exemplified a polyamide having excellent barrier property, in which not less than 35 mol % and, particularly, not less than 50 mol % of the diamine component is an m-xylylene and/or a p-xylylenediamine, and in which the dibasic component is an aliphatic dicarboxylic acid and/or an aromatic dicarboxylic acid and, as required, containing not more than 25 mol % and, particularly, not more than 20 mol % of an ω-aminocarboxylic acid unit per the whole amide recurring units.

It is desired that the polyamide that is used has a relative viscosity ($\eta$rel) of from 0.4 to 4.5 as measured by using a sulfuric acid of 96% by weight at a concentration of 1 g/100 ml and at a temperature of 25° C.

As the gas-barrier resin, there can be used a gas-barrier polyester. A gas-barrier polyester (hereinafter often written as BPR) contains, in a polymer chain thereof, a terephthalic acid component (T) and an isophthalic acid component (I) at a molar ratio T:I of from 95:5 to 5:95 and, particularly, from 75:25 to 25:75, and contains an ethylene glycol component (E) and a bis(2-hydroxyethoxy)benzene component (BHEB) at a ratio E:BHEB of from 99.999:0.001 to 2.0:98.0 and, particularly, from 99.95:0.05 to 40:60.

As the BHEB, there is preferably used a 1,3-bis(2-hydroxyethoxy)benzene.

It is desired that the polyester (BPR) has a molecular weight which is at least large enough for forming a film and, generally, has an inherent viscosity [$\eta$] of from 0.3 to 2.8 dl/g and, particularly, from 0.4 to 1.8 dl/g as measured in a mixed solvent of phenol and tetrachloroethane at a weight ratio of 60:40 at a temperature of 30° C.

As the recycled polyester (PCR), there can be used a granular or a powdery polyester obtained by recovering the used polyester containers, removing foreign matters therefrom, and washing and drying the polyester. It is desired that the recycled polyester has an inherent viscosity (IV) in a range of from 0.60 to 0.75 as measured by the above-mentioned method.

The recycled polyester can be used by itself or being blended with a virgin polyester. When the recycled polyester has a decreased inherent viscosity, it is desired to use the recycled polyester being blended with the virgin polyester.

In this case, it is desired that the blending ratio of recycled polyester:virgin polyester is from 9:1 to 2:8.

It is desired that the recycled polyester (PCR) layer is used in a multi-layer structure having three or more layers being sandwiched by the virgin polyesters.

As other resin layers, there can be used a layer of an oxygen-absorbing resin. As the layer of the oxygen-absorbing resin, there can be used the one containing a metallic oxidizing catalyst and an oxidizing organic component.

The oxidizing organic component is a resin which is oxidized with oxygen in the air due to the catalytic action of a transition metal catalyst, i.e., (i) a resin containing a carbon side chain (a), and containing, in the main chain or in the side chain thereof, at least one functional group (b) selected from the group consisting of carboxylic acid ester group, carboxylic acid amide group and carbonyl group, (ii) a polyamide resin, or (iii) an ethylene-type polymer containing an unsaturated group.

As the metallic oxidizing catalyst, there can be exemplified metal components of the Group VIII of periodic table, such as iron, cobalt and nickel, as well as metals of the Group I, such as copper and silver, metals of the Group IV, such as tin, titanium and zirconium, vanadium which is of the Group V, chromium which is of the Group VI, and manganese which is of the Group VII. Among these metal components, cobalt is particularly preferred because of its large oxygen-absorbing rate.

The transition metal catalysts are usually used in the form of inorganic acid salts or organic acid salts of the above transition metals having low valencies. It is desired that these catalysts are used in amounts of from 100 to 1000 ppm in the resin.

The container of the present invention may include layers of any other resins in addition to the above-mentioned polyester resin layer and the gas-barrier resin layer.

For example, when, there is no heat adhesiveness between the polyester layer and the gas barrier resin layer, an adhesive resin layer may be interposed between the above two resin layers.

Though there is no particular limitation, there can be used, as the adhesive resin, an acid-modified olefin resin such as maleic anhydride-grafted polyethylene, maleic anhydride-grafted polypropylene and the like.

Figure 7:
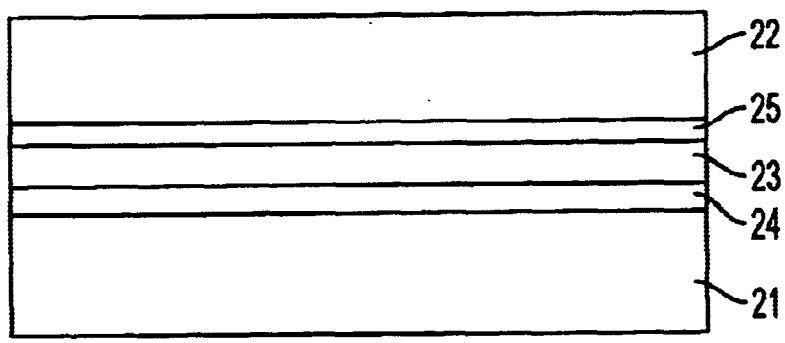
FIG. 7 is a sectional view of a laminated sheet used in the present invention.

Referring to FIG. 7 illustrating, in cross section, the structure of a multi-layer plastic sheet, the sheet 2 has a laminated-layer structure including an inner layer 21 and an outer layer 22 of a thermoplastic polyester resin, an intermediate layer 23 of a gas-barrier resin, and adhesive layers 24 and 25 which are, as required, provided for strongly adhering the inner layer, the outer layer and the intermediate layer.

The laminated-layer sheet is preferably obtained by co-extruding the above-mentioned thermoplastic polyester resin, the gas-barrier resin and, as required, the adhesive resin into the above-mentioned multi-layer structure through a multi-layer multiple die. The laminated-layer sheet, however, can also be produced by any other layer lamination technology, such as sandwich lamination, extrusion coating method or the like method.

EXAMPLES

The invention will now be described by way of working examples in which measurement was taken in a manner as described below.

Measurement of Crystallinity.

As for the wall of the lower part of the barrel portion, a sample measuring 3 mm×3 mm was cut out from the thermoplastic polyester layer 10 mm above the bottom surface of the container in the axial direction of the container. A sample measuring 3 mm×3 mm was also cut out from the flange portion. The densities of the samples were measured by using an n-heptane and a carbon tetrachloride density-gradient tube (Ikeda Rika Co.) at a temperature of 20° C.

The crystallinity Xc was calculated in compliance with the following formula, $Xc = (\rho c/\rho) \times (\rho - \rho am)/(\rho c - \rho am) \times 100$ ρ: density of the sample (g/cm³)
ρam: amorphous density (1.335 g/cm³)
ρc: crystalline density (1.455 g/cm³)

X-Ray Measurement.

As for the upper part of the wall of the barrel portion, a sample was cut out from the thermoplastic polyester layer 15 mm below the flange surface in the axial direction of the container. As for the lower part of the wall of the barrel portion, the sample was cut out from the thermoplastic polyester layer 10 mm above the bottom surface of the container in the axial direction of the container. The sample was so set that the axial direction of the container was on the vertical axis of the optical coordinate, and the diffraction peak was measured by the transmission method relying upon the micro X-ray diffraction (PSPC-150C) (manufactured by Rigaku Denki Co.).

The measurement was taken under the conditions of a tube voltage of 30 KV, a tube current of 150 mA, a collimator of 100 μm and a measuring time of 1000 seconds.

After the measurement, the background was removed (base line was corrected) over a range of 2θ of from 10° to 35°, and a ratio of diffraction intensities was found on the planes (010) and (−110).

Drop Impact Strength.

The container was filled with 220 cc of water, and a closure member having a polyester layer on the innermost surface thereof and the flange portion of the container were heat-sealed by using a heat sealer (manufactured by Shinwa Kikai Co.) at a seal bar temperature of 230° C. for a sealing time of 2 seconds. After sealing, the container was dropped on the concrete floor surface from a height of 90 cm with the bottom portion of the container being directed downward a maximum of 10 times. The number n of the samples was 10, and average numbers until the samples were broken were evaluated as follow:

| Average number of times until broken | Evaluation |
| --- | --- |
| 8 to 10 times | excellent |
| 6 to 7 times | good |
| 4 to 5 times | acceptable |
| 1 to 3 times | bad |

Heat Resistance.

The container was measured for its full volume, fully filled with the hot water of 70° C. and was left to stand until the temperature dropped down to 30° C. The container was measured again for its full volume to find a change in the volume before and after it was filled with the hot water. The number n of the samples was 3, and the containers were evaluated depending upon their changes in the volumes.

Change in the volume (%)=(full volume before fully filled−full volume after fully filled)/(full volume before fully filled)×100

| Change in the volume (%) | Evaluation |
| --- | --- |
| smaller than 0.5% | excellent |
| not smaller than 0.5% but smaller than 1% | good |
| not smaller than 1% but smaller than 2% | acceptable |
| not smaller than 2% | bad |

Example 1

A polyester was obtained by melt-kneading a thermoplastic polyester, RT-580CA (HOMO PET manufactured by Unipet Co.) by using a 65-mm extruder (manufactured by Nihon Seikosho Co.), and was extruded from a T-due of a width of 400 mm and was quickly quenched to prepare a substantially amorphous sheet having a thickness of 1.2 mm. The sheet was cut into a square of 30 cm, heated at 100° C. by a heater by using a plug-assisted compressed air/vacuum molding machine (FK-0431 manufactured by Asano Kenkyujo Co.), and was held by an aluminum plug heated at 65° C. by a heater embedded therein and having a bottom area 84% of the bottom area of the container and by a metal mold (female mold) heated at 110° C. by a heater mounted surrounding the metal mold. Thereafter, the compressed air was blown from the side of the plug for 10 seconds while evacuating the air from the side of the metal mold, in order to mold a transparent container having a container diameter of 65 mm, a container height of 100 mm and a volume of 235 cc.

Very good results were obtained concerning the crystallinity of the wall of the lower part of the barrel portion of the molded container, crystallinity of the flange portion, X-ray measurement of the upper and lower parts of the container, drop impact testing and heat resistance as shown in Table 1. Good heat resistance was further obtained even in the evaluation with the container being filled with the hot water of 90° C.

Example 2

A sheet was molded in the same manner as in Example 1 but using EFS-7H (HOMO PET manufactured by Kanebo Gosen Co.) as the thermoplastic polyester to obtain a transparent container of the same shape. Very good results were obtained concerning the crystallinity of the wall of the lower part of the barrel portion of the molded container, crystallinity of the flange portion, X-ray measurement of the upper and lower parts of the container, drop impact testing and heat resistance as shown in Table 1. Good heat resistance was further obtained even in the evaluation with the container being filled with the hot water of 90° C.

Example 3

A sheet having a thickness of 1.2 mm was molded by using the RT-580CA as the thermoplastic polyester in the same manner as in Example 1. Thereafter, a transparent container of the same shape was molded in the same manner as in Example 1 but setting the metal mold temperature at 80° C. in molding the container. Good results were obtained concerning the crystallinity of the wall of the lower part of the barrel portion of the molded container, crystallinity of the flange portion, X-ray measurement of the upper and lower parts of the container, drop impact testing and heat resistance as shown in Table 1.

Example 4

A sheet having a thickness of 1.2 mm was molded by using the RT-580CA as the thermoplastic polyester in the same manner as in Example 1. Thereafter, a transparent container of the same shape was molded in the same manner as in Example 1 but using an aluminum plug heated at 65° C. by a heater embedded therein and having a bottom area 84% of the bottom area of the container and having a shoulder portion for molding the flange and by using a metal mold heated at 110° C. by a heater mounted surrounding the metal mold and having a flange-molding portion in a cavity thereof in molding the container. Very good results were obtained concerning the crystallinity of the wall of the lower part of the barrel portion of the molded container, crystallinity of the flange portion, X-ray measurement of the upper and lower parts of the container, drop impact testing and heat resistance as shown in Table 1. Good heat resistance was further obtained even in the evaluation with the container being filled with the hot water of 90° C.

Example 5

A three-kind-five-layer sheet having a thickness of 1.2 mm was molded by using J125T (manufactured by Mitsui Kagaku Co.) as a thermoplastic polyester of inner and outer layers, Evar EP-F101B (manufactured by Kuraray Co.) as an intermediate layer and Modec F512 (manufactured by Mitsubishi Kagaku Co.) as an adhesive among the intermediate layer and the polyester layers, through the use of a multi-layer sheet-molding machine. Then, the sheet was molded in the same manner as in Example 1 to obtain a container of the same shape. Very good results were obtained concerning the crystallinity of the wall of the lower part of the barrel portion of the molded container, crystallinity of the flange portion, X-ray measurement of the upper and lower parts of the container, drop impact testing and heat resistance as shown in Table 1. Good heat resistance was further obtained even in the evaluation with the container being filled with the hot water of 90° C.

Comparative Example 1

A sheet having a thickness of 1.2 mm was molded by using RT-580CA (manufactured by Unipet Co.) as a thermoplastic polyester through the use of a sheet-molding machine in the same manner as in Example 1. Then, a container of the same shape was molded in the same manner as in Example 1 but heating the sheet again at 130° C. in molding the container. The crystallinity of the wall of the lower part of the barrel portion of the molded container, crystallinity of the flange portion, X-ray measurement of the upper and lower parts of the container, drop impact testing and heat resistance were as shown in Table 1, from which it was learned that the impact resistance and heat resistance were inferior.

Comparative Example 2

A sheet having a thickness of 1.2 mm was molded by using RT-580CA (manufactured by Unipet Co.) as a thermoplastic polyester through the use of a sheet-molding machine in the same manner as in Example 1. Then, a container of the same shape was molded in the same manner as in Example 1 but using an aluminum plug heated at 110° C. by a heater embedded therein and having a bottom area 84% of the bottom area of the container in molding the container. The crystallinity of the wall of the lower part of the barrel portion of the molded container, crystallinity of the flange portion, X-ray measurement of the upper and lower parts of the container, drop impact testing and heat resistance were as shown in Table 1, from which it was learned that the impact resistance was inferior.

Comparative Example 3

A sheet having a thickness of 1.2 mm was molded by using RT-580CA (manufactured by Unipet Co.) as a thermoplastic polyester through the use of a sheet-molding machine in the same manner as in Example 1. Then, a container of the same shape was molded in the same manner as in Example 1 but using an aluminum plug heated at 65° C. by a heater embedded therein and having a bottom area 65% of the bottom area of the container in molding the container. The crystallinity of the wall of the lower part of the barrel portion of the molded container, crystallinity of the flange portion, X-ray measurement of the upper and lower parts of the container, drop impact testing and heat resistance were as shown in Table 1, from which it was learned that the impact resistance was inferior.

Comparative Example 4

A sheet having a thickness of 1.2 mm was molded by using RT-580CA (manufactured by Unipet Co.) as a thermoplastic polyester through the use of a sheet-molding machine in the same manner as in Example 1. Then, a container of the same shape was molded in the same manner as in Example 1 but setting the metal mold temperature at 20° C. in molding the container. The crystallinity of the wall of the lower part of the barrel portion of the molded container, crystallinity of the flange portion, X-ray measurement of the upper and lower parts of the container, drop impact testing and heat resistance were as shown in Table 1, from which it was learned that the impact resistance and heat resistance were very inferior.

Comparative Example 5

A sheet having a thickness of 1.2 mm was molded by using RT-580CA (manufactured by Unipet Co.) as a thermoplastic polyester through the use of a sheet-molding machine in the same manner as in Example 1. Then, a container of the same shape was molded in the same manner as in Example 1 but setting the metal mold temperature at 60° C. in molding the container. The crystallinity of the wall of the lower part of the barrel portion of the molded container, crystallinity of the flange portion, X-ray measurement of the upper and lower parts of the container, drop impact testing and heat resistance were as shown in Table 1, from which it was learned that the impact resistance and heat resistance were inferior.

Comparative Example 6

A container having the same shape was molded in the same manner as in Example 1 but using (Eastapak polyester 15041, (manufactured by Eastman Co.) which is used for a C-PET tray) as a thermoplastic polyester. The crystallinity of the wall of the lower part of the barrel portion of the molded container, crystallinity of the flange portion, X-ray measurement of the upper and lower parts of the container, drop impact testing and heat resistance were as shown in Table 1, from which it was learned that the heat resistance was excellent but the impact resistance was very inferior.

TABLE 1

|  | Barrel wall crystallinity (%) | Flange crystallinity (%) | X-ray measurement Formula (1) | Formula (2) | Formula (3) | Drop impact strength | Heat resistance |
|---|---|---|---|---|---|---|---|
| Ex. 1 | 29 | 2.8 | 0.87 | 0.45 | 0.42 | excellent | excellent |
| Ex. 2 | 30 | 3.1 | 0.72 | 0.33 | 0.29 | excellent | excellent |
| Ex. 3 | 18 | 2.6 | 1.01 | 0.75 | 0.26 | good | acceptable |
| Ex. 4 | 29 | 24.3 | 0.85 | 0.42 | 0.43 | excellent | excellent |
| Ex. 5 | 30 | 2.7 | 0.79 | 0.37 | 0.42 | excellent | excellent |
| Comp. Ex. 1 | 12 | 2.6 | 1.04 | 1.09 | −0.05 | bad | bad |
| Comp. Ex. 2 | 15 | 2.7 | 1.06 | 0.99 | 0.07 | bad | acceptable |
| Comp. Ex. 3 | 13 | 2.6 | 0.85 | 1.01 | −0.16 | bad | acceptable |
| Comp. Ex. 4 | 12 | 2.6 | 1.2 | 1.08 | 0.12 | bad | bad |
| Comp. Ex. 5 | 13 | 2.6 | 1.07 | 1 | 0.07 | bad | bad |
| Comp. Ex. 6 | 30 | 25 | 1.02 | 0.95 | 0.07 | bad | excellent | wherein:
Formula (1): $I_u(-110)/I_u(010)$
Formula (2): $I_L(-110)/I_L(010)$
Formula (3): $I_u(-110)/I_u(010) - I_L(-110)/I_L(010)$ Example 6

A polyethylene terephthalate having an inherent viscosity of 0.80 and a glass transition point of 70° C. was melt-extrusion-molded to obtain a substantially amorphous sheet having a thickness of 1.2 mm. The sheet was heated at a sheet temperature of 95° C. and was supplied to the molding device shown in FIG. 8. The sheet was held by the holding surfaces of the female mold and of the clamping mold, and was stretched in the axial direction by a plug heated at 75° C., having an effective diameter of 69 mm, having an effective height of 86 mm, and having a surface area which was 6.2 times as wide as the to-be-molded area of the sheet, thereby to obtain a primary molded article.

The compressed air of 0.6 MPa was blown into the interior of the primary molded article through the gas passage of the plug to form and heat-set a secondary molded article in the female mold heated at 150° C. by the compressed air.

Next, the pressure in the interior of the secondary molded article was reduced by a vacuum pump through the gas passage of the plug to shape it into a tertiary molded article which was, then, cooled and taken out to obtain a final molded article. The finally molded article was evaluated in a manner as described below.

Figure 19:
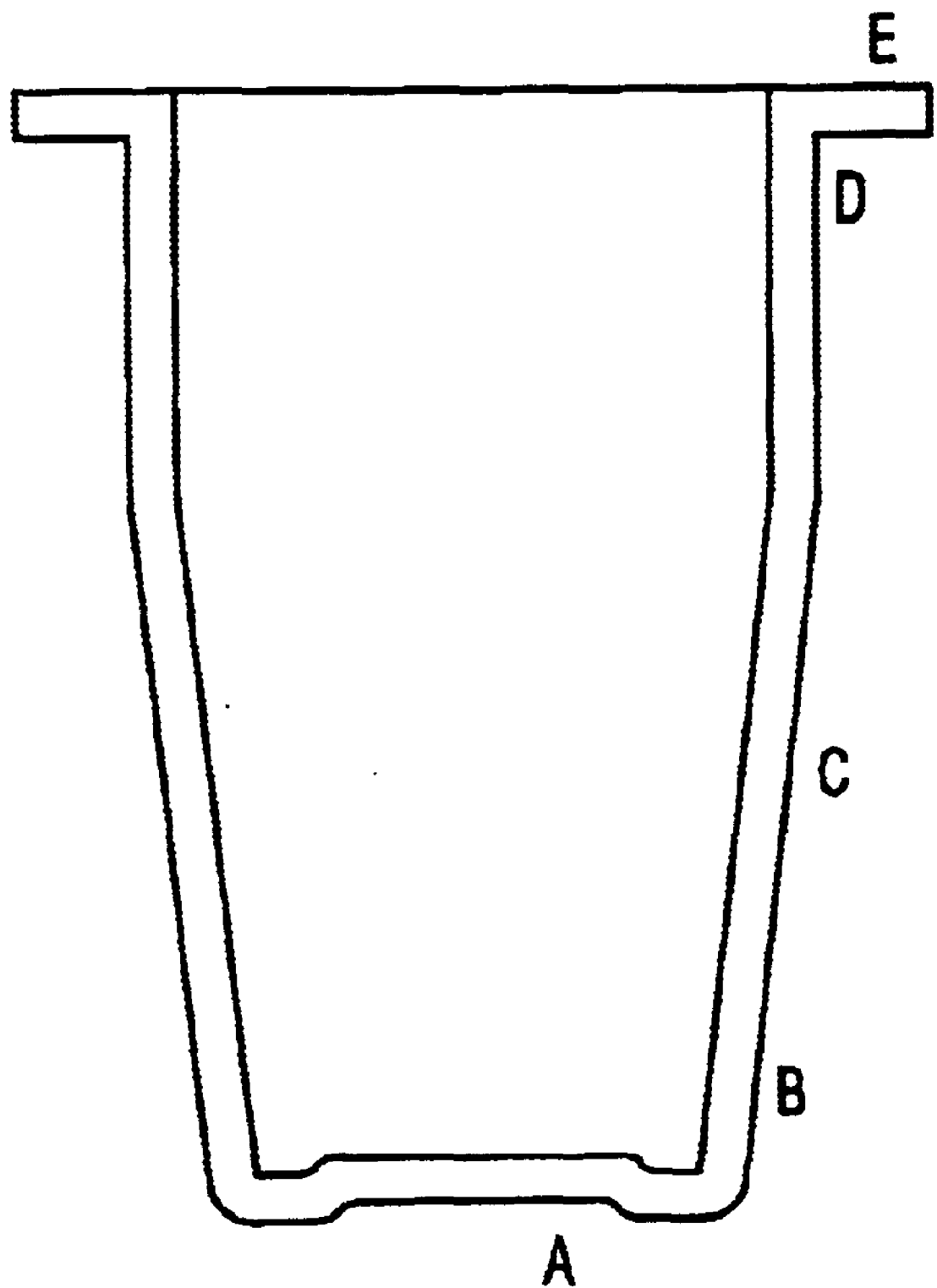
FIG. 19 is a side sectional view illustrating portions of measurement of the containers of Examples 6 to 8 and Comparative Example 7 that will be described later.
Figure 20:
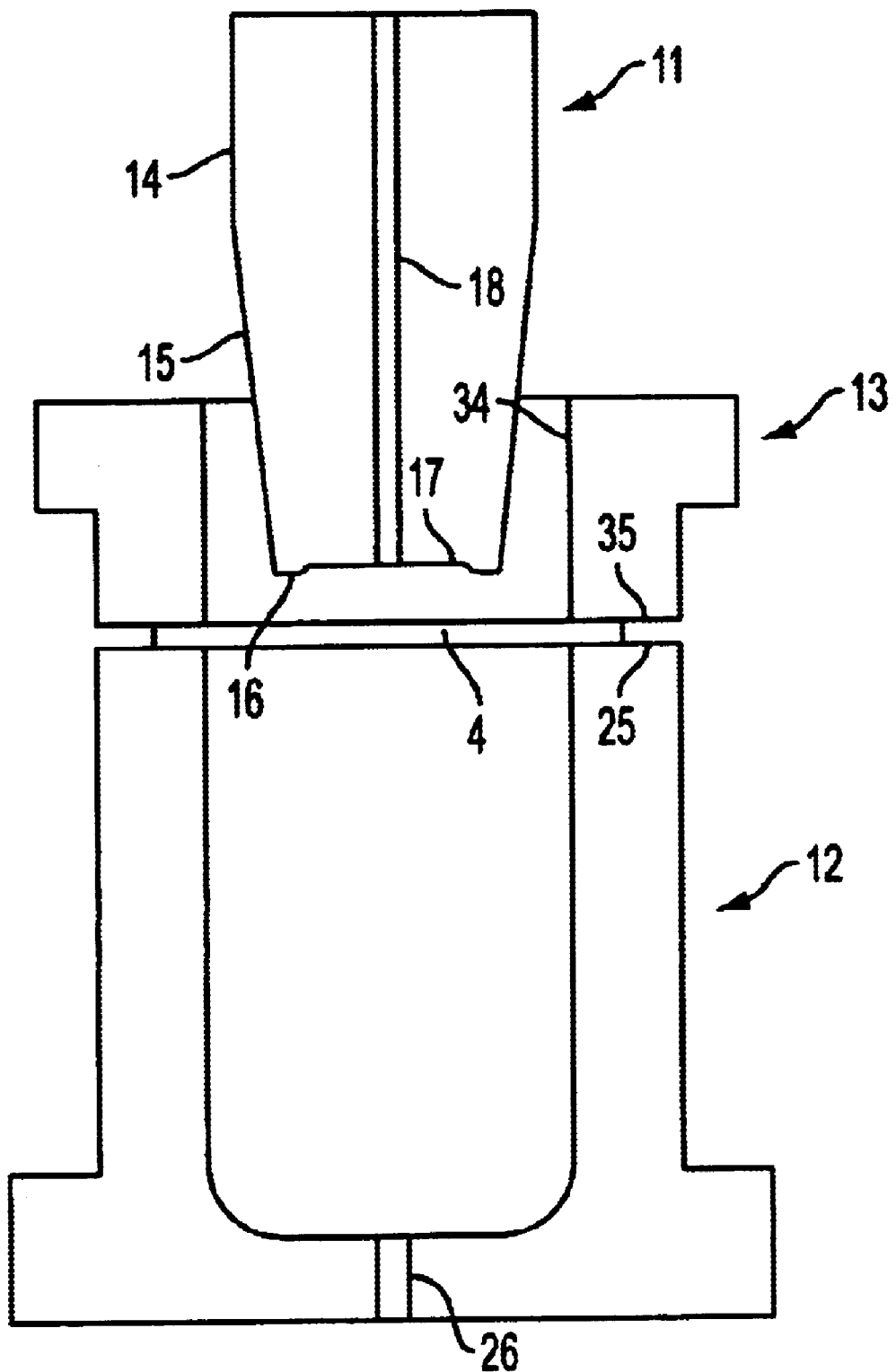
FIG. 20 is a side sectional view illustrating a step of clamping the sheet in the first-step molding (into a pre-molded article)

① Samples for measurement, each measuring 4 mm×4 mm, were cut out from the bottom portion (A) of the molded article shown in FIG. 19, from a measuring center (B) 30 mm above the bottom, from a measuring center (C) 55 mm above the bottom, from a measuring center of the stacking portion (D) and from a measuring center of the flange portion (E). Each sample was sliced into the inner surface side and into the outer surface side of the container along a neutral plane. Crystallinities on the inner surface side and on the outer surface side at each of the measuring points were measured relying upon the density method.

② The molded article was left to stand in a temperature-controlled oven so that the temperature of the side wall of the molded article became 90° C. for 3 minutes. The full volume of the molded article was measured before it was put into the oven and after it was taken out from the oven. A change in the volume was calculated in compliance with the following formula to evaluate the heat resistance of the molded article, Change in the volume (%)=[(full volume before put into the oven)−(full volume after taken out from the oven)]/ (full volume before put into the oven)×100

③ The molded article was filled with 200 ml of water, and the mouth was heat-sealed with a closure member to obtain a sample for evaluation. The sample was dropped on the concrete surface from a height of 90 cm in such a manner that the axis of the container was in parallel with the concrete surface. The sample was repetitively dropped until it was broken, and the impact resistance was evaluated based on the number of times until it was broken.

④ The transparency of the whole container was evaluated by naked eyes.

The results of evaluation were as shown in Table 2 from which it was learned that the container obtained by the molding method of the present invention exhibited both excellent heat resistance and excellent impact resistance, and was transparent over the whole container except the flange.

Example 7

A polyethylene terephthalate having an inherent viscosity of 0.80 and a glass transition point of 70° C. was used as an inner layer and an outer layer, a polymethaxyleneadipamide (MXD6) was used as an intermediate layer, and a maleic acid-modified ethylene-α-olefin copolymer was interposed as adhesive layers among the inner layer, the outer layer and the intermediate layer. The laminate of these layers was melt-extrusion-molded to obtain a substantially amorphous 5-layer sheet having a thickness of 1.2 mm. The sheet was molded under the same conditions as in Example 6 to obtain a finally molded article which was, then, evaluated in the same manner as in Example 6.

The results of evaluation were as shown in Table 2 from which it was learned that the container obtained by molding the multi-layer sheet by the molding method of the present invention, too, exhibited both excellent heat resistance and excellent impact resistance, and was transparent over the whole container except the flange.

Example 8

A polyethylene terephthalate having an inherent viscosity of 0.80 and a glass transition point of 70° C. was melt-extrusion-molded to obtain a substantially amorphous sheet having a thickness of 1.2 mm. The sheet was heated at a sheet temperature of 95° C. and was supplied to the molding device shown in FIG. 8. The sheet was held by the holding surfaces of the female mold and of the clamping mold, and was stretched in the axial direction by a plug heated at 80° C., having an effective diameter of 69 mm, having an effective height of 86 mm, and having a surface area which was 6.2 times as wide as the to-be-molded area of the sheet, thereby to obtain a primary molded article.

The compressed air of 0.6 MPa was blown into the interior of the primary molded article through the gas passage of the plug to form a secondary molded article in the female mold heated at 50° C. by the compressed air, followed by shaping, cooling and parting to obtain an intermediate article (first step in the two-step molding method).

Then, the intermediate article was supplied into the molding device shown in FIG. 14 to effect the second step in the two-step molding method.

The plug used in the second step was heated at 50° C. and the female mold was heated at 150° C. The plug possessed an outer shape which was such that the effective diameter was 64 mm, the effective height was 51 mm and the surface area was 4.2 times as wide as the to-be-molded area of the sheet. The intermediate article supported by the plug was inserted in the female mold, the compressed air of 0.6 MPa was blown through the gas passage of the plug to form a secondary molded article in the heated female mold and to heat-set the secondary molded article.

Next, the pressure in the interior of the secondary molded article was reduced by a vacuum pump through the gas passage of the plug to shape it into a tertiary molded article which was, then, cooled and taken out to obtain a final molded article. The finally molded article was evaluated in the same manner as in Example 6.

The results of evaluation were as shown in Table 2 from which it was learned that the container obtained by the two-step molding method of the present invention, too, exhibited both excellent heat resistance and excellent impact resistance, and was transparent over the whole container except the flange.

Comparative Example 7

A polyethylene terephthalate having an inherent viscosity of 0.80 and a glass transition point of 70° C. was melt-extrusion-molded to obtain a substantially amorphous sheet having a thickness of 1.2 mm. The sheet was heated at a sheet temperature of 95° C. and was supplied to a widely-known compressed-air molding device (prior art 2). The plug (cooling type) used in the known compressed-air molding was heated at 120° C. as described in the known literature, and the female mold (heating type) was heated at 220° C. The plug and the female mold possessed such outer shapes that the effective diameter was 69 mm, the effective height was 86 mm, and the surface area was 6.2 times as wide as the to-be-molded area of the sheet. The conditions were the same as those of Example 6 except the heating temperature.

The sheet was sandwiched by the plug and the female mold that fitted to each other, molded by the compressed air and was heat-set. Immediately thereafter, the compressed air was blown through the gas passage of the female mold to shape the molded article along the plug. The molded article was then parted. The thus obtained finally molded article was evaluated in the same manner as in Example 6.

The results of evaluation were as shown in Table 2, from which it was learned that the container obtained by the above molding method exhibited excellent heat resistance but very poor impact resistance and transparency.

TABLE 2

| Item evaluated | Example 6 | | Example 7 | | Example 8 | | Comp. Example 7 | |
| --- | --- | --- | --- | --- | --- | --- | --- | --- |
| ① Crystallinity % Measuring point | outer surface | inner surface | outer surface | inner surface | outer surface | inner surface | outer surface | inner surface |
| A | 28.0 | 18.5 | 28.1 | 18.3 | 25.2 | 16.7 | 42.0 | 37.8 |
| B | 31.2 | 27.9 | 31.3 | 28.0 | 28.1 | 25.1 | 46.8 | 41.8 |
| C | 36.0 | 29.9 | 35.6 | 31.2 | 32.4 | 26.9 | 44.5 | 44.9 |
| D | 33.4 | 30.5 | 33.2 | 30.7 | 30.1 | 27.5 | 44.4 | 45.8 |
| E | 27.1 | 4.0 | 26.3 | 4.0 | 24.4 | 3.6 | 40.7 | 42.4 |
| ② Change in volume (%) | 0.5 | | 0.6 | | 0.7 | | 0.9 | |
| ③ Note[1]) Drop testing | ○ | | ○ | | ○ | | X | |
| ④ Note[2]) Transparency | ○ | | ○ | | ○ | | X | |

Note[1]) X represents the containers that were broken in the drop testing of 1 to 4 times, and ○ represents the containers that were not broken.
Note[2]) ○ represents the containers that were judged by three monitors to be transparent, Δ represents the containers that were judged to contain opaque portions, and X represents the containers that were judged to be opaque.

Example 9

By using a sheet-molding machine, a polyethylene terephthalate resin (SA135 manufactured by Mitsui Kagaku Co.) was melt-extrusion molded to prepare a substantially amorphous sheet having a thickness of 1.2 mm and a width of 320 mm. The sheet was cut into a square of 300 mm and was heated at 95° C. by using a compressed air/vacuum molding machine (FK-0431 manufactured by Asano Kenkyujo Co.). Then, the metal mold was tightened, and the plug heated at 50° C. was driven by an air cylinder in a state where the sheet was held by the holding surfaces of the female mold for pre-molding heated by a heater at 100° C. and of the clamping method, in order to mold the sheet in the solid phase. At the same time, the compressed air of 0.6 MPa was blown from the side of the plug to prepare a pre-molded article having a diameter of 66 mm and a surface area of 159 cm$^2$.

At a next step, the pre-molded article was held by the female mold for pre-molding heated at 180° C. and by the clamping mold, and the pressure on the side of the plug was reduced in a state where the plug was inserted in the pre-molded article, the plug being heated at 110° C. and having the shape nearly the same as the shape of the inner surface of the container. The pre-molded article was heated and shrunk by heat radiated from the female mold so as to come into intimate contact with the surface of the plug, thereby to form an intermediate article having the shape nearly the same as the shape of the container and having a diameter of 66 mm and a surface area of 130 cm$^2$. Table 3 shows the ratio of the surface areas of the pre-molded article and of the intermediate article.

At a next step, the intermediate article was held by the clamping mold and by the female mold for final molding heated at 180° C. higher than the crystallization start temperature of the polyethylene terephthalate resin. Then, the compressed air of 0.6 MPa was blown from the side of the plug to heat-set the intermediate article while it was being intimately adhered to the female mold. Thereafter, the pressure on the side of the plug was reduced in a state where the plug heated at 90° C. and having a shape nearly the same as the shape of the inner surface of the container was inserted in the intermediate article, so that the intermediate article was intimately adhered onto the surface of the plug to thereby shape the container. At the same time, the container was cooled down to the plug temperature and was, then, taken out. Thereafter, the periphery of the flange was trimmed to obtain a substantially transparent container having a container diameter of 66 mm, a container height of 53 mm and a volume of 158 cc.

The container was evaluated in a manner as described below.

1. Heat Resistance.

An empty container after its full volume was measured, was heat-treated in the hot water of 90° C. for 30 minutes, taken out from the hot water, left to cool down to room temperature, and was measured again for its full volume. A change in the volume before and after the heat treatment was found from the following formula, and the heat resistance was evaluated as described below.

Change in the volume (%)=(full volume before the heat treatment−full volume after the heat treatment)/(full volume before the heat treatment)×100

| Change in the volume (%) | Evaluation |
| --- | --- |
| smaller than 1.0% | excellent |
| not smaller than 1% but smaller than 2% | good |
| not smaller than 2% but smaller than 4% | acceptable |
| not smaller than 4% | bad |

2. Impact Strength.

The container was fully filled with water, and a closure member having a polyester layer on the innermost surface thereof and the flange portion of the container were heat-sealed by using a heat sealer (manufactured by Shinwa Kikai Co.) at a seal bar temperature of 230° C. After sealing, the container was dropped on the concrete floor surface from a height of 90 cm with the bottom portion of the container being directed downward a maximum of 10 times. The number n of the samples was 10, and average numbers until the samples were broken were evaluated as follows:

| Average number of times until broken | Evaluation |
| --- | --- |
| 8 to 10 times | excellent |
| 6 to 7 times | good |
| 4 to 5 times | acceptable |
| 1 to 3 times | bad |

3. Transparency.

The transparency of the whole container was evaluated by naked eyes.

The container was evaluated for its transparency, heat resistance and impact resistance to be all excellent as shown in Table 3.

Example 10

A pre-molded article and an intermediate article of the same shape were prepared from the polyethylene terephthalate resin (SA135 manufactured by Mitsui Kagaku Co.) in the same manner as in Example 9.

At a next step, the intermediate article has held by the clamping mold and the female mold for final molding heated at 130° C. higher than the crystallization start temperature of the polethylene terephthalate resin, and a substantially transparent container having the same shape was prepared in the same manner as in Example 9.

The container was evaluated for its transparency, heat resistance and impact resistance to be all excellent as shown in Table 3.

Example 11

A substantially transparent container having the same shape was obtained in the same manner as in Example 9 with the exception of forming, by using a multi-layer sheet-molding machine, a three-kind-five-layer sheet comprising inner and outer layers of a polyethylene terephthalate resin (J125T manufactured by Mitsui Kagaku Co.), an intermediate layer of a polymethaxyleneadipamide (MXD6,6007 manufactured by Mitsubishi Gas Kagaku Co.), and adhesive layers of an acid-modified ethylene-butene copolymer (Modic F512 manufactured by Mitsubishi Kagaku Co.) among the intermediate layer and the inner and outer layers, having a thickness of 1.2 and a width of 320 mm, the polyethylene terephthalate layers being substantially amorphous.

The container was evaluated for its transparency, heat resistance and impact resistance to be all excellent as shown in Table 3. The barrier property was favorable, too.

Example 12

By using a multi-layer sheet-molding machine, there was prepared a two-kind-three-layer sheet comprising inner and outer layers of a polyethylene terephthalate resin (SA135 manufactured by Mitsui Kagaku Co.), and an intermediate layer of a recycled polyethylene terephthalate (Clear-Flake manufactured by Yono PET Bottle Recycle Co.), having a thickness of 1.2 and a width of 320 mm. An intermediate article and a substantially transparent container of the same shape were prepared in the same manner as in Example 9 except that the pre-molded article prepared from the above sheet possessed such a shape as a diameter of 66 mm and a surface area of 185 $cm^2$.

The container was evaluated for its transparency, heat resistance and impact resistance to be all excellent as shown in Table 3.

Example 13

A pre-molded article of the same shape was prepared from the polyethylene terephthalate resin (SA135 manufactured by Mitsui Kagaku Co.) in the same manner as in Example 9.

At a next step, the pre-molded article has held by the clamping mold and the female mold for intermediate molding heated at 180° C., and the pre-molded article was heated and shrunk by heat radiated from the female mold without inserting the plug thereby to obtain an intermediate article having a diameter of 66 mm and a surface area of 120 $cm^2$. The ratio of surface areas of the pre-molded article and of the intermediate article was as shown in Table 3.

Next, a substantially transparent container having a container diameter of 66 mm, a container height of 53 mm and a volume of 158 cc was obtained from the above intermediate article in the same manner as in Example 9.

The container was evaluated for its transparency, beat resistance and impact resistance to be all excellent as shown in Table 3.

Comparative Example 8

A sheet was prepared from the polyethylene terephthalate resin (SA135 manufactured by Mitsui Kagaku Co.) in the same manner as in Example 9. A pre-molded article was prepared in the same manner as in Example 9 except that the pre-molded article prepared from the sheet possessed a diameter of 66 mm and a surface area of 199 $cm^2$.

At a next step, the pre-molded article has heat-shrunk in the same manner as in Example 9. However, the pre-molded article did not shrink to a sufficient degree, i.e., did not shrink to the shape of the plug, and there was obtained no intermediate article.

Comparative Example 9

A sheet was prepared from the polyethylene terephthalate resin (SA135 manufactured by Mitsui Kagaku Co.) in the same manner as in Example 9. An intermediate article and a container were prepared in the same manner as in Example 9 except that the pre-molded article prepared from the sheet possessed a diameter of 66 mm and a surface area of 135 $cm^2$.

The container was evaluated for its transparency, heat resistance and impact resistance as shown in Table 3, from which it was learned that the bottom portion of the container had been whitened deteriorating the transparency and the impact resistance was inferior, either.

Comparative Example 10

A pre-molded article and an intermediate article of the same shape were prepared from the polyethylene terephthalate resin (SA135 manufactured by Mitsui Kagaku Co.) in the same manner as in Example 9.

At a next step, the intermediate article was held by the clamping mold and the female mold for final molding heated at 90° C. lower than the crystallization start temperature of the polyethylene terephthalate resin, and a substantially transparent container having the same shape was prepared in the same manner as in Example 9.

The container was evaluated for its transparency, heat resistance and impact resistance as shown in Table 3, from which it was learned that the heat resistance was inferior.

TABLE 3

| | Surface area of pre-molded article/surface area of intermediate article | Transparency | Heat resistance | Impact resistance |
|---|---|---|---|---|
| Example 9 | 1.22 | transparent | excellent | excellent |
| Example 10 | 1.22 | transparent | good | excellent |
| Example 11 | 1.22 | transparent | excellent | excellent |
| Example 12 | 1.42 | transparent | excellent | good |
| Example 13 | 1.33 | transparent | excellent | excellent |
| Comp. Ex. 8 | 1.53 | container could not be formed | | |
| Comp. Ex. 9 | 1.04 | bottom whitened | excellent | bad |
| Comp. Ex. 10 | 1.22 | transparent | bad | excellent |

Example 14

A polyethylene terephthalate resin (SA135, I.V.=0.8, manufactured by Mitsui Kagaku Co.) was melt-extrusion molded to prepare a substantially amorphous sheet having a thickness of 1.2 mm and a width of 320 mm. The sheet was cut into a square of 300 mm and was heated at 95° C. by using a compressed air/vacuum molding machine (FK-0431 manufactured by Asano Kenkyujo Co.). Then, the metal mold was tightened, and the plug heated at 75° C. and having the shape of the inner surface of the container was driven by an air cylinder in a state where the sheet was held by the holding surfaces of the female mold heated by a heater at 80° C. and of the clamping mold, in order to stretch-mold the sheet. At the same time, the compressed air of 0.6 MPa was blown from the side of the plug so that the stretch-molded article was intimately adhered to the female mold and was heat-set. Next, the pressure on the side of the plug was reduced so that the stretch-molded article was intimately adhered onto the surface of the plug and was shaped. The stretch-molded article was then cooled down to the plug temperature and, then, the metal mold was opened. Thereafter, the periphery of the flange was trimmed to obtain a substantially transparent container having a container diameter of 66 mm, a container height of 100 mm and a volume of 256 cc.

The container was evaluated in a manner as described below.

1. Heat Resistance.

An empty container after its full volume was measured, was put into a dry-heating oven heated at 150° C. and was heat-treated therein in a state where the container wall was heated at 100° C. for 10 seconds and was, then, taken out, and was cooled down to room temperature. The container was measured again for its full volume. A change in the volume before and after the heat treatment was found from the following formula, and the heat resistance was evaluated as described below.

Change in the volume (%)=(full volume before the heat treatment−full volume after the heat treatment)/(full volume before the heat treatment)×100

| Change in the volume (%) | Evaluation |
|---|---|
| smaller than 1.0% | excellent |
| not smaller than 1% but smaller than 2% | good |
| not smaller than 2% but smaller than 4% | acceptable |
| not smaller than 4% | bad |

2. Impact Strength.

The container was fully filled with water, and a closure member having a polyester layer on the innermost surface thereof and the flange portion of the container were heat-sealed by using a heat sealer (manufactured by Shinwa Kikai Co.) at a sealing temperature of 230° C. After sealing, the container was dropped on the concrete floor surface from a height of 90 cm with the bottom portion of the container being directed downward a maximum of 10 times. The number n of the samples was 10, and average numbers until the samples were broken were evaluated as follows:

| Average number of times until broken | Evaluation |
|---|---|
| 8 to 10 times | excellent |
| 6 to 7 times | good |
| 4 to 5 times | acceptable |
| 1 to 3 times | bad |

The container was evaluated for its crystallinity at the center in the bottom portion and on the side wall thereof, X-ray diffraction measurement thereof, transparency, strength in the drop impact testing and heat resistance as shown in Table 4, from which it was learned that excellent heat resistance and impact resistance were exhibited.

Example 15

By using a multi-layer sheet-molding machine, there was prepared a three-kind-five-layer sheet comprising inner and outer layers of a polyethylene terephthalate resin (J125T manufactured by Mitsui Kagaku Co.), an intermediate layer of an ethylene-vinyl alcohol copolymer (Evar EP-F101B manufactured by Kuraray Co.), and adhesive layers of an acid-modified ethylene-butene copolymer (Modic F512 manufactured by Mitsubishi Kagaku Co.) among the intermediate layer and the inner and outer layers, having a thickness of 1.2 and a width of 320 mm, the polyethylene terephthalate layers being substantially amorphous. Thereafter, a container was molded in the same manner as in Example 14 to obtain a container of the same shape having a substantially transparent bottom portion.

The container was evaluated for its crystallinity at the center in the bottom portion and on the side wall thereof, X-ray diffraction measurement thereof, transparency, strength in the drop impact testing and heat resistance as shown in Table 4, from which it was learned that excellent heat resistance and impact resistance were exhibited. The gas-barrier property of the container was also evaluated to be excellent.

Example 16

By using a multi-layer sheet-molding machine, there was prepared a two-kind-three-layer sheet comprising inner and outer layers of a polyethylene terephthalate resin (SA135 manufactured by Mitsui Kagaku Co.), and an intermediate layer of a recycled polyethylene terephthalate (Clear-Flake, manufactured by Yono PET Bottle Recycle Co.), having a thickness of 1.2 and a width of 320 mm. Thereafter, a container was molded in the same manner as in Example 14 to obtain a container of the same shape having a substantially transparent bottom portion.

The container was evaluated for its crystallinity at the center in the bottom portion and on the side wall thereof, X-ray diffraction measurement thereof, transparency, strength in the drop impact testing and heat resistance as shown in table 4, from which it was learned that excellent heat resistance and impact resistance were exhibited.

Example 17

By using a multi-layer sheet-molding machine, there was prepared a three-kind-five-layer sheet comprising inner and outer layers of a polyethylene terephthalate resin (J125T manufactured by Mitsui Kagaku Co.), an intermediate layer of a polymethaxyleneadipamde (MXD6,6007 manufactured by Mitsubishi Gas Kagaku Co.), adhesive layers of an acid-modified ethylene-butene copolymer (Modic F512 manufactured by Mitsubishi Kagaku Co.) among the intermediate layer and the inner and outer layers, having a thickness of 1.2 and a width of 320 mm, the polyethylene terephthalate layers being substantially amorphous. The sheet was cut into a square of 300 mm and was heated at 95° C. by using a compressed air/vacuum molding machine (FK-0431 manufactured by Asano Kenkyujo Co.). Then, the metal mold was tightened, and the plug heated at 50° C. was driven by an air cylinder in a state where the sheet was held by the holding surfaces of the female mold for pre-molding heated by a heater at 100° C. and of the clamping mold, in order to stretch-mold the sheet. At the same time, the compressed air of 0.6 MPa was blown from the side of the plug to prepare a pre-molded article having a diameter of 66 mm and a surface area of 159 cm².

At a next step, the pre-molded article was held by the female mold for intermediate molding heated at 180° C. and by the clamping mold, and the pressure on the side of the plug was reduced in a state where the plug was inserted in the pre-molded article, the plug being heated at 110° C. and having the shape nearly the same as the shape of the inner surface of the container. The pre-molded article was heated and shrunk by heat so as to come into intimate contact with the surface of the plug, thereby to form an intermediate article having the shape nearly the same as the shape of the container and having a diameter of 66 mm and a surface area of 130 cm². The ratio of the surface area of the pre-molded article and of the intermediate article was 1.22.

At a next step, the intermediate article was held by the clamping mold and by the female mold for final molding heated at 180° C. Then, the compressed air of 0.6 MPa was blown from the side of the plug to heat-set the intermediate article while it was being intimately adhered to the female mold. Thereafter, the pressure on the side of the plug was reduced in a state where the plug heated at 90° C. and having a shape nearly the same as the shape of the inner surface of the container was inserted in the intermediate article, so that the intermediate article was intimately adhered onto the surface of the plug to thereby shape the container. At the same time, the container was cooled down to the plug temperate and was, then, taken out. Thereafter, the periphery of the flange was trimmed to obtain a container having a container diameter of 66 mm, a container height of 53 mm and a volume of 158 cc with its bottom portion being substantially transparent.

The container was evaluated for its crystallinity at the center in the bottom portion and on the side wall thereof, X-ray diffraction measurement thereof, transparency, strength in the drop impact testing and heat resistance as shown in Table 4, from which it was learned that excellent heat resistance and impact resistance were exhibited. The container further exhibited favorable heat resistance even after it was heat-treated in the hot water of 90° C. for 30 minutes. The container further exhibited excellent gas-barrier property.

Comparative Example 11

A sheet was prepared in the same manner as in Example 14, and a container of the same shape having a substantially transparent bottom portion was obtained under the same conditions as in Example 14 but heating the female mold at 60° C.

The container was evaluated for its crystallinity at the center in the bottom portion and on the side wall thereof, X-ray diffraction measurement thereof, transparency, strength in the drop impact testing and heat resistance as shown in Table 4, from which it was learned that excellent impact resistance was exhibited but the heat resistance was inferior.

Comparative Example 12

A sheet was prepared in the same manner as in Example 14, and a container of the same shape was obtained under the same conditions as in Example 14 but heating the sheet at 120° C.

The center in the bottom portion of the container was substantially transparent but was slightly cloudy.

The container was evaluated for its crystallinity at the center in the bottom portion and on the side wall thereof, X-ray diffraction measurement thereof, transparency, strength in the drop impact testing and heat resistance as shown in Table 4, from which it was learned that excellent heat resistance was exhibited but the impact resistance was inferior.

TABLE 4

|  | Crystallinity at bottom center (%) | Crystallinity of barrel portion (%) | Orientation tendency | Transparency | Heat resistance | Impact resistance |
|---|---|---|---|---|---|---|
| Example 14 | 31 | 39 | 1.5 | transparent | excellent | excellent |
| Example 15 | 29 | 38 | 1.3 | transparent | excellent | excellent |
| Example 16 | 31 | 38 | 1.4 | transparent | excellent | good |
| Example 17 | 35 | 37 | 2 | transparent | excellent | excellent |
| Comparative Example 11 | 11 | 19 | 1 | transparent | bad | excellent |
| Comparative | 30 | 35 | 1.2 | bottom is | excellent | bad |

TABLE 4-continued

| | Crystallinity at bottom center (%) | Crystallinity of barrel portion (%) | Orientation tendency | Transparency | Heat resistance | Impact resistance |
|---|---|---|---|---|---|---|
| Example 12 | | | | slightly cloudy | | |

Industrial Applicability

According to the present invention, a sheet provided with at least a layer of an ethylene terephthalate polyester is subjected to the plug-assisted compressed-air or vacuum molding at a particular sheet temperature, at a particular plug temperature or at a particular metal mold temperature by using a plug having a particular shape, making it possible to produce a heat-molded container having particular orientation profile properties, i.e., in which the biaxial orientation is preferentially taking place in the lower part of the barrel portion. This container exhibits excellent heat resistance and excellent impact strength in combination, and is useful for containing a content while it is hot.

According to the present invention, further, there is produced a thermoplastic resin container having excellent resistance against deformation caused by heat and excellent strength by molding a thermoplastic resin sheet into the shape of a female mold heated at a temperature higher than the crystallization temperature of the resin by utilizing the compressed air, heat-setting the molded article and, then, reducing the pressure in the molded article to shrink the molded article into the shape of a plug which has the shape of a final container to impart the shape thereto, followed by cooling.

According to the preparation method of the present invention, the functions are separated into heat-setting by the female mold and cooling by the plug, contributing to shorten the time for occupying the metal mold and, hence, offering an advantage of enhancing the productivity. The container molded from the thermoplastic polyester sheet has a novel crystallinity profile in that the side wall of the container is oriented and crystallized, and the side wall has a crystallinity which is higher on the side of the outer surface than on the side of the inner surface, exhibiting excellent heat resistance, impact resistance and appearance.

According to the present invention, further, pre-molded article obtained by solid-phase-molding a sheet provided with an amorphous thermoplastic polyester layer is heat-shrunk to obtain an intermediate article which is, then, molded with the compressed air in a female mold for final molding heated at a temperature higher than the crystallization start temperature of the polyester and is heat-set, and the pressure in the interior of the molded article is reduced, so that the molded article shrinks along the outer surface of the plug having the shape of a final container, to impart the shape thereto, followed by cooling. Therefore, there is obtained a sheet-molded container having excellent heat resistance, impact resistance and transparency not only in the side wall of the container but also at the center in the bottom portion of the container, despite the container is formed by molding an unoriented or amorphous thermoplastic polyester sheet. According to the preparation method of the present invention, the functions are separated into heat-setting by the female mold and cooling by the plug, contributing to shorten the time for occupying the metal mold and, hence, offering an advantage of enhancing the productivity.

The present invention further makes it possible to obtain, in an astonishing combination, an excellent heat resistance stemming from the crystallinity of the thermoplastic polyester of not smaller than 15% in the bottom portion of the container, to obtain excellent impact resistance stemming from a distinguished diffraction peak on the surface of an index of a plane (010) in the X-ray diffraction, and to obtain a substantial transparency in the bottom portion of the container, despite the container is formed by heat-molding a thermoplastic polyester sheet.

What is claimed is:

1. An heat-resistant and impact resistant container obtained by heat-molding a sheet provided with a thermoplastic polyester layer comprising chiefly an ethylene terephthalate unit, and having a flange portion, a barrel portion and a closed bottom portion, the wall of the barrel portion being oriented and crystallized so as to possess a crystallinity of not smaller than 15% as measured by the density method, and the wall of the barrel portion being oriented to satisfy the following formulas (1), (2) and (3), $$Iu(-110)/Iu(010) \leq 1.02 \quad (1)$$

$$IL(-110)/IL(010) \leq 0.89 \quad (2)$$

and $$(Iu(-110)/Iu(010)) - (IL(-110)/IL(010)) \geq 0.13 \quad (3)$$

wherein $Iu(-110)$ is a diffraction intensity of the surface having an index of a plane of (-110) in the upper part of the wall of the barrel portion of when an X-ray is incident on the wall surface of the container perpendicularly thereto and when the axial direction of the container is regarded to be a perpendicular of the optical coordinate, $Iu(010)$ is a diffraction intensity of the surface having an index of a plane of (010) in the upper part of the wall of the barrel portion of when an X-ray is incident on the wall surface of the container perpendicularly thereto and when the axial direction of the container is regarded to be a perpendicular of the optical coordinate, $IL(-110)$ is a diffraction intensity of the surface having an index of a plane of (-110) in the lower part of the wall of the barrel portion of when an X-ray is incident on the wall surface of the container perpendicularly thereto and when the axial direction of the container is regarded to be a perpendicular of the optical coordinate, and $IL(010)$ is a diffraction intensity of the surface having an index of a plane of (010) in the lower part of the wall of the barrel portion of when an X-ray is incident on the wall surface of the container perpendicularly thereto and when the axial direction of the container is regarded to be a perpendicular of the optical coordinate, as measured by the X-ray diffraction by using a curved PSPC microdiffractometer.

2. An impact resistant container according to claim 1, wherein the ratio (H/R) of the height (H) of the barrel portion to the inner diameter (R) at the top of the barrel portion is not smaller than 0.8.

3. An impact resistant container according to claim 1, wherein the flange portion has a crystallinity of smaller than 10% as measured by the density method.

4. An impact resistant container according to claim 1, wherein the flange portion has a crystallinity of not smaller than 20% as measured by the density method.

5. A heat-resistant an impact-resistant container according to claim 1, obtained by molding a thermoplastic polyester sheet, at least the side wall of the container being oriented and crystallized due to stretching, and the crystallinty being larger on the outer surface than the crystallinity on the inner surface in every portion of the container.

6. A heat-resistant and impact-resistant container according to claim 1, wherein a change in the volume of the container is not larger than 1.0% after it is heat-treated in an oven at such a temperature that the side wall portion thereof is maintained at 90° C. for 3 minutes.

7. A heat-resistant and impact-resistant container according to claim 1, obtained by stretching and molding a thermoplastic polyester, the thermoplastic polyester in the bottom portion of the container having a crystallinity of not smaller than 15%, and the center in the bottom portion of the container being substantially transparent and having a distinguished diffraction peak in the surface of an index of plane (010) in the X-ray diffraction.

8. A heat-resistant and impact-resistant container according to claim 1, wherein the oriented crystallization tendency (U) as defined by the following formula (I), $$U = H(010)/H(-110) \tag{I}$$

wherein H(010) is a diffraction intensity of the surface having an index of a plane (010) in the X-ray diffraction, and H(-110) in the X-ray diffraction, is not smaller than 1.3 at the center in the bottom portion.

* * * * *